United States Patent
Rollings

(10) Patent No.: US 11,325,093 B2
(45) Date of Patent: May 10, 2022

(54) MODULAR REACTOR SYSTEMS AND DEVICES, METHODS OF MANUFACTURING THE SAME AND METHODS OF PERFORMING REACTIONS

(71) Applicant: BiologIC Technologies Limited, Hitchin (GB)

(72) Inventor: Nick Rollings, Hitchin (GB)

(73) Assignee: BiologIC Technologies Limited, Hitchin (GB)

( * ) Notice: Subject to any disclaimer, the term of this patent is extended or adjusted under 35 U.S.C. 154(b) by 164 days.

(21) Appl. No.: 16/751,944

(22) Filed: Jan. 24, 2020

(65) Prior Publication Data
US 2021/0229058 A1    Jul. 29, 2021

(51) Int. Cl.
*B01J 19/00* (2006.01)
*B01J 19/18* (2006.01)

(52) U.S. Cl.
CPC ....... *B01J 19/0046* (2013.01); *B01J 19/0013* (2013.01); *B01J 19/0066* (2013.01); *B01J 19/18* (2013.01); *B01J 2219/0002* (2013.01); *B01J 2219/00011* (2013.01); *B01J 2219/0024* (2013.01); *B01J 2219/0027* (2013.01); *B01J 2219/00065* (2013.01); *B01J 2219/00083* (2013.01); *B01J 2219/00213* (2013.01); *B01J 2219/00283* (2013.01); *B01J 2219/00308* (2013.01); *B01J 2219/00337* (2013.01);
(Continued)

(58) Field of Classification Search
None
See application file for complete search history.

(56) References Cited

U.S. PATENT DOCUMENTS

| 3,138,743 A | 6/1964 | Kilby |
| 4,175,283 A * | 11/1979 | Buchwald .......... G05D 23/1906 318/610 |

(Continued)

FOREIGN PATENT DOCUMENTS

| KR | 20150138128 | 8/2015 |
| WO | 2009108260 | 9/2009 |

(Continued)

OTHER PUBLICATIONS

Thorsen, Todd et al., "Microfluidic Large-Scale Integration," Science, vol. 298, Oct. 18, 2002, pp. 580-584.
(Continued)

*Primary Examiner* — Natasha E Young
(74) *Attorney, Agent, or Firm* — Calfee, Halter & Griswold LLP

(57) ABSTRACT

A modular reactor device has an outer housing, a reaction chamber, a fluid pathway connected to the reaction chamber, and a valve to control flow of fluid within the device. The outer housing has a plurality of connection ports including: a fluid input and a fluid output; an electrical input; and a pneumatic input. Either the electrical input or the pneumatic input is connected to the valve to provide for control of the valve, and either the fluid input or the fluid output is connected to the reaction chamber or the fluid pathway. Other aspects provide a base station for receiving and controlling a modular reactor device and methods for manufacturing the modular reactor device and for performing reactions using a modular reactor device.

23 Claims, 53 Drawing Sheets

(52) U.S. Cl.
CPC ......... *B01J 2219/00346* (2013.01); *B01J 2219/00353* (2013.01); *B01J 2219/00389* (2013.01); *B01J 2219/00477* (2013.01); *B01J 2219/00479* (2013.01); *B01J 2219/00495* (2013.01); *B01J 2219/00693* (2013.01)

(56) References Cited

U.S. PATENT DOCUMENTS

| | | | |
|---|---|---|---|
| 8,858,312 B1* | 10/2014 | Ward ................. | A63F 13/20 463/7 |
| 9,446,366 B2* | 9/2016 | Makatsoris ............ | B01J 8/067 |
| 9,977,862 B2 | 5/2018 | Sadowski et al. | |
| 2002/0022261 A1 | 2/2002 | Anderson et al. | |
| 2005/0042149 A1* | 2/2005 | Bard ................. | B01L 3/502715 422/130 |
| 2015/0024436 A1* | 1/2015 | Eberhart ........... | B01L 3/502715 435/91.2 |
| 2016/0038942 A1* | 2/2016 | Roberts ............ | B01L 3/502715 436/43 |

FOREIGN PATENT DOCUMENTS

| | | |
|---|---|---|
| WO | 2012012779 | 1/2012 |
| WO | 2013130910 | 9/2013 |
| WO | 2014085725 | 6/2014 |
| WO | 2015179098 | 11/2015 |
| WO | 2019105965 | 6/2019 |

OTHER PUBLICATIONS

Melin, Jessica et al., "Microfluidic Large-Scale Integration: The Evolution of Design Rules for Biological Automation," Annu. Rev. Biophys. Biomol. Struct. 2007, vol. 36, pp. 213-231.

Araci, Ismail Emre et al., "Microfluidic very large-scale Integration (mVLSI) with integrated micromechanical valves," 2012.

Araci, Ismail Emre et al., "Recent Developments in Microfluidic Large Scale Integration," ScienceDirect, Current Opinion in Biotechnology 2014, vol. 25, pp. 60-68.

Au, Anthony K. et al., "3D-Printed Microfluidic Automation," HHS Public Access, Lab Chip. Author Manuscript available in PMC Apr. 2, 2015, pp. 1-17.

Tsuda, Soichiro et al., "Customizable 3D Printed "Plug and Play" Millifludic Devices for Programmable Fluidics," PLOS One, DOI: 10.1371/journal.pone0141640, Nov. 11, 2015, pp. 1-13.

Gong, Hua et al., "High Density 3D Printed Microfluidic Valves, Pumps, and Multiplexers," Lab on a Chip, 2016, pp. 1-9.

Keating, Steven J. et al., "3D Printed Multimaterial Microfluidic Valve," PLOS One, DOI: 10.1371/journal.pone.0160624, Aug. 15, 2016.

Macdonald, Eric et al., "3D Printing for the Rapid Prototyping of Structural Electronics," IEEE Access, vol. 2, 2014, pp. 234-242.

Saleh, Ehab et al., "3D Inkjet Printing of Electronics Using UV Conversion," Adv. Mater. Technol., 2017, 2, 1700134.

Willis, Karl D.D. et al., "Printed Optics: 3D Printing of Embedded Optical Elements for Interactive Devices," UIST'12, Oct. 7-10, 2012, Cambridge, MA, USA.

Comina, G. et al., "3D Printed Device for Quantitative Enzymatic Detection Using Cell Phones," Royal Society of Chemistry, 2013.

Derby, Brian, Abstract of "Bioprinting: inkjet printing proteins and hybrid cell-containing materials and structures," Journal of Materials Chemistry, Issue 47, 2008.

Delaney, Joseph T., Jr. et al., Abstract of "Review: Inkjet printing of proteins," Soft Matter, Issue 24, 2009.

Omenetto et al., "Biopolymer-based inks and the application thereof," 2014.

Noor, Nadav et al., "3D Printing of Personalized Thick and Perfusable Cardiac Patches and Hearts," Advanced Science, 2019, 6, 1900344.

Organovo; Pioneering Bioprinted Human Tissues to Treat Disease; https://organovo.com/.

Modern Meadow; http://www.modernmeadow.com/.

Lung Biotechnology; https://www.lungbiotechnology.com/.

Dewey, A. et al., "Towards Microelectrofluidic System (MEFS Computing and Architecture," 2000.

Zhang, Tianhao et al., "Hierarchical Simulation for Microelectrofluidic System Process Performance Analysis," 2000.

Zhang, Tianhao et al., "Performance analysis of microelectrofluidic systems using hierarchical modeling and simulation," 2001.

Oh, Kwang et al., "Design of Pressure-driven microfluidic networks using electric circuit analogy," Lab Chip, 2012, 12, pp. 515-545.

Arachi, Ismail Emre et al., "Microfluidic Very Large-Scale Integration for Biochips: Technology, Testing and Fault-Tolerant Design," 2015.

Zhang, Tianhao et al., "Microelectrofluidic systems—Modeling and simulation," [online] [retrieved on Jul. 17, 2020] Retrieved from the Internet: <URL: https://www.amazon.co.uk/Mircroelectrofluidic-Systems-Simulation-Microscience-Engineering-ebook/dp/B00UVB3YSI>.

Hill, Douglas A. et al., "MECs: "Building Blocks" for Creating Biological and Chemical Instruments," PLOS One, DOI 10.1371/journal.pone.0158706, Jul. 20, 2016.

Wu, Sung-Yueh et al., "3D-printed microelectronics for integrated circuity and passive wireless sensors," Microsystems & Nanoengineering, DOI: 10.1038/micronano.2015.13, Jul. 20, 2015.

Ananthanarayanan, Vaishnavi et al., "Biocoder: A programming language for standardising and automating biology protocols," Journal of Biological Engineering 2010, 4:13, Retrieved from the Internet: URL: https://www.ibioleng.org/content/4/1/13.

Fitzpatrick, Daniel E. et al., "A novel internet-based Reaction Monitoring, Control and Autonomous, Self-optimisation Platform for Chemical Synthesis," Organic Process Research & Development, 2016, 20, 386-394, DOI: 10.1021/acs.oprd.5b00313.

Ahuja, Karan et al., "Toward point-of-care assessment of patient response: a portable tool for rapidly assessing cancer drug efficacy using multifrequency impedance cytometry and supervised machine learning," Microsystems & Nanoengineering, 2019, 5:34, https://doi.org/10.1038/s41378-019-00723-2.

Kitson, Philip J. et al., "Digitization of Multistep Organic Synthesis in Reactionware for On-Demand Pharmaceuticals," Science, 359, 314-319, Jan. 19, 2018.

Kitson, Philip J. et al., "Combining 3D Printing and Liquid Handling to Produce User-Friendly Reactionware for Chemical Synthesis and Purification," Chemical Science, 2013, 4, pp. 3099-3103.

Pop., Minhass W.H., Madsen J. (2016) Design Methodology for Flow-Based Microfluidic Biochips In: Microfluidic Very Large Scale Integration (VLSI). Springer, Cham.

Partial International Search Report and Written Opinion for related PCT application PCT/GB2021/050164 dated Mar. 25, 2021.

International Search Report for App. No. GB2001044.3 dated Nov. 18, 2020 (2 pages).

* cited by examiner

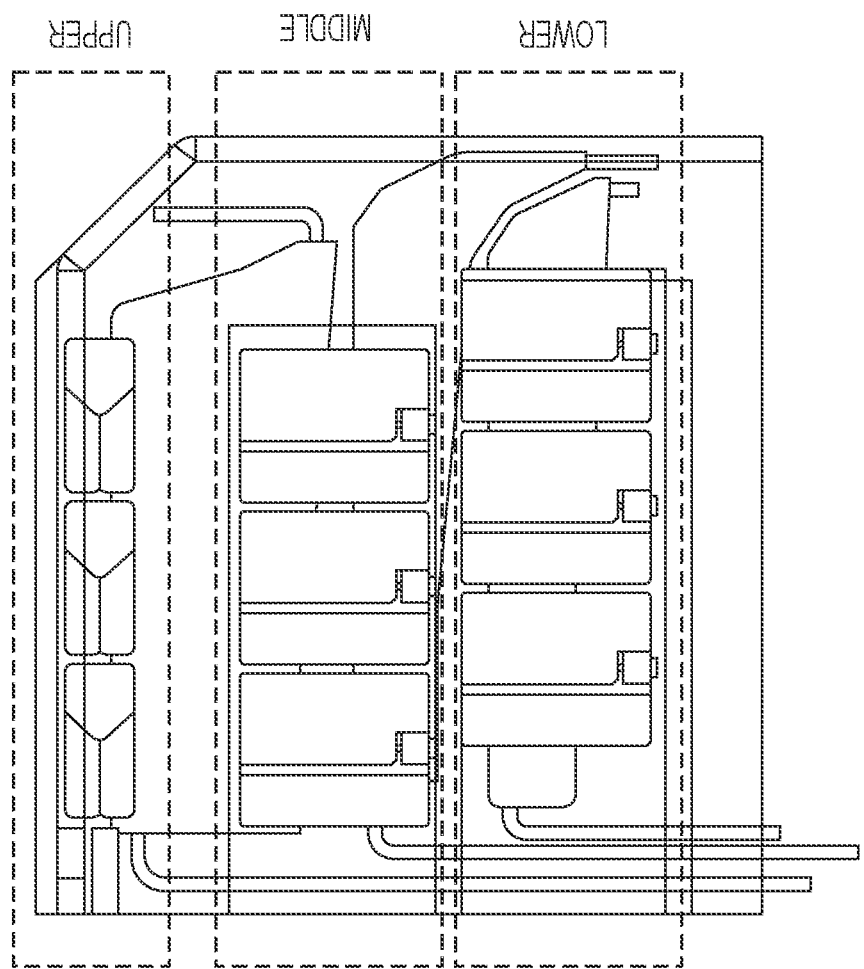
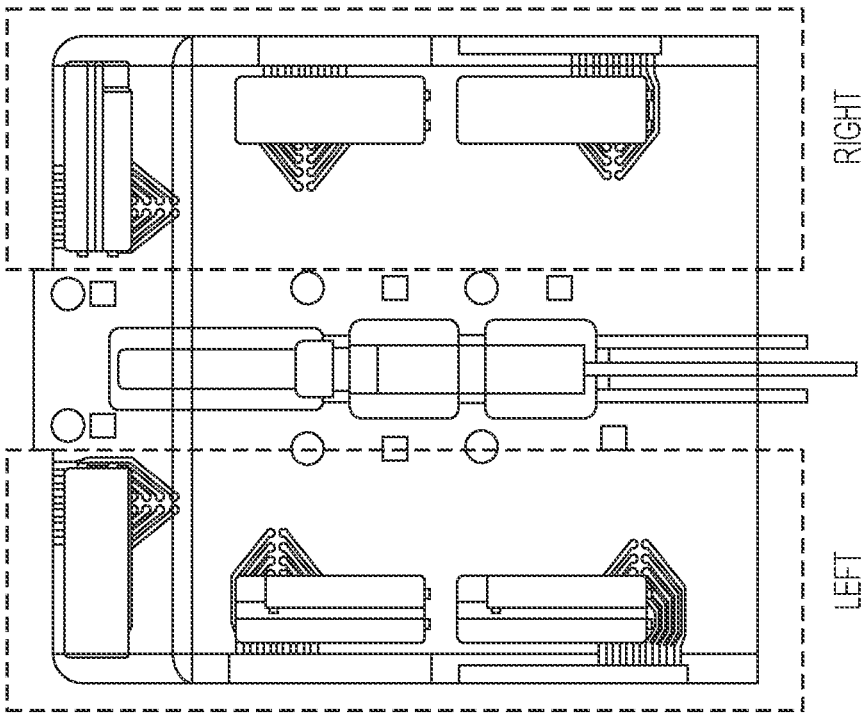
FIG. 7

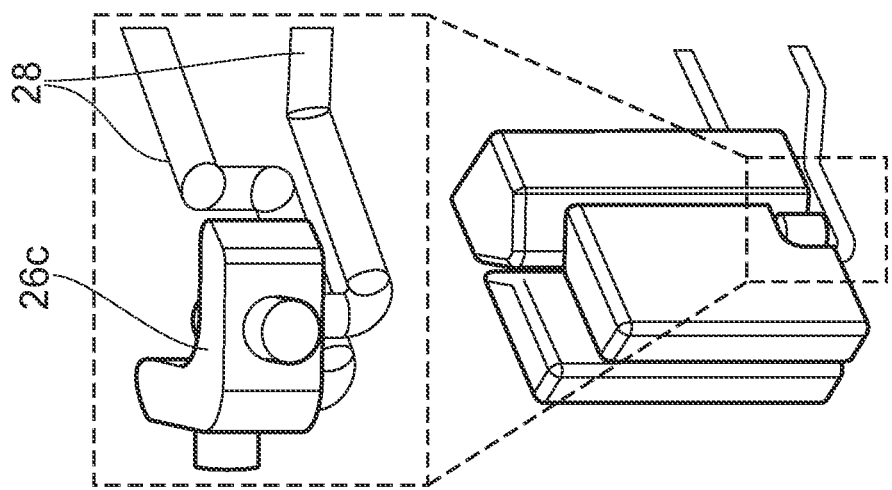
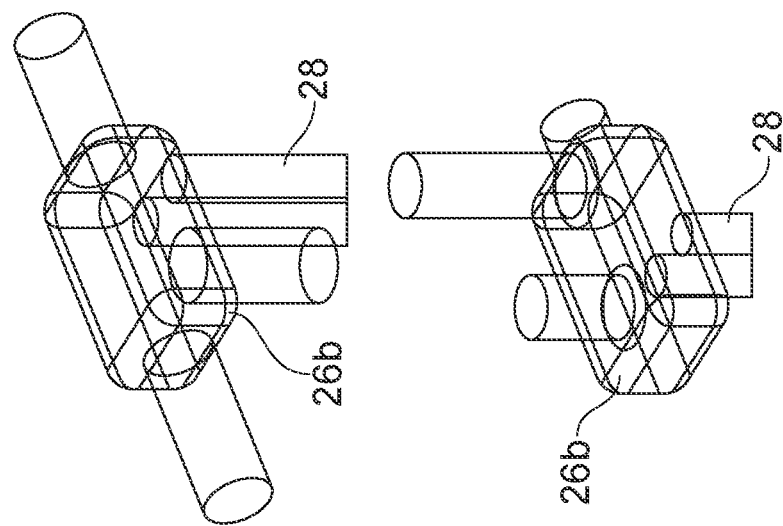
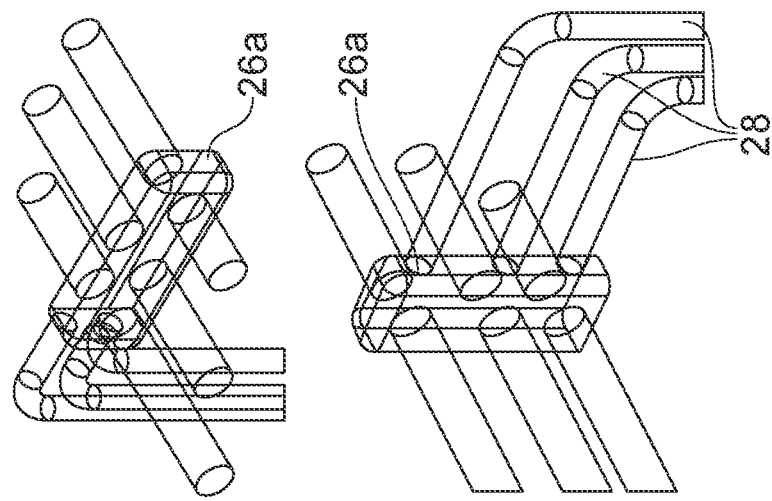
FIG. 13

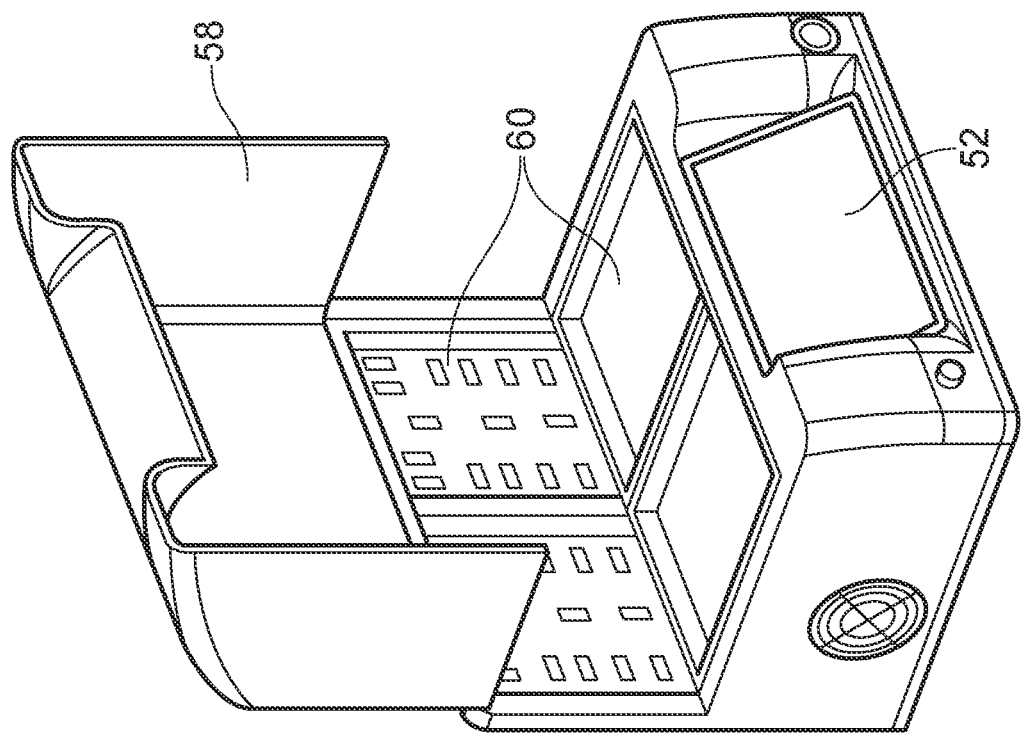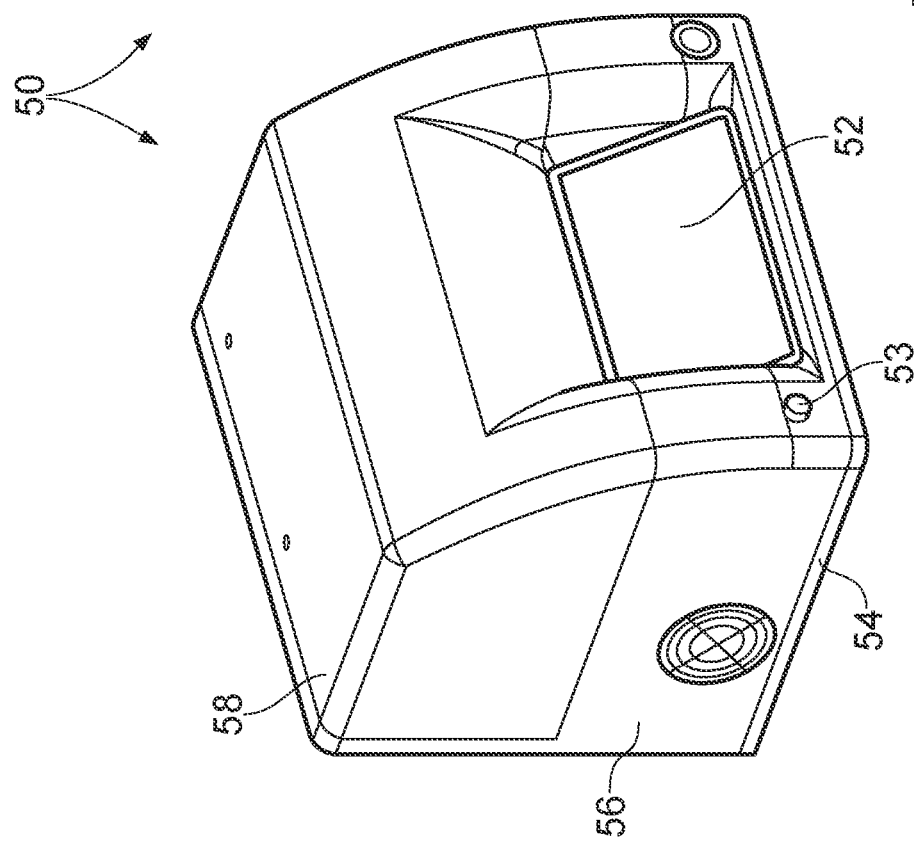
FIG. 27

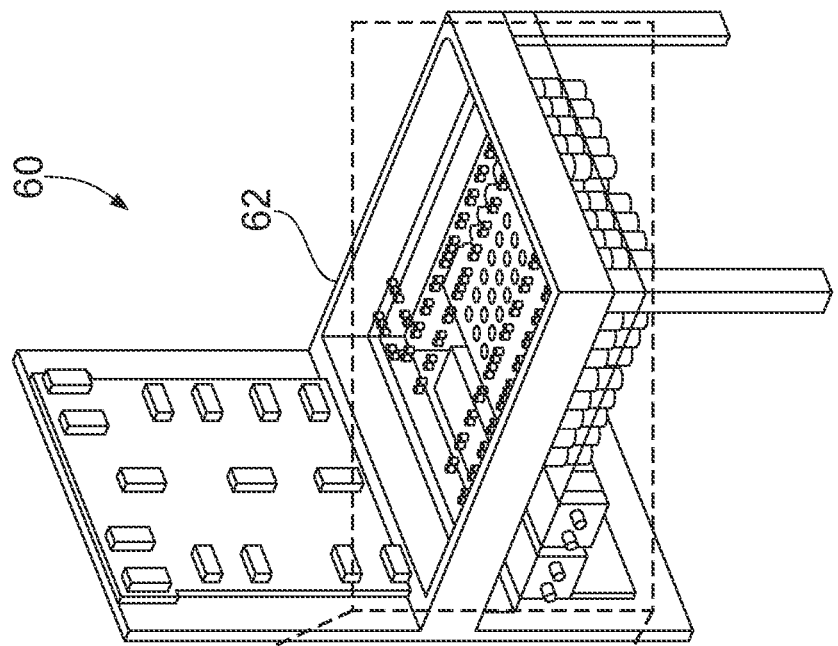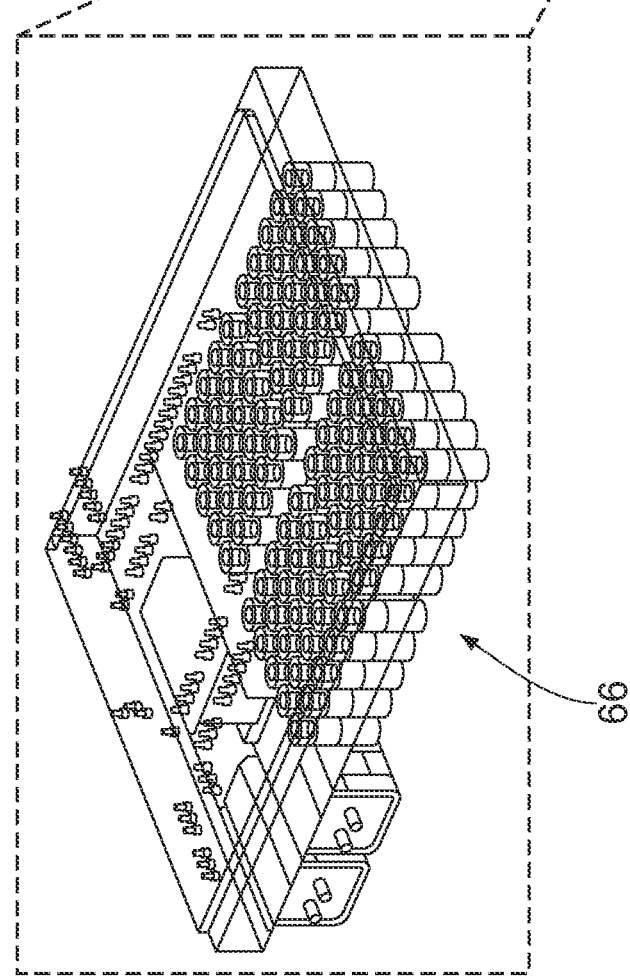
FIG. 32

Step 1.1c – Determine Liquid packet & clock cycle parameters

| Liquids per sub-experiment | Volume per sub-experiment (mL) | Total number of sub-experiments (i.e. reaction vessels) | Liquid 'packet' size - See Note 1 | Clock cycles to transport Liquid 'packet' - see Note 2 | Estimated time value for clock cycle [secs] - See Note 3 |
|---|---|---|---|---|---|
| Sample | 2.76 | 36 | 4.0 | 4 | 28 |
| Buffer | 0.695 | 36 | 1 | 1 | 7 |
| Nuclease-free water | 0.695 | 36 | 1 | 1 | 7 |

Clock cycle illustration for single liquid 'packet'

| Clock cycle | Liquid packet Start location | Liquid packet Destination location |
|---|---|---|
| 1 | Sample reservoir | Main bus |
| 2 | Main bus | Module sub-bus |
| 3 | Module sub-bus | Cache |
| 4 | Cache | Core |

Notes:
1. Liquid packet size - and resulting clock cycle - determined by smallest liquid volume per experiment - (see shaded row)
2. Clock cycle is determined as the time taken to transfer single liquid 'packet' one cartridge bus to another (see image)
3. Time value is an estimate for cartridge development purposes - can be updated later

FIG. 34

Step 1.1c - Identify liquid packets and assign IDs

| Experiment | Sub-experiment | Packet ID | Liquid | Volume (mL) | Liquid 'packets' |
|---|---|---|---|---|---|
| 1 | 1 | S1 | Sample | 2.76 | 4 |
| | | B1 | Buffer | 0.695 | 1 |
| | | NW1 | Nuclease-free water | 0.695 | 1 |
| | 2 | S2 | Sample | 2.76 | 4 |
| | | B2 | Buffer | 0.695 | 1 |
| | | NW2 | Nuclease-free water | 0.695 | 1 |
| 2 | 1 | S3 | Sample | 2.76 | 4 |
| | | B3 | Buffer | 0.695 | 1 |
| | | NW3 | Nuclease-free water | 0.695 | 1 |
| | 2 | S4 | Sample | 2.76 | 4 |
| | | B4 | Buffer | 0.695 | 1 |
| | | NW4 | Nuclease-free water | 0.695 | 1 |
| 3 | 1 | S5 | Sample | 2.76 | 4 |
| | | B5 | Buffer | 0.695 | 1 |
| | | NW5 | Nuclease-free water | 0.695 | 1 |
| | 2 | S6 | Sample | 2.76 | 4 |
| | | B6 | Buffer | 0.695 | 1 |
| | | NW6 | Nuclease-free water | 0.695 | 1 |
| 4 | 1 | S7 | Sample | 2.76 | 4 |
| | | B7 | Buffer | 0.695 | 1 |
| | | NW7 | Nuclease-free water | 0.695 | 1 |
| | 2 | S8 | Sample | 2.76 | 4 |
| | | B8 | Buffer | 0.695 | 1 |
| | | NW8 | Nuclease-free water | 0.695 | 1 |
| 5 | 1 | S9 | Sample | 2.76 | 4 |
| | | B9 | Buffer | 0.695 | 1 |
| | | NW9 | Nuclease-free water | 0.695 | 1 |
| | 2 | S10 | Sample | 2.76 | 4 |
| | | B10 | Buffer | 0.695 | 1 |
| | | NW10 | Nuclease-free water | 0.695 | 1 |
| 6 | 1 | S11 | Sample | 2.76 | 4 |
| | | B11 | Buffer | 0.695 | 1 |
| | | NW11 | Nuclease-free water | 0.695 | 1 |
| | 2 | S12 | Sample | 2.76 | 4 |
| | | B12 | Buffer | 0.695 | 1 |
| | | NW12 | Nuclease-free water | 0.695 | 1 |

FIG. 35

|   |   |   | S13 | Sample | 2.76 | 4 |
|---|---|---|---|---|---|---|
| 7 | | 1 | B13 | Buffer | 0.695 | 1 |
| | | | NW13 | Nuclease-free water | 0.695 | 1 |
| | | | S14 | Sample | 2.76 | 4 |
| | | 2 | B14 | Buffer | 0.695 | 1 |
| | | | NW14 | Nuclease-free water | 0.695 | 1 |
| 8 | | 1 | S15 | Sample | 2.76 | 4 |
| | | | B15 | Buffer | 0.695 | 1 |
| | | | NW15 | Nuclease-free water | 0.695 | 1 |
| | | 2 | S16 | Sample | 2.76 | 4 |
| | | | B16 | Buffer | 0.695 | 1 |
| | | | NW16 | Nuclease-free water | 0.695 | 1 |
| 9 | | 1 | S17 | Sample | 2.76 | 4 |
| | | | B17 | Buffer | 0.695 | 1 |
| | | | NW17 | Nuclease-free water | 0.695 | 1 |
| | | 2 | S18 | Sample | 2.76 | 4 |
| | | | B18 | Buffer | 0.695 | 1 |
| | | | NW18 | Nuclease-free water | 0.695 | 1 |
| 10 | | 1 | S19 | Sample | 2.76 | 4 |
| | | | B19 | Buffer | 0.695 | 1 |
| | | | NW19 | Nuclease-free water | 0.695 | 1 |
| | | 2 | S20 | Sample | 2.76 | 4 |
| | | | B20 | Buffer | 0.695 | 1 |
| | | | NW20 | Nuclease-free water | 0.695 | 1 |
| 11 | | 1 | S21 | Sample | 2.76 | 4 |
| | | | B21 | Buffer | 0.695 | 1 |
| | | | NW21 | Nuclease-free water | 0.695 | 1 |
| | | 2 | S22 | Sample | 2.76 | 4 |
| | | | B22 | Buffer | 0.695 | 1 |
| | | | NW22 | Nuclease-free water | 0.695 | 1 |
| 12 | | 1 | S23 | Sample | 2.76 | 4 |
| | | | B23 | Buffer | 0.695 | 1 |
| | | | NW23 | Nuclease-free water | 0.695 | 1 |
| | | 2 | S24 | Sample | 2.76 | 4 |
| | | | B24 | Buffer | 0.695 | 1 |
| | | | NW24 | Nuclease-free water | 0.695 | 1 |
| | | 3 | S25 | Sample | 2.76 | 4 |
| | | | B25 | Buffer | 0.695 | 1 |
| | | | NW25 | Nuclease-free water | 0.695 | 1 |

FIG. 35 (Continued)

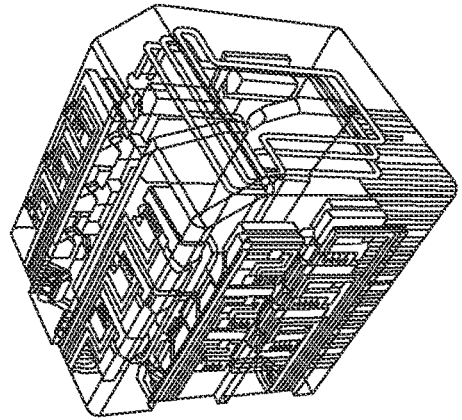

Step 1.1c - Determine Liquid packet & clock cycle parameters

| Liquids per sub-experiment | Volume per sub-experiment (mL) | Total number of sub-experiments (i.e. reaction vessels) | Liquid 'packet' size - See Note 1 | Clock cycles to transport Liquid 'packet' - see Note 2 | Estimated time value for clock cycle [secs] - See Note 3 |
|---|---|---|---|---|---|
| Sample | 2.76 | 36 | 4.0 | 4 | 28 |
| Buffer | 0.695 | 36 | 1 | 1 | 7 |
| Nuclease-free water | 0.695 | 36 | 1 | 1 | 7 |

Notes:
1. Liquid packet size - and resulting clock cycle - determined by smallest liquid volume per experiment - (see shaded row)
2. Clock cycle is determined as the time taken to transfer single liquid 'packet' one cartridge bus to another (see image)
3. Time value is an estimate for cartridge development purposes - can be updated later Clock cycle illustration for single liquid 'packet'

| Clock cycle | Liquid packet Start location | Liquid packet Destination location |
|---|---|---|
| 1 | Sample reservoir | Main bus |
| 2 | Main bus | Module sub-bus |
| 3 | Module sub-bus | Cache |
| 4 | Cache | Core |

FIG. 36

| Pre-experiment fluidic transfer sub-routine | Liquid 'packet' identification | Elapsed duration (Mins) | 0.12 | 0.23 | 0.35 | 0.47 | 0.58 | 0.70 | 0.82 | 0.93 | 1.05 | Ⓐ |
| | | Elapsed duration (secs) | 7 | 14 | 21 | 28 | 35 | 42 | 49 | 56 | 63 | |
| | | Clock cycle | 1 | 2 | 3 | 4 | 5 | 6 | 7 | 8 | 9 | |
| | S1 | Sample | | (Liquid Transfer)- Sample Reservoir to sample bus | | | (Liquid Transfer)- Sample bus to module bus | | | | | |
| | B1 | Buffer | | | | | | | | | | |
| | NW1 | Nuclease-free water | | | | | | | | | | |
| | N/A | Core Optical read (LED & PD) | | | | | | | | | | |

FIG. 37

| 1.17 | 1.28 | 1.40 | 1.52 | 1.63 | 1.75 | 1.87 | 1.98 | 2.10 |
|---|---|---|---|---|---|---|---|---|
| 70 | 77 | 84 | 91 | 98 | 105 | 112 | 119 | 126 |
| 10 | 11 | 12 | 13 | 14 | 15 | 16 | 17 | 18 |
| (Liquid Transfer) Module bus to core | | | | | | | | |
| | (Liquid Transfer) - Buffer reservoir to buffer bus | (Liquid Transfer) - Buffer bus to module bus | (Liquid Transfer) - Module bus to Cache 1 | (Liquid Transfer) - Cache 1 to Core | Wait-Mix & settle | | | |
| | | | Wait-Mix with dried reagent & settle | | | | | |
| | | | (Liquid Transfer) Nuclease-free water reservoir to Nuclease-free water bus | (Liquid Transfer) Nuclease-free water bus to module bus | (Liquid Transfer) - Module bus to Cache 2 | (Liquid Transfer) - Cache 2 to Core | Wait-Mix & settle | |
| | | | [Optical read] - confirm Sample in Core | | [Optical read] - confirm Buffer in Core | | [Optical read] - confirm Nuclease-free water in Core | |

FIG. 37 (Continued)

| Liquid 'packet' identification | Elapsed duration (Mins) | 0.12 | 0.23 | 0.35 | 0.47 | 0.58 | 0.70 | 0.82 | 0.93 | 1.05 |
|---|---|---|---|---|---|---|---|---|---|---|
| | Elapsed duration (secs) | 7 | 14 | 21 | 28 | 35 | 42 | 49 | 56 | 63 |
| | Clock cycle | 1 | 2 | 3 | 4 | 5 | 6 | 7 | 8 | 9 |
| S1 | Sample | (Liquid-Transfer)-Sample Reservoir to sample bus | | | | (Liquid-Transfer)-Sample bus to module bus | | | | |
| B1 | Buffer | | | | | | | | | |
| NW1 | Nuclease-free water | | | | | | | | | |
| N/A | Core Optical read (LED & PD) | | | | | | | | | |

SUB ROUTINE: Pre-experiment fluidic transfer sub-routine

Ⓐ CLOCK SEQUENCES 'CANNED OPERATIONS' WITHIN SUB ROUTINE

| Value | Value - information source | Comment |
|---|---|---|
| | | Identifies look-up table to use for specific experimental data |
| | Liquid packet list (see Appendix TBD) | |
| | Cartridge addressing scheme (see Appendix TBD) | Liquid transfer - Sample from Sample Reservoir to Sample bus |

FIG. 38 (Continued)

INDIVIDUAL PCR EXPERIMENT EXECUTION LOGIC

MODULAR REACTOR SYSTEMS AND DEVICES, METHODS OF MANUFACTURING THE SAME AND METHODS OF PERFORMING REACTIONS

The present invention generally relates to modular reactor systems and devices, to associated methods of manufacturing such devices and systems, and methods of performing reactions using such devices. It is particularly, but not exclusively, concerned with modular reactor devices which have similar or identical outer housings in which a range of selectable components are contained and in particular where the selectable components allow the modular reactors to be designed to perform a particular chemical or biological process or part thereof. In certain embodiments the modular reactor devices are manufactured by an additive manufacturing process.

Biomanufacturing (also known as "bioproduction") is the broad term to describe the manufacture of biology-based products ("bioproducts") in a wide range of sectors including medicines, food and energy. Underlying requirements for cost of goods, production volumes etc. vary considerably between sectors and consequently there are a number of approaches and solutions to the challenges involved.

In addition to commercial requirements (e.g. cost & production targets), considerable influences on biomanufacturing arise from the design process used to develop the bioproduct which will be the subject of the biomanufacturing. Technical decisions made at the design stage can significantly impact on the ability to manufacture the bioproduct and can constrain the range of biomanufacturing solutions available for that manufacture.

Furthermore, the ability of the bioproduct to carry out its desired function can be heavily dependent upon the biomanufacturing hardware and the process control used in the manufacture of that product. It can therefore be important for the biomanufacturing process to be developed in parallel with the design of the bioproduct to ensure the biomanufacturing process is able to produce the bioproduct with sufficient accuracy and/or volume and that it does not result in undesirable characteristics for the bioproduct.

Consequently typical biomanufacturing processes are specialist activities requiring specialist staff and skills and knowledge. There are also a limited number of existing approaches to biomanufacturing. Together these two constraints can result in significant limitations to the development and availability of bioproducts.

Bioproducts manufactured in high volumes are typically manufactured in large-scale biomanufacturing facilities with specialist staff and equipment. However, this requires a high capital investment for the specialist large-scale facilities and equipment and specialist staff required often for each process step. This also tends to limit the companies that can engage in such production to those with the available capital and skilled staff.

The effort and expense on biomanufacturing process development may be justified where high volume manufacturing will be carried out as the eventual economies of scale will result in a lower cost of goods on completion.

Therefore, whilst high-volume biomanufacturing processes may be suitable for a single product which will be produced in large volumes, there can be long process development lead times, for example in starting on a small scale and subsequent scaling up, as well as associated lead time for batch manufacturing due to the necessary quality assurance (QA) activities which can only be carried out after whole batch has been manufactured.

As biology-based approaches are increasingly used in sectors such as medicine, food and energy there is an increasing trend toward the tailoring and customisation of bioproducts to niche applications within these sectors (for example personalised medicines). Niche bioproducts are typically manufactured in low to moderate production volumes.

However, when bioproducts are required in small production volumes and/or it is desired to produce a wide range of alternate bioproducts, few solutions are available, often resulting in biomanufacturing being carried out manually by highly trained operators with resulting impacts on cost and throughput/speed of production. Manual processing can also increase the risk of variable product quality.

In addition, the implementation of predominately manual biomanufacturing solutions limits the location of biomanufacturing facilities to centralised locations which have the appropriate specialist equipment and individuals. This is an issue as the end users/customers of niche bioproducts (such as personalised medicines) tend to be in geographical disparate locations removed from centralised biomanufacturing sites.

The inability to execute biomanufacturing i) close to the point of need and ii) in low volume thus limits the ability of end users to access the niche bioproducts at an affordable price point. This scenario is also expected to become more prevalent as increasing quantities of niche bioproducts are developed across multiple sectors in the next 5-10 years. This results in the scenario where niche bioproducts exist to serve unmet needs but are unable to reach end users due to the limitations of the current state of the art in biomanufacturing.

Such limitations on the availability of low volume biomanufacturing are becoming a significant barrier to the application of biology to solve pressing needs in medicine, food and energy.

Whilst it is possible to use general lab automation to assist operators with routine operations (e.g. robotic pipettes transferring liquid in parallel), such lab automation processes are largely based on automation of existing manual operations and so can only directly impact on isolated stages in the overall manufacturing process. Moreover, such lab automation still requires skilled operators to prepare the equipment for processing and are not particularly suited to low volume manufacturing for the reasons previously discussed.

The current inability to automate low volume biomanufacturing of niche bioproducts arises from one or more of the following fundamental issues:

- Generic 'one-size-fits-all' solutions which cannot be readily adapted.
- Lack of standardisation—many different solutions to same challenge exist but are from multiple manufacturers with limited, if any, interoperability or connectivity.
- Limited feedback between the data collected from the biological process and the hardware/automation carrying out the process.
- Current biomanufacturing automation solutions are based on fabrication methods reliant on economies of scale (e.g. injection moulding) and are not conducive to creation of application-specific, low volume biomanufacturing solutions.
- High-volume fabrication methods have limited capacity for complex geometry and require separate processes for micro-scale and macro-scale geometry.
- The manufacturing processes involve large capital investment to commission and maintain, this creates a riskaverse R&D policy with new products constrained to manufacture via existing manufacturing infrastructure. This situation can lead to iterative improvements in generations of products rather than allowing truly disruptive developments to be commercialized.

The reliance on economies of scale; high capital expenditure leads to lock in with existing fabrication methods stifling innovation of new biomanufacturing automation solutions.

Production demand of niche bioproducts is inconsistent & variable resulting in the need for on-demand/just in time biomanufacturing.

End users of niche bioproducts are often geographically disparate resulting in the need to execute biomanufacturing in in different geographies under established controls to ensure consistency of the final bioproduct.

Maintaining sterility of bioprocessing equipment and preventing raw material contamination.

Innovation in biology is increasingly driven by software and data. However as the use of data becomes more prevalent, there is an increasing disconnect between the ability to collect significant biomanufacturing data and the ability to execute on the insight provided by the data and update biomanufacturing protocols. The main reason for this is the inflexibility of current biomanufacturing solutions and the reliance on fixed, inflexible fabrication methods such as injection moulding.

Aspects of the present invention seek to address one or more of the above problems by providing modular reactor systems and devices and/or methods of manufacturing such devices and/or methods of performing reactions using such devices.

An object of the present invention is to provide for a new approach to biomanufacturing which allows on-demand biomanufacturing of a wide range of significantly differing niche bioproducts, ideally in low production volumes and preferably closer to the point of use/need.

A further object of the present invention is to provide for methods and systems which enable the agile research, development and design of a wide range of significantly differing niche bioproducts.

A further object of the present invention is to provide application-specific biomanufacturing solutions on standardised, compact, easy-to-use hardware, and in particular to enable implementation of multiple, significantly differing, lengthy & complex biomanufacturing protocols on standard hardware.

An exemplary embodiment of the present invention provides a modular reactor device having an outer housing, and a plurality of components contained within the outer housing, the components including: a reaction chamber; a fluid pathway connected to the reaction chamber; and a valve arranged to control flow of fluid within the device, wherein the outer housing has a plurality of connection ports providing connections from the exterior of the device to the interior, the connection ports including: a fluid input and a fluid output; an electrical input; and a pneumatic input; wherein either the electrical input or the pneumatic input is connected to the valve to provide for control of the valve, and either the fluid input or the fluid output is connected to the reaction chamber or the fluid pathway.

A further exemplary embodiment of the present invention provides base station arranged to engage with a least one modular reactor device and having: a docking portion arranged to receive the modular reactor device; a plurality of connectors arranged in a predetermined configuration to enable connection to a predetermined configuration of connection ports on the reactor device when the device is received in the docking portion, the connectors including: a fluid output and a fluid supply; an electrical connector; and a pneumatic connector; a processor arranged to control the supply of one or more of: fluid, electrical power or signals and pneumatic pressure or signals, so as to cause the reactor device to carry out a chemical or biological reaction within the reaction device.

A further exemplary embodiment of the present invention provides a method of manufacturing a modular reactor device for performing a reaction to produce a chemical or biological product, the method including the steps of: determining at least one reagent required for the performance of the reaction; selecting, from a limited range of predetermined components, components for inclusion in the modular reactor device and determining an arrangement of said selected components within the modular reactor device to enable the reaction to be performed; producing, by an additive manufacturing process, a modular reactor device having: an outer housing having a plurality of ports in fixed positions through which fluid, electrical power or signals, and pneumatic pressure or signals, can be supplied to the modular reactor device; said selected components arranged within the outer housing in the determined arrangement and connected to each other and/or to one or more of the ports; and said at least one reagent stored within at least one of the selected components.

A further exemplary embodiment of the present invention provides a method of manufacturing a modular reactor device for performing a reaction to produce a chemical or biological product, the reaction requiring at least one reagent, the method including the steps of: receiving computer-coded instructions for the manufacture of the modular reactor device; producing a modular reactor device using an additive manufacturing process, the additive manufacturing process being controlled by a processor which uses the received computer-coded instructions for manufacture, the modular reactor device having: an outer housing having a plurality of ports in fixed positions through which fluid, electrical power or signals, and pneumatic pressure or signals can be supplied to the modular reactor device; said selected components arranged within the outer housing in the determined arrangement and connected to each other and/or to one or more of the ports; and said at least one reagent stored within at least one of the selected components.

A further exemplary embodiment of the present invention provides a method of manufacturing a chemical or biological product, the method including the steps of: receiving a modular reactor device specifically designed to produce said chemical or biological product and computer-coded instructions arranged to control the operation of said reactor device; connecting the received reactor device to a base station which is arranged to supply fluid, electrical power or signals, and pneumatic pressure or signals to the reaction device through a plurality of connectors which are arranged in a fixed arrangement to enable connection to a predetermined configuration of connection ports on the reaction device; and running the computer-coded instructions on a processor in said base station thereby causing the base station to supply one or more of: fluid, electrical power or signals, and/or pneumatic pressure or signals to the reactor device and thereby control the reactor to cause it to carry out steps to produce said chemical or biological product.

A further exemplary embodiment of the present invention provides a method of manufacturing a chemical or biological product, the method including the steps of: receiving a modular reactor device specifically designed to produce said chemical or biological product and computer-coded instructions arranged to control the operation of said reactor device wherein the modular reactor device includes at least one sensor arranged to monitor a characteristic of a reagent or a reaction in the reactor device; and is designed to allow performance of a plurality of alternative reaction pathways to produce a chemical or biological product, running the computer-coded instructions on a processor in said modular reactor device thereby causing the modular reactor device to control one or more of: fluid flows, electrical power or signals, and/or pneumatic pressure or signals in the modular reactor device and thereby cause the modular reactor device to carry out steps to produce said chemical or biological product; receiving a signal from said sensor and selecting, based on the received signal, one of the alternative reaction pathways that is to be followed; and controlling the modular reactor device accordingly to cause the modular reactor device to follow the selected reaction pathway.

A further exemplary embodiment of the present invention provides a method of manufacturing a chemical or biological product, the method including the steps of: receiving a modular reactor device specifically designed to produce said chemical or biological product and computer-coded instructions arranged to control the operation of said reactor device; and running the computer-coded instructions on a processor in said modular reactor device thereby causing the modular reactor device to control one or more of: fluid flows, electrical power or signals, and/or pneumatic pressure or signals in the modular reactor device and thereby cause the modular reactor device to carry out steps to produce said chemical or biological product, wherein the computer-coded instructions are arranged to cause the processor to control the modular reactor device to perform a plurality of operations on a regular cycle, the plurality of operations each causing predetermined quantities of fluids within the modular reactor device to be processed in different parts of the reactor at the same time.

A further exemplary embodiment of the present invention provides a method of manufacturing a chemical or biological product, the method including the steps of: receiving computer-coded instructions for the manufacture of a modular reactor device specifically designed to produce said chemical or biological product and computer-coded instructions arrange to control the operation of said reactor device; producing a modular reactor device using an additive manufacturing process, the additive manufacturing process being controlled by a processor which uses the received computer-coded instructions for manufacture; connecting the manufactured reactor device to a base station which is arranged to supply fluid, electrical power or signals, and pneumatic pressure or signals, to the reaction device through a plurality of connectors which are arranged in a fixed arrangement to enable connection to a predetermined configuration of connection ports on the reaction device; and running the computer-coded instructions for control on a processor in said base station thereby causing the base station to supply one or more of: fluid, electrical power or signals, and/or pneumatic pressure or signals to the reactor device and thereby control the reactor to cause it to carry out steps to produce said chemical or biological product.

Embodiments of the present invention will now be described by way of example with reference to the accompanying drawings in which:

FIG. 7 is a plan and side view of the cartridge of FIGS. 5A and 5B showing how different core and cache modules can be addressed;

FIG. 13 shows configurations of various valves used in the cartridge of FIGS. 5A and 5B;

FIG. 27 shows a standard instrument or base station according to an embodiment of the present invention;

FIG. 32 shows the arrangement of the mounting of the pneumatic interface of the cartridge module of FIG. 29;

FIG. 34 shows an approach to determining liquid packet size;

FIG. 35 shows the liquid packets and assigned identifiers as used in an embodiment of the present invention;

FIG. 36 shows an approach to determining clock cycle length;

FIG. 37 shows an approach to scheduling standardised operations;

Figure 1:
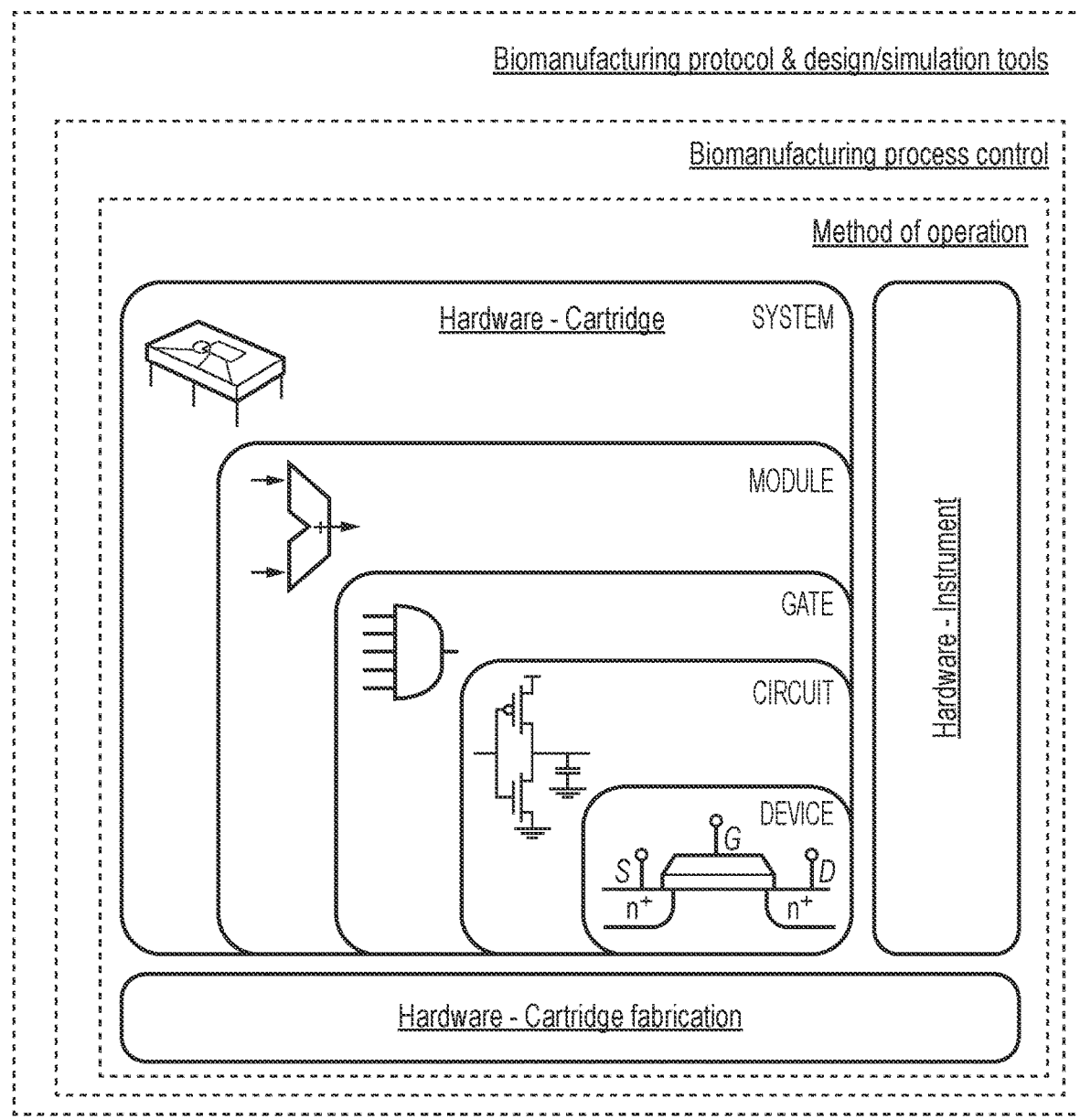
FIG. 1 is a schematic illustration of the hierarchical relationship between various components forming embodiments of the present invention.

At their broadest aspects of the present invention provide modular reactor devices having a selection of internal components contained within a housing which has a standardised arrangement of connection ports for connection between the exterior of the device and the interior, along with base stations for connection to and control of such devices.

A first aspect of the present invention provides a modular reactor device having an outer housing, and a plurality of components contained within the outer housing, the components including: a reaction chamber; a fluid pathway connected to the reaction chamber; and a valve arranged to control flow of fluid within the device, wherein the outer housing has a plurality of connection ports providing connections from the exterior of the device to the interior, the connection ports including: a fluid input and a fluid output; an electrical input; and a pneumatic input; wherein either the electrical input or the pneumatic input is connected to the valve to provide for control of the valve, and either the fluid input or the fluid output is connected to the reaction chamber or the fluid pathway.

In many embodiments, the device will include a plurality of components, thus providing a self-contained reactor.

In many embodiments, the device will include a plurality of connection ports, thus enabling a wide range of connection with and/or control of the components within the device.

The plurality of components may further include a storage compartment and a fluid pathway connecting the storage compartment and the reaction chamber. The storage compartment may store a reagent to be used in a reaction or reactions to be performed by the device. The flow of reagent from the storage compartment to the reaction chamber may be controlled by one or more valves.

In many embodiments at least one of the components (such as a storage compartment or a reaction chamber) includes a reagent for a chemical or biological reaction. Thus the modular reactor device may be self-contained in terms of reagents required to perform the desired reaction(s). This means that there may be no need for external supplies of such reagents in order for the reactor device to perform the reaction(s), which allows the interface with a base station or standard instrument which operates the reactor device to be simplified. The self-contained nature of the reactor device also means that it can be used in a non-specialised environment and/or by non-specialist operators and can be used in an on-demand manner without the need to consider the supply of or storage of reagents.

The plurality of connection ports may also include an optical input or output. The device may include optical components which either emit or receive light (or other electromagnetic waves) into or from other components of the device. The optical components may, for example, allow the performance of photo-sensitive reactions, or be used to interrogate and/or monitor the progress of a reaction or the state of a particular component.

The plurality of connection ports may also include a thermal input or output. The device may include thermal elements which are arranged to cool or heat other components or parts of the device. Examples of thermal elements are electrical heaters or heat pipes.

The components preferably include a plurality of valves which are arranged to control flow of fluid to/from the one reaction chamber; and/or along the fluid pathway.

The components may include a sensor. Various sensors may be provided in the modular reactor device to monitor, for example, the progress of a reaction, the movement of fluids within the device, the temperature of one or more components within the device, etc.

The plurality of connection ports may include a sensor output which is connected to the sensor to allow information from the sensor to be communicated externally to the device. This allows information from sensors on the device to be communicated to an external controller so that, for example, the progress of a reaction can be monitored, and/or the control of a reaction adjusted in a feedback loop.

Modular reaction devices according to this aspect can provide application-specific hardware that can be optimised around specific biomanufacturing protocol requirements. In particular, individual reaction devices can be designed and manufactured to perform a single reaction or combination of reactions in order to produce a particular biological or chemical product, or to perform a particular kind of analysis of a sample.

The modular reaction devices therefore offer the potential for small, compact and automated hardware solutions to biomanufacturing.

Miniaturisation of the modular reaction devices can allow the reaction devices to be more conveniently distributed and used closer to the point of use/need.

Standardisation of the connection points and their configuration on the outer housing of the device can allow a single standardised base station or instrument to be used to interface with and supply and/or control all modular reaction devices, regardless of the internal functioning of the individual modular reaction device.

Modular reaction devices according to this aspect may be manufactured by an additive manufacturing process ("3D printing"). This can allow a completely sealed modular reaction device to be produced, which can minimise the risk of bioproducts or reagents leaking from the device and/or contamination of the internal working spaces in the device.

The modular reactor device of this aspect may include any combination of some, all or none of the above-described preferred and optional features.

A second aspect of the present invention provides a kit including at least two modular reactor devices according to the above-described first aspect, including some, all or none of the optional and preferred features of that aspect, wherein the arrangement of the components contained within the outer housing is different in each of the modular reactor devices, and the arrangement of the connection ports is identical in each of the modular reactor devices.

The outer housing of each of the modular reactor devices may be identical in size and shape. This allows the modular reactor devices to be used with a standardised interface as the physical arrangement of the outer housing is identical and so the interface only needs to have a single configuration to be able to accommodate all of the reactor devices.

In some embodiments, the modular reactor devices are identical in size and shape in only one or two dimensions. Such modular reactor devices can still be used with a standardised interface due to the identical dimension(s), but as the dimensions of the outer housing can vary in at least one dimension, there is greater flexibility in the construction of the modular reactor devices, for example where it is desired to include more components within the modular reactor devices in order to perform the desired reaction(s).

A third aspect of the present invention provides a base station arranged to engage with a least one modular reactor device and having: a docking portion arranged to receive the modular reactor device; a plurality of connectors arranged in a predetermined configuration to enable connection to a predetermined configuration of connection ports on the reactor device when the device is received in the docking portion, the connectors including: a fluid output and a fluid supply; an electrical connector; and a pneumatic connector; a processor arranged to control the supply of one or more of: fluid, electrical power or signals and pneumatic pressure or signals, so as to cause the reactor device to carry out a chemical or biological reaction within the reaction device.

By having a predetermined arrangement of connectors, the base station is able to interact with and control modular reactor devices with a corresponding standardised configuration. This means that a single base station is able to accommodate and operate multiple cartridges depending on the product or reaction required.

The base station may be able to accommodate more than one modular reactor device and may provide for optional connection between connection ports associated with one device and connection ports associated with another device so that reaction products can be passed between devices.

The connectors may further include a thermal connector and the processor may then be arranged to control the supply of a heating or cooling medium to the reactor device. This can allow the temperature of components within the reactor device to be controlled and heat supplied to (or taken away) from a reaction site and, optionally, the temperature of a particular component controlled to stay within a desired range.

The connectors may further include an optical connector and the processor may then be arranged to control the supply of optical power or signals to the reactor device and/or to receive optical signals from the reactor device. The optical signals include electromagnetic signals of any wavelength. The optical signals may be conducted within the modular reactor device by waveguides to a desired location. The optical signals can be used to supply radiation to a particular part of the device, for example to enable or assist in the performance of a reaction, or for sensing purposes. When used for sensing, optical signals may be supplied to illuminate a particular component, or the contents of a particular component, and an optical sensor used to sense the results of that illumination (e.g. reflectance, absorption, transmission or fluorescence).

The processor may be arranged to control the reaction carried out by the reactor device by supplying electrical power or signals, or pneumatic pressure or signals to the reactor device so as to cause the reactor device to repeatedly process small volumes of fluid through components in the reactor device.

The base station repeatedly processing small volumes of fluid can enable precise control of the movement of fluids around the modular reactor device. The fluids may be moved in predetermined unit quantities, or multiples thereof, akin to packets in an integrated circuit.

Alternatively or additionally the processor may be arranged to cause the reactor device or components in the reactor device to perform a plurality of operations on a regular cycle, the plurality of operations each causing predetermined quantities of fluids within the modular reactor device to be processed in different parts of the reactor at the same time. This method of operation may be akin to a "clock cycle" in an integrated circuit, to control the timing of operations within in the modular reactor device. This can allow various actions to be synchronised with each other, and allow precise scheduling of operations such as fluid movements so that they take place sequentially or in parallel as desired.

The processor may be arranged to control the reaction based on signals received from the modular reactor device. This can allow the control of the reaction to adapted depending on the sensed progress of the reaction, or for decision-making about the reaction protocol to be made during the performance of the reaction.

The base station of this aspect may include any combination of some, all or none of the above-described preferred and optional features.

A further aspect of the present invention provides a kit including at least one modular reactor device according to the above-described first aspect, including some, all or none of the optional and preferred features of that aspect and a base station according to the above-described third aspect, including some, all or none of the optional and preferred features of that aspect.

A further aspect of the present invention provides a method of manufacturing a modular reactor device for performing a reaction to produce a chemical or biological product, the method including the steps of: determining at least one reagent required for the performance of the reaction; selecting, from a limited range of predetermined components, components for inclusion in the modular reactor device and determining an arrangement of said selected components within the modular reactor device to enable the reaction to be performed; producing, by an additive manufacturing process, a modular reactor device having: an outer housing having a plurality of ports in fixed positions through which fluid, electrical power or signals, and pneumatic pressure or signals, can be supplied to the modular reactor device; said selected components arranged within the outer housing in the determined arrangement and connected to each other and/or to one or more of the ports; and said at least one reagent stored within at least one of the selected components.

By providing a limited range of pre-determined components, these components can be standardised and based on centralised testing and certification.

The fixed positions of the ports allows for manufacture of a standardised arrangement of ports on the outer housing so that all modular reactor devices manufactured according to the method of this aspect can be used with a single standardised base station, such as, but not necessarily, a base station according to the above-described third aspect.

It is also possible to update and modify the design of modular reactor devices rapidly by updating the predetermined component designs centrally, with modifications then being automatically applied to subsequently-manufactured devices.

The selected components may include: a valve; a reactor chamber; and a fluid pathway, and the determined arrangement may then include: said fluid pathway connecting at least one of said plurality of ports to the reactor chamber; and a port for supplying electrical power or signals, or a port for supplying pneumatic pressure or signals, being connected to said valve.

The outer housing may further include ports through which heating or cooling medium, and/or optical power or signals can be supplied to the modular reactor device.

A further aspect of the present invention provides a method of manufacturing a modular reactor device for performing a reaction to produce a chemical or biological product, the reaction requiring at least one reagent, the method including the steps of: receiving computer-coded instructions for the manufacture of the modular reactor device; producing a modular reactor device using an additive manufacturing process, the additive manufacturing process being controlled by a processor which uses the received computer-coded instructions for manufacture, the modular reactor device having: an outer housing having a plurality of ports in fixed positions through which fluid, electrical power or signals, and pneumatic pressure or signals can be supplied to the modular reactor device; said selected components arranged within the outer housing in the determined arrangement and connected to each other and/or to one or more of the ports; and said at least one reagent stored within at least one of the selected components.

In the method of the present aspect, a modular reactor device can be manufactured using instructions which are stored remotely from the manufacturing site. This can enable standardised manufacturing of modular reactor devices at a range of different sites.

A further aspect of the present invention provides a method of manufacturing a chemical or biological product, the method including the steps of: receiving a modular reactor device specifically designed to produce said chemical or biological product and computer-coded instructions arranged to control the operation of said reactor device; connecting the received reactor device to a base station which is arranged to supply fluid, electrical power or signals, and pneumatic pressure or signals to the reaction device through a plurality of connectors which are arranged in a fixed arrangement to enable connection to a predetermined configuration of connection ports on the reaction device; and running the computer-coded instructions on a processor in said base station thereby causing the base station to supply one or more of: fluid, electrical power or signals, and/or pneumatic pressure or signals to the reactor device and thereby control the reactor to cause it to carry out steps to produce said chemical or biological product.

A further aspect of the present invention provides a method of manufacturing a chemical or biological product, the method including the steps of: receiving a modular reactor device specifically designed to produce said chemical or biological product and computer-coded instructions arranged to control the operation of said reactor device wherein the modular reactor device includes at least one sensor arranged to monitor a characteristic of a reagent or a reaction in the reactor device; and is designed to allow performance of a plurality of alternative reaction pathways to produce a chemical or biological product, running the computer-coded instructions on a processor in said modular reactor device thereby causing the modular reactor device to control one or more of: fluid flows, electrical power or signals, and/or pneumatic pressure or signals in the modular reactor device and thereby cause the modular reactor device to carry out steps to produce said chemical or biological product; receiving a signal from said sensor and selecting, based on the received signal, one of the alternative reaction pathways that is to be followed; and controlling the modular reactor device accordingly to cause the modular reactor device to follow the selected reaction pathway.

The method of the present aspect allows a modular reactor device to have a number of alternative reaction pathways, or protocol steps, which can be implemented depending on control signals received. The choice of which of these pathways or protocol steps are followed can be based on one or more signals received from sensors within the modular device, which may, for example, be a signal indicating the progress of a reaction within the device, the quantity or quality of a particular product within the device.

A further aspect of the present invention provides a method of manufacturing a chemical or biological product, the method including the steps of: receiving a modular reactor device specifically designed to produce said chemical or biological product and computer-coded instructions arranged to control the operation of said reactor device; and running the computer-coded instructions on a processor in said modular reactor device thereby causing the modular reactor device to control one or more of: fluid flows, electrical power or signals, and/or pneumatic pressure or signals in the modular reactor device and thereby cause the modular reactor device to carry out steps to produce said chemical or biological product, wherein the computer-coded instructions are arranged to cause the processor to control the modular reactor device to perform a plurality of operations on a regular cycle, the plurality of operations each causing predetermined quantities of fluids within the modular reactor device to be processed in different parts of the reactor at the same time.

The method of the present aspect makes use of a regular cycle, which may be akin to a "clock cycle" in an integrated circuit, to control the timing of operations within in the modular reactor device. This can allow various actions to be synchronised with each other, and allow precise scheduling of operations such as fluid movements so that they take place sequentially or in parallel as desired.

The use of a "clock cycle" can enable precise control of the movement of fluids around the modular reactor device. The fluids may be moved in predetermined unit quantities, or multiples thereof, akin to packets in an integrated circuit.

A further aspect of the present invention provides a method of manufacturing a chemical or biological product, the method including the steps of: receiving computer-coded instructions for the manufacture of a modular reactor device specifically designed to produce said chemical or biological product and computer-coded instructions arrange to control the operation of said reactor device; producing a modular reactor device using an additive manufacturing process, the additive manufacturing process being controlled by a processor which uses the received computer-coded instructions for manufacture; connecting the manufactured reactor device to a base station which is arranged to supply fluid, electrical power or signals, and pneumatic pressure or signals, to the reaction device through a plurality of connectors which are arranged in a fixed arrangement to enable connection to a predetermined configuration of connection ports on the reaction device; and running the computer-coded instructions for control on a processor in said base station thereby causing the base station to supply one or more of: fluid, electrical power or signals, and/or pneumatic pressure or signals to the reactor device and thereby control the reactor to cause it to carry out steps to produce said chemical or biological product.

In the methods of any of the above aspects, the modular reactor device may be a modular reactor device according to the above-described first aspect, including some, all or none of the optional and preferred features of that aspect, but need not be.

The modular reaction devices, kits, base stations and methods of the above aspects enable, either singly or in combination, significant potential improvements in biomanufacturing and/or conduct of chemical and biological reactions.

In particular they may enables execution of high complexity biomanufacturing protocols using minimal resources on a physical small solution. The modular reaction devices can be highly optimised based on the most efficient execution route.

In general terms the aspects of the invention potentially offer significant benefits over the current state of the art such as physically smaller instrumentation and reduced overall biomanufacturing protocol execution times.

Numerous advantages may arise from the integration of the functionality within the modular reaction devices and the control of that functionality.

The 3D design freedom enabled by additive manufacturing techniques permits close integration of instrumentation domains (fluidics, electronics etc.) which is not possible with conventional fabrication methods. This allows the modular reaction devices to be customised around individual test chemistries and also reduces the overall physical size of the system, especially relevant to point-of-need/use applications.

Close integration of different functionality may also enable new system architectures and the partitioning of greater functionality onto the modular reaction device which can lead to blurring of the traditional diagnostic system boundaries between 'instrument' and 'consumable'.

Fabrication of modular device functionality in three dimensions can enable significant miniaturisation of existing lab-based instrumentation and integration of separate instruments/workflows. For example new 3D architectures resulting in integrated monolithic 3D cartridge/instrument/systems that are not constrained by traditional 2D manufacturing technologies.

Numerous advantages may arise from the overall miniaturisation that is enabled by the aspects of the present invention. This may be particularly advantageous in allowing complex biomanufacturing protocols to be accessible outside highly-specialised locations and to less-specialist operators.

The smaller potential volumes (e.g. with reaction chambers of 100 ml or less) can provide for greater process control and thereby higher quality output.

Modular reaction devices can be made in smaller physical volumes due to their specific application and the need for smaller quantities of input/output material. This enables fabrication of multiple units in one 3D printing batch which can result in lower unit costs.

Where larger volumes of product are required, multiple (potentially identical) smaller devices can be operated in parallel.

Many of the significant benefits of the above aspects come from the enabling of standardisation in the modular reaction devices, the base stations and the methodology for manufacturing and operating these.

For example, the common digital aspects of the invention can enable mass-customisation by combining low unit costs of mass production processes with the flexibility of individual customization for the end user. Mass customisation also enables reconfiguration of existing designs to suit differing application needs for different users in each application area.

For example, libraries of components or combinations of components can be maintained, so that each new modular reactor design does not have to start from nothing, but can use tried and tested "building blocks" with known functionality. This can enable optimisation and maturation of system elements reducing the degree of re-engineering required for each new variant.

Such a library of common components/modules/solutions can also reduce the barriers to automation for smaller bioproduct developers enhancing the overall success of multiple sectors exploiting biomanufacturing.

The standardisation provided by the above aspects enables a relatively complexity-free creation of proprietary biomanufacturing solutions and may mean that niche bioproduct developers do not require either bespoke biomanufacturing facilities that are expensive in time and capital or multiple off the shelf biomanufacturing solutions that are potentially less than optimum.

Further advantages may arise from the configurability of the modular reaction devices.

For example, creation of application-specific solutions for each biomanufacturing area is possible via a standard modular reaction device architecture with libraries of 'modules' and the use of digital editing to easily create application-specific designs.

This can lead to a reduction of the development effort required to create new system designs.

This can also reduce the skill level required to create multi-domain (fluidics, electronics, optics etc.) instrumentation. One of the major barriers to adoption of microfluidics and other hybrid semiconductor/biological technologies is the complexity of engineering these devices, particularly since there are many different types of expertise needed in design fabrication, build and test of these devices.

The aspects of the invention may also provide for improvements in biomanufacturing performance.

System performance using the modular reaction devices and kits of the above aspects can be high because the integrated and miniaturised cartridges carry out operations faster due to their small physical size and close physical proximity of the components.

The aspects of the present invention can minimise the infrastructure required for a complex process (e.g. bioproduction) and enable easier automation for lower skilled users.

The modular reactor devices and kits according to the above aspects can integrate multiple sensors at relatively low additional cost, particularly where the sensors can be integrally manufactured as part of the additive manufacturing process of the above aspects. This can allow even closer process monitoring of the reaction(s) in the devices.

Use of additive manufacturing principles in the manufacture of the devices can allow very close integration of the components within a device, for example of heating elements with reaction chambers or optical sensors with fluid-containing elements, thus improving performance and efficiency.

The modular reactor device design enabled by 3D printing can ensures a completely closed environment within the cartridge, thus maintaining sterility of the biomanufacturing environment and preventing contamination.

The modular reactor devices and kits according to the above aspects can aggregate multiple in-process measurements during the execution of the reaction protocol(s). They may use adaptive process control algorithm to ensures the quality of the final bioproduct is within pre-determined quality limits regardless of the quality of the raw material (e.g. a patient-derived sample).

Aspects of the present invention may also provide for improvements in bioproduct development.

The modular reaction devices according to aspects of the invention provide common instrumentation which can allow for a seamless transition between bioproduct R&D and biomanufacturing of the bioproduct.

The design and fabrication of the niche bioproduct can be developed and worked on in parallel by multiple partners potentially over different geographies via the use of a standardised platform.

Aspects of the present invention may also provide for improvements in biomanufacturing processes.

A common platform for fabrication of both prototypes and production designs in higher volumes enables a smoother transition from R&D into production, reducing complexity and costs.

The aspects of the invention can enable bioproduct design to take account of the biomanufacturing requirements and capabilities early in development to enable higher quality biomanufacturing processes and potentially reduced costs.

The capital expenditure on biomanufacturing facilities can be significantly reduced by using the methods and approaches of the above aspects as one flexible fabrication platform replaces product specific tooling and set up.

The use of a standardised instrument or base station at biomanufacturing locations may reduce the overall supply chain thus reducing complexity of manufacturing logistics and quantity of raw material to be stored.

The standardisation of the reaction devices and the base stations can enable scale-up/out of a biomanufacturing protocol without the need to re-design and re-qualify the manufacturing process for differing production volumes.

The 'flexible-yet-standard' approach offered by the integration of the modular reaction devices and the base stations allows a single location to manufacture a wide range of bioproducts in a volume-agnostic, on-demand, automated manner thus reducing cost overheads (e.g. need to retrain on differing biomanufacturing protocols before manufacturing each batch).

The provision of a physically compact and automated solution through the modular reaction devices, kits and base stations may allow biomanufacturing to no longer be confined to large expensive clean rooms. This can allow biomanufacturing to occur in a variety of different locations closer to the point of need/use.

Whilst, as noted above, there are benefits arising from potential miniaturisation, the ability of the devices according to embodiments of the invention to be connected together (and the ease with which this can be achieved where there is standardisation of the device and the base stations to which they are mated), can provide an ability to use multiple instruments in parallel. This provides flexibility to suit differing production needs for different niche bioproducts and can allow the reaction processes to be scaled up, whilst retaining the benefits of central manufacturing and not requiring specialised point-of-use environment and/or operators.

For example, the modular reactor devices according to the above aspects and the base stations and their combination can allow the execution of complex biomanufacturing protocols in parallel via the application of integrated circuit-like operation and simulation techniques/features. This, in turn, can enable production volume flexibility so that it is possible to make just the right required amount of therapy/product for the application in question.

The use of smaller physical fluid volumes for each biomanufacturing sub-process can enable greater process oversight via monitoring of a smaller liquid volume.

As a result of the manufacturing methods used and the use of standardised reaction devices with standardised components and connection points, on-demand production of reaction devices is possible. This reduces the need for mass-production of a bioproduct to realise economies of scale and provides the capability to fabricate on demand in a just-in-time fashion to suit user demand. This differs significantly from the current state of the art where bioproducts need to be fabricated in bulk to realise economies of scale and then stored prior to use.

The standardisation across the reaction devices, base stations and methods of operation can allow reproducible and consistent manufacturing of chemical or bio-product at a range of sites over a wide geographical area.

The aspects of the present invention can enable the faster development and manufacture of bioproducts enabling them to reach end users quicker, especially beneficial for sectors such as medicine where the invention enables faster translation of new therapies into the clinic and the hands of patients.

The physically compact and automated nature of the modular reaction devices according to aspects of the invention can enable the biomanufacturing process to be placed closer to the end user reducing handling risks to raw biological material, reducing manufacturing lead time, reducing costs whilst eliminating contamination risk and increasing the reproducibility of the biomanufacturing process.

The aspects of the invention can also enables continuous improvement to occur as the underlying 3D fabrication techniques improve. This enables significant improvements to each new generation of system further improving system performance.

Future improvements in 3D printing resolution will enable a reduction in the physical size of cartridge functionality. This will provide two options for on-going cost reduction/performance upgrades for a given cartridge design: a reduction in system size whilst retaining performance; or retaining system size whilst adding further performance (e.g. multiple biomanufacturing processes in single package).

The application-specific hardware making up the modular reaction devices can be modified over time based on process data fed back from use of the devices. This modification may include use of artificial intelligence (AI) and machine learning (ML) techniques to optimise the design of specific devices.

Embodiments of the present invention make use of the benefits of additive manufacturing (also known as 3D printing) and consequently has multiple elements and modules in both the digital and physical domains.

The elements and modules described in more detail in the embodiments below can be view as arranged into an architecture as an abstraction hierarchy shown in FIG. 1 and referred to as a 'stack'. This architecture is based upon the approach taken in the Integrated Circuit (IC) sector and enables decoupling of each aspect of the 'stack' to enable modification & development of each aspect separately whilst still ensuring compatibility of each layer with each other.

An overarching hardware architecture (solid lines in FIG. 1) is defined along with libraries of 'modules' and components that can be re-used to enhance performance & reliability, interfaces between the modules are also defined in the hardware architecture.

This approach reduces design complexity as lower level detail is 'black boxed' allowing design, development and optimisation effort to be carried out on each aspect of the hardware without the need to consider the implications through the whole 'stack'

Digital aspects of the stack (dashed lines in FIG. 1) overarch the hardware & include the different layers relating to the execution of the biomanufacturing protocol from top-level design tools (Biomanufacturing protocol & design/simulation tools) to embedded code controlling the hardware (Method of operation).

Digital editing tools are used in the whole stack and, due to the use of a fundamentally digital technique like 3D printing, enable an overall approach that reduces the design effort and risk associated with the development of new application specific biomanufacturing solutions.

The benefits of this approach mean the invention can exploit the design freedoms enabled by 3D printing to create multiple solutions to each biomanufacturing protocol yet each application specific biomanufacturing solution can still function on standardised hardware and execute standard software control protocols.

The abstraction perspective also enables further enables design activities (e.g. functional circuit design) to be decoupled from the 'back end' processes such as physical implementation and cartridge fabrication.

The abstraction approach to the architecture further enables continuous improvements to different aspects of the technology 'stack' to occur without requiring a fundamental re-design as each improvement is implemented. Therefore, the invention architecture has the benefit of enabling multiple smaller improvements to occur in parallel providing a larger cumulative performance improvement.

Figure 2:
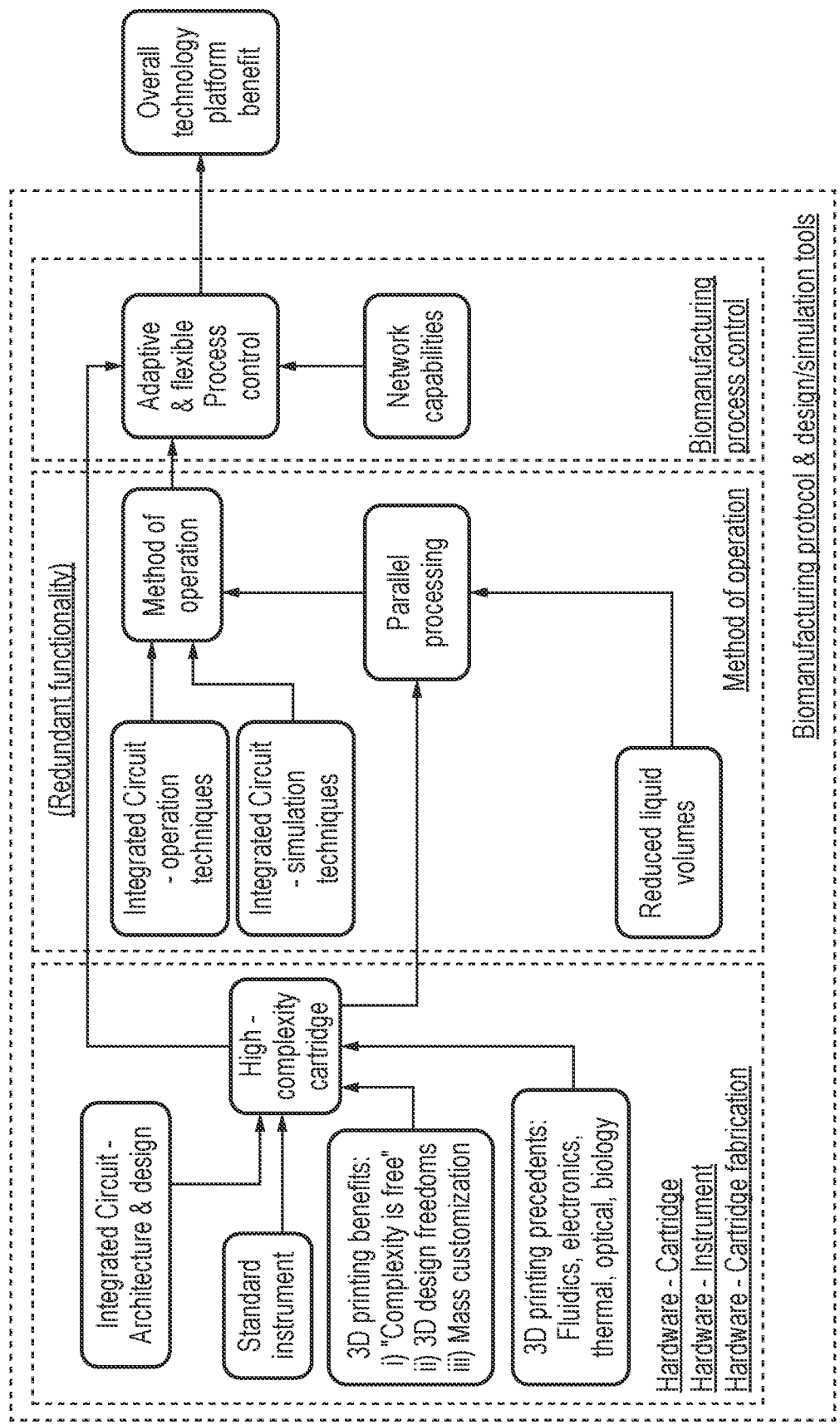
FIG. 2 is an overview of the benefits and enablers which feed into various aspects of the present invention.

Beneath each layer of the technology architecture are a number of enablers and benefits that build upon each other to enable embodiments of the present invention. An overview of the enablers and benefits at each layer of the stack is provided in FIG. 2.

Some of the benefits set out arise from characteristics of 3D printing/additive manufacturing techniques, including: freedom of design, the ability to embed functionality, hyper-personalisation and suitability for low volume manufacturing.

3D design freedoms enable miniaturisation and integration of functionality into new system architectures resulting in physical smaller biomanufacturing solutions for use closer to the point of use/need.

Digital fabrication also has a 'complexity is free' characteristic enabling creation of a wide range of different hardware options via the 3D printing process. This characteristic allows the addition of as many features/functions as required by a biomanufacturing protocol into a hardware design at a cost of virtually zero. This contrasts with conventional fabrication approaches to instrumentation where addition of additional features/functions increases costs, part count & manufacturing complexity.

The ability to print conductive materials simultaneously and in close proximity to polymer materials allows for the fabrication of multi-domain solutions (e.g. the thermal heater and fluidic reaction vessel components described in more detail below) simultaneously in the same fabrication process. This allows the functionality of a device to be embedded during the manufacturing process.

Hyper-personalisation or 'mass customisation' is enabled by digital fabrication and allows the creation of many different biomanufacturing technical solutions that can still fit within a standard interface on the hardware. This enables the 'standard-yet-flexible' approach described further in relation to the embodiments below.

Digital fabrication is also 'volume independent' in that one single unit of a design could be fabricated or a large batch of the same design could be fabricated. It is also possible to fabricate many different designs within one single fabrication run maximising production efficiency and utilising maximum production capacity.

The use of a standardised base-station or desktop instrument provides the interface for the operation of the application specific cartridges. The instrument can be a physically small, automated, desktop mounted device with a standardised cartridge interface to enable one 'universal' instrument regardless of bioproduct & biomanufacturing protocol.

This standardisation allows one device to run a wide variety of biomanufacturing cartridges via a standard interface which is operable with all cartridges.

In particular, the desktop instrument can simultaneously execute several biomanufacturing protocols via separate cartridges being run in parallel in a random-access fashion. This 'plug & play' type of approach enables a low-skilled user to effectively execute biomanufacturing protocols on the automated instrument with minimal intervention, effectively only requiring the user to plug in a particular cartridge, initiate the processing of that cartridge and return when the processing being carried out by the cartridge is complete.

The instrument has a built-in Graphical User Interface (GUI) for providing an overview of the progress of the biomanufacturing protocol being carried out in addition to collecting biomanufacturing process analytical data than can be transmitted (via wireless or fixed connection) to a cloud-based database.

The 'standard-yet-flexible' characteristics of both the instrument and the individual cartridges effectively allow one instrument to be used for a wide variety of biomanufacturing protocols. The hardware customisation for each biomanufacturing protocol is accommodated within the cartridge that still has a standardised instrument interface.

Embodiments of the present invention draw on principles from the Integrated Circuit (IC) industry where the accommodation of significant miniaturised and integrated functionality in a physically small package is a common challenge. Thus embodiments of the present invention include microsystem architectures with features such as busses, cores, caches designed to execute complex programs with minimal infrastructure.

Embodiments of the present invention provide modular cartridges having reactor functionality in order to enable one or more biomanufacturing protocols to be carried out in the cartridge. In particular, using the freedoms available through 3D printing and the adoption of architectures similar to those in the IC industry enables integration and miniaturisation leading to more hardware/infrastructure which allows more operations to be carried out at one given time in a physically smaller package.

The modular approach to the cartridge architecture enables 'modules' to be added/edited as required to create application specific biomanufacturing protocols.

Further, modules can be selected by software from libraries of proprietary modules. Standard modules for common biomanufacturing steps reduce cartridge design effort. New modules can be created to protect and enable proprietary biomanufacturing steps.

Externally, regardless of the specific application that they are designed for, the cartridges have a standard interface to the desktop device with an identical arrangement of interface components such as ports and connectors, whilst the cartridge internals are customised to the specific manufacturing protocol.

The modular approach can maximise reliability whilst reducing engineering development effort.

The cartridge architecture is also designed to be scalable to allow exploitation of either microfluidic or milifluidic approaches to reduce fluid volumes and improve process control.

A range of cartridge designs or 'engines' can be created for different biomanufacturing applications each with a characterised 'baseline' design with known performance. The benefits of starting from a known cartridge performance baseline include improved reliability, reduced development risk and reduced engineering development effort.

Further exploitation of the 'complexity is free' aspect of 3D printing is the addition of redundant functionality within a cartridge that can accommodate multiple scenarios within a biomanufacturing protocol even if there is the possibility that some functionality may not be used during protocol execution. This contrasts with traditional biotech consumables and microfluidics where greater complexity/functionality typically results in larger cost and thus bulk operations are carried out sequentially.

Redundant functionality allows flexibility for execution of the biomanufacturing protocol and enables the ability to respond to the behaviour of the biological material as it is processed.

For example, a particular biomanufacturing protocol may have four possible execution routes, only one of which will be fully executed to produce the desired product. However, it may be unclear which one will be executed when the protocol commences. In embodiments of the present invention one cartridge design accommodate all four alternative protocol execution routes. Although only 25% of the cartridge functionality may be used, it is unclear which 25% so all possible options are accommodated. This optional functionality is described in more detail below.

Traditionally biomanufacturing is carried out in bulk volumes (e.g. 1 L, 5 L, 50 L etc.). However, most biomanufacturing processes require a high level of process control, and so it is therefore desirable to break bulk fluid volume into smaller liquid volumes. For example a 1 L volume could be broken into 2×500 mL, 4×250 mL, or 5×200 mL volumes depending on steps required.

Smaller liquid volumes enable a greater degree of control over biomanufacturing sub-processes (and sub-sub processes) leading to greater process control over sub-process execution and resulting in a higher level of quality for the final bioproduct.

In certain embodiments, the combination of a high-complexity cartridge and reduced liquid volumes allows more operations to be carried out in parallel. For example, multiple shorter paths can transport separate reagents in parallel as opposed to one at a time in a longer fluidic path.

A high complexity cartridge and reduced liquid volumes enable a biomanufacturing protocol broken into many sub-processes and sub-sub processes. This in turn enables greater control over scheduling and use of resources and enables biomanufacturing protocols to be carried out in a radically different manner compared to the current state of the art;

For example, large steps and/or operations can be broken down into sub and sub-sub steps with a greater quantity of smaller operations, each carried out in a short a time as possible. This can enable parallel processing of certain operations and can exploit the 'complexity is free' benefits of 3D printing discussed above.

Parallel operations are also common in the integrated circuit sector where techniques such as process clocks, resource scheduling and core-threading have been developed. Application of similar techniques in the biomanufacturing field can allow optimised execution of complex biomanufacturing protocols in parallel using a high-complexity cartridge.

Similarly, techniques such as simulation from the IC sector are applicable in respect of the biomanufacturing devices and process of embodiments of the present invention. These can allow analysis of designs in term of throughput, overall complexity, cost etc. prior to physical fabrication by enabling a high-complexity system to be broken down into more tractable subtasks, encompassing both: architectural system simulation with functional macro modelling of sub-systems and circuit component simulation with lumped-parameter nodal modelling of fluidic, electronic, thermal etc. elements.

Thus embodiments of the present invention include system-level performance analysis methodologies and that incorporate phenomenological laws from multiple disciplines to characterize dynamical behaviour ranging from overall application execution to system architecture to individual component operation.

Instructions for carrying out a protocol in a cartridge can be executed in multiple ways that can automatically modified as required in an adaptable manner. Adaptable protocol execution is enabled by the feedback obtained from various sensors in the cartridge and the in-process analytical data these sensors create. The computer controller located in the base station is able to act on this in-process data and adapt the overall protocol execution to suit. This allows, for example, accommodation of variable quality raw material.

Such methods may include using cartridges which have the ability to accommodate redundant functionality for multiple biomanufacturing protocol execution scenarios even if ultimately one execution scenario occurs and only requires use of a small amount of overall cartridge functionality. This inherent ability to accommodate different protocol execution options provides a high degree of flexibility for the overall process control. It also enables the execution of multiple protocol execution routes in parallel for early protocol steps before then executing the singe optimal execution route for latter biomanufacturing protocol steps.

As such the technology platform is capable of accommodating variable quality starting raw material (e.g. raw biological material obtained from patients). Several protocol execution routes can be explored in early protocol steps before the optimum route is then selected.

The benefits enabled by this functionality are also amenable to the use of additional techniques and approaches such as machine learning and artificial intelligence to determine the preferred or optimal execution scenario. Data from individual cartridge operation may also be fed back to a central location in order to be used for continuous improvement of such techniques.

Indeed, the options exist to implement numerous sensors in each cartridge for the collection of operational data. The sensors are identified at the cartridge design stage and can be made specific to particular parameters required for that biomanufacturing protocol. The collection of large amounts of metadata specific to each step of each protocol is beneficial for the longer-term use of AWL and the creation of training sets.

The inherent flexibility of the cartridge hardware provides the ability to connect several cartridges together on a single instrument or base station. This may be done, for example, for the execution of a complex biomanufacturing protocol (i.e. the two cartridges effectively act as a 'super cartridge') or for simultaneous execution of two batches of the same biomanufacturing protocol that may be required at the same time or in a controlled manner (e.g. batch 2 should be available X hours after batch 1 has been produced and not before).

The ability to network the cartridges together on the same instrument provides a significant degree of flexibility allowing one single instrument the ability to run e.g. 5× separate biomanufacturing protocols (each a different cartridge) or run 1× very complex biomanufacturing protocol via 5× connected and synchronised cartridges.

It will be appreciated that the above examples of the numbers of parallel or connected cartridges are provided solely for illustration and are not to be considered limiting. The skilled person will appreciate from the present description that any number of cartridges could, in principle, be executed in parallel or in combination, solely limited by the design of the base station or instrument.

Similarly, whilst the above description has focused on multiple cartridges being operated on a single instrument or base station, this ability to network is not limited on a cartridge-to-cartridge basis but also applies at an instrument-to-instrument level with potential for multiple instruments to be networked together. For example, a highly complex biomanufacturing protocol may require fifteen sub-process, each sub-process being complex in its own right. This might be achieved by networking three instruments together each capable of accommodating five cartridges thus enabling the simultaneous execution of the desired fifteen sub-processes in parallel.

In certain embodiments digital network capabilities may be used to allow multiple geographically-disparate cartridges and/or instruments to be connected in a virtual network to enable the execution of decentralised large-scale experiments. This arrangement may be particularly useful for bioproduct R&D where the experimental space could be extremely large and the ability to run the significant number of experiments in parallel at one location is challenging.

Biomanufacturing Protocol and Design/Simulation 3D printing is fundamentally a digital technique, and so fabricating biomanufacturing hardware via an underlying digital techniques such as 3D printing enables a direct link between biomanufacturing process data and the hardware used. This enables the optimisation of biomanufacturing hardware based on actual biomanufacturing data and can overcome problems with current inflexible biomanufacturing solutions.

The link between biomanufacturing process data and the biomanufacturing hardware is enabled by the use of digital editing tools to integrate the various elements of the invention described in this section and enable the creation of application specific biomanufacturing hardware.

The use of digital editing tools can have significant benefits such as the ability to design & simulate different biomanufacturing hardware options for each specific biomanufacturing protocol in a digital manner. This approach can reduce the design effort and risk associated with the development of new application specific biomanufacturing solutions.

The digital tools provided in embodiments of the invention include a biomanufacturing process editor software program that guides non-specialists (i.e. those without in-depth biomanufacturing knowledge) through the creation of a high-level biomanufacturing protocol from existing manufacturing 'modules' and a hardware design editor that translates the output of this process editor into a physical cartridge design that can be used on the instrument.

Once the application specific biomanufacturing cartridge has been designed, developed and fabricated, data generated by use of the cartridge flows back into the digital tools allowing identification of optimisation opportunities for the biomanufacturing protocol. This then allows the underlying cartridge design to be updated exploiting the digital link between biomanufacturing process data and the biomanufacturing hardware.

The digital tools are held on a central platform thereby allowing multiple external parties to build application specific biomanufacturing solutions more rapidly, faster and cheaper than developing their own in-house products/solutions.

Having multiple external partners allows the platform to pool learning and developments across the biomanufacturing sector. This can provide significant benefits by reducing development time, effort and costs and enabling partners to progress more effectively with the platform than without the platform. This can also reduce technical risks via the use of proven modules and solutions to common challenges.

PCR Cartridge Embodiment

An embodiment of a modular reactor or "cartridge" according to an embodiment of the present invention will now be described. This is an embodiment of the 'Hardware—Cartridge' within the context in the hierarchy illustrated in FIG. 1.

The cartridge of this embodiment is arranged to perform PCR and embodies a number of the enablers discussed earlier in this document.

3D printing benefits ('complexity is free' etc.) enable a high degree of miniaturisation & integration of 3D printed functionality (e.g. fluidics, electronics etc.) within an individual cartridge. To maximise the miniaturisation and integration benefits, certain techniques are provided which are adapted from other technical sectors where integration and miniaturisation are routine challenges, in particular the integrated circuit industry.

The cartridge design is based upon the topology used in conventional Integrated Circuit (IC) architecture. Key features of the IC architecture which have been adapted for implementation in the cartridge of the present embodiment include:

A ring bus which enables the transport of 'packets' of data around the IC in parallel.

A plurality of cores, each being a specific area of the device for carrying out the execution of a (computational) task.

A plurality of caches. Each core has one or more caches that store packets of data close to the core prior to use with packets transported to the core whilst the previous computational task is carried out. Holding the packet adjacent to the core just prior to use speeds up the execution of the computational task and reduces overall system latency.

A clock cycle. The IC executes multiple packet transport and storage operations in parallel with cores performing computational tasks, all of which are synchronised by a system clock which helps to ensure optimal use of all IC resources.

It will be appreciated that the high complexity PCR cartridge of this embodiment is merely provided as an example of the many possible cartridges which form embodiments of the present invention. Cartridges according to particular embodiments adhere to a common architecture with several common features including their modular architecture, a standard cartridge framework and a standard cartridge packet and addressing convention.

Figure 3:
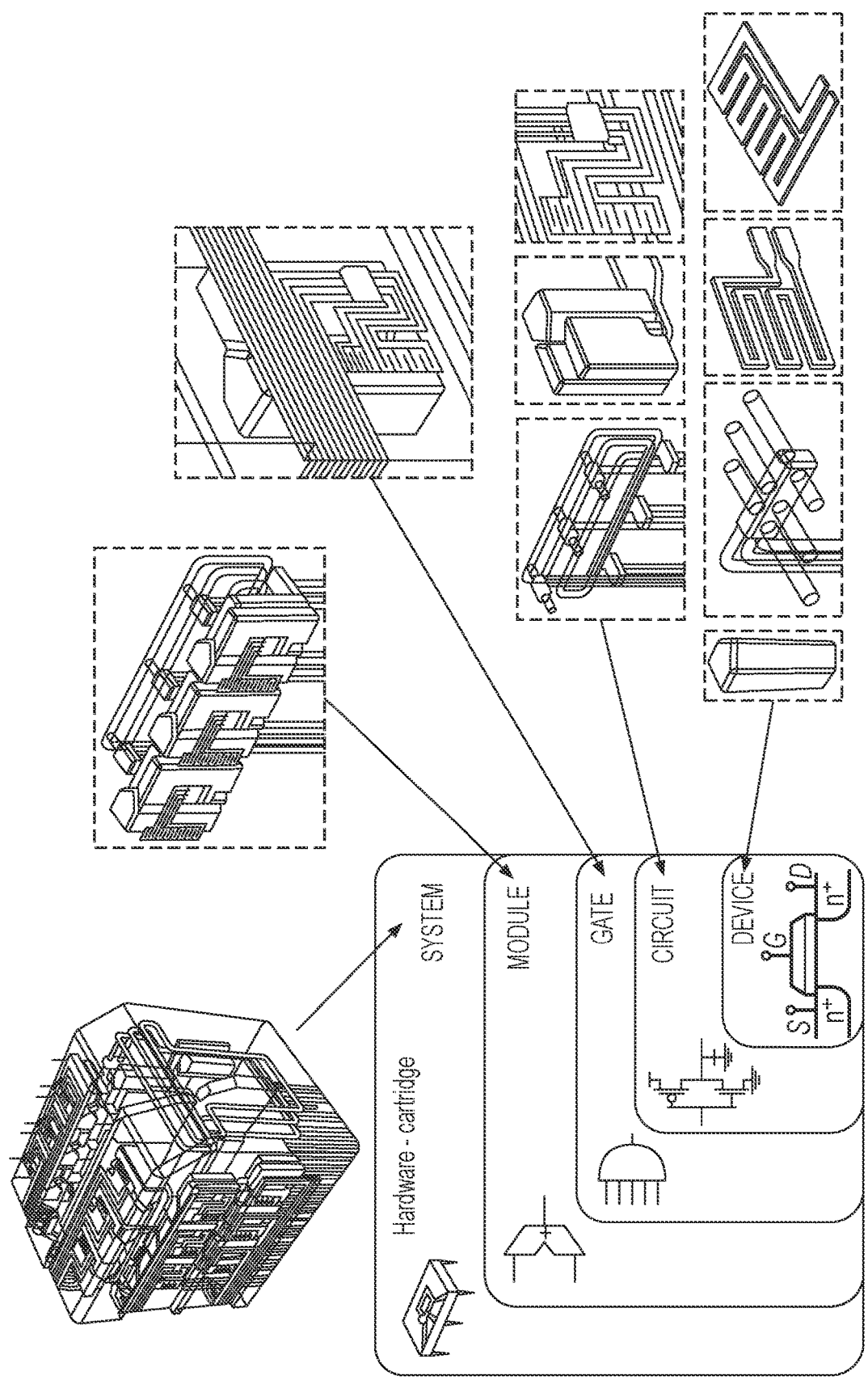
FIG. 3 is an illustration of various components of the modular architecture of a cartridge according to an embodiment of the present invention.

The cartridge modular architecture enables many cartridge variants by defining different levels in the hierarchy such as Devices, Circuits, Gates and Modules as illustrated in FIG. 3.

The definition of hardware levels and interfaces make it easier for hardware and software to interoperate. This standardisation enables commonality across the cartridges, instruments and protocols, whilst allowing integration of the application specific modules.

The cartridge modular architecture also enables backward compatibility allowing the re-use of different cartridge elements (e.g. Devices, Circuits, Gates and Modules) to reduce the time, effort and cost of developing new application specific cartridges.

The standard cartridge framework is a single framework capable of enabling an infinitely configurable range of cartridges for specific applications, specific bioproduct R&D experiments, specific biomanufacturing protocols, multiple fluid volumes and/or specific chemical synthesis reactions (e.g. API manufacture in small molecule medicines).

Figure 4A:
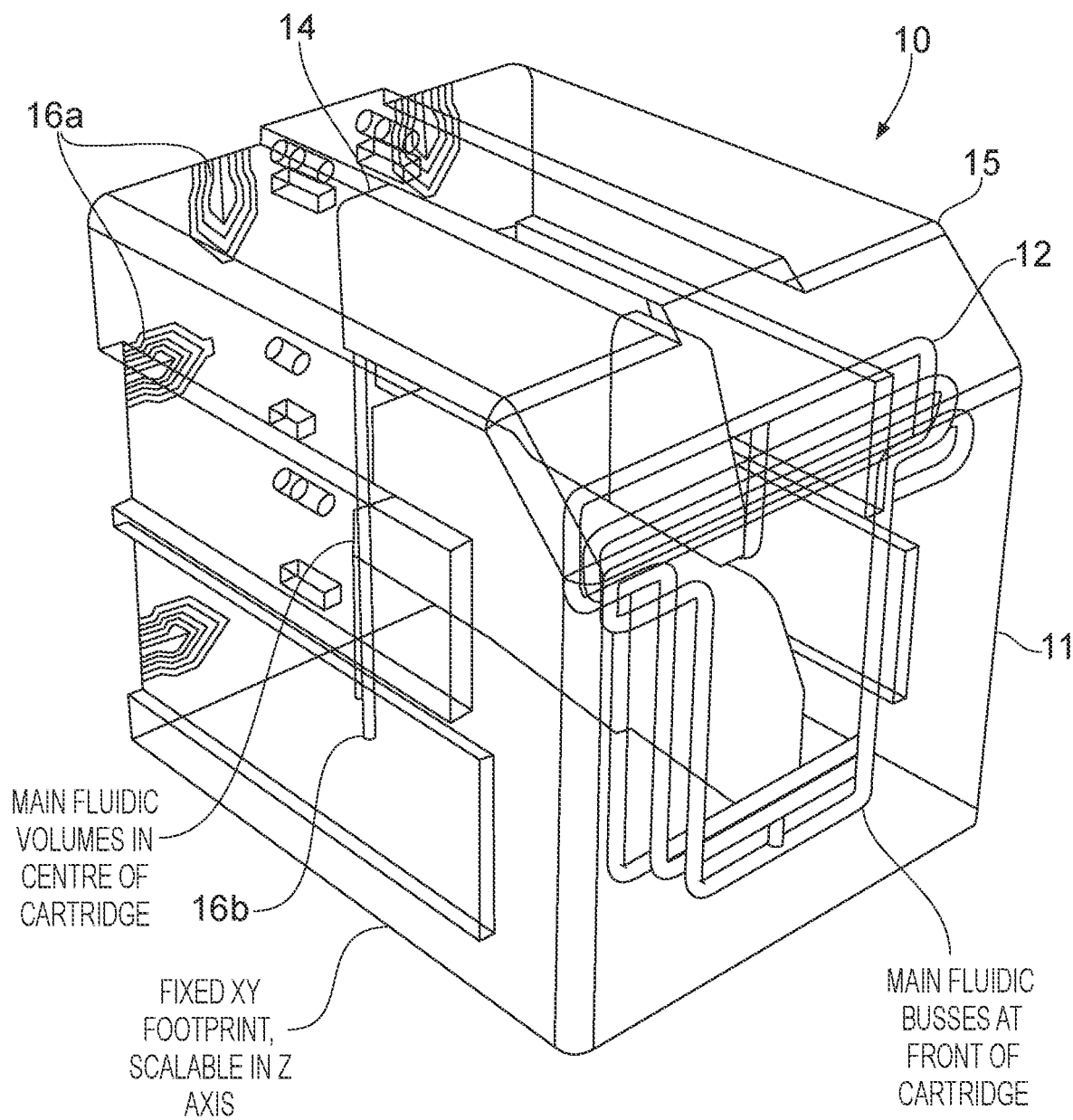
FIGS. 4A and 4B are schematic drawings illustrating some of the key physical features of a cartridge according to an embodiment of the present invention.
Figure 4B:
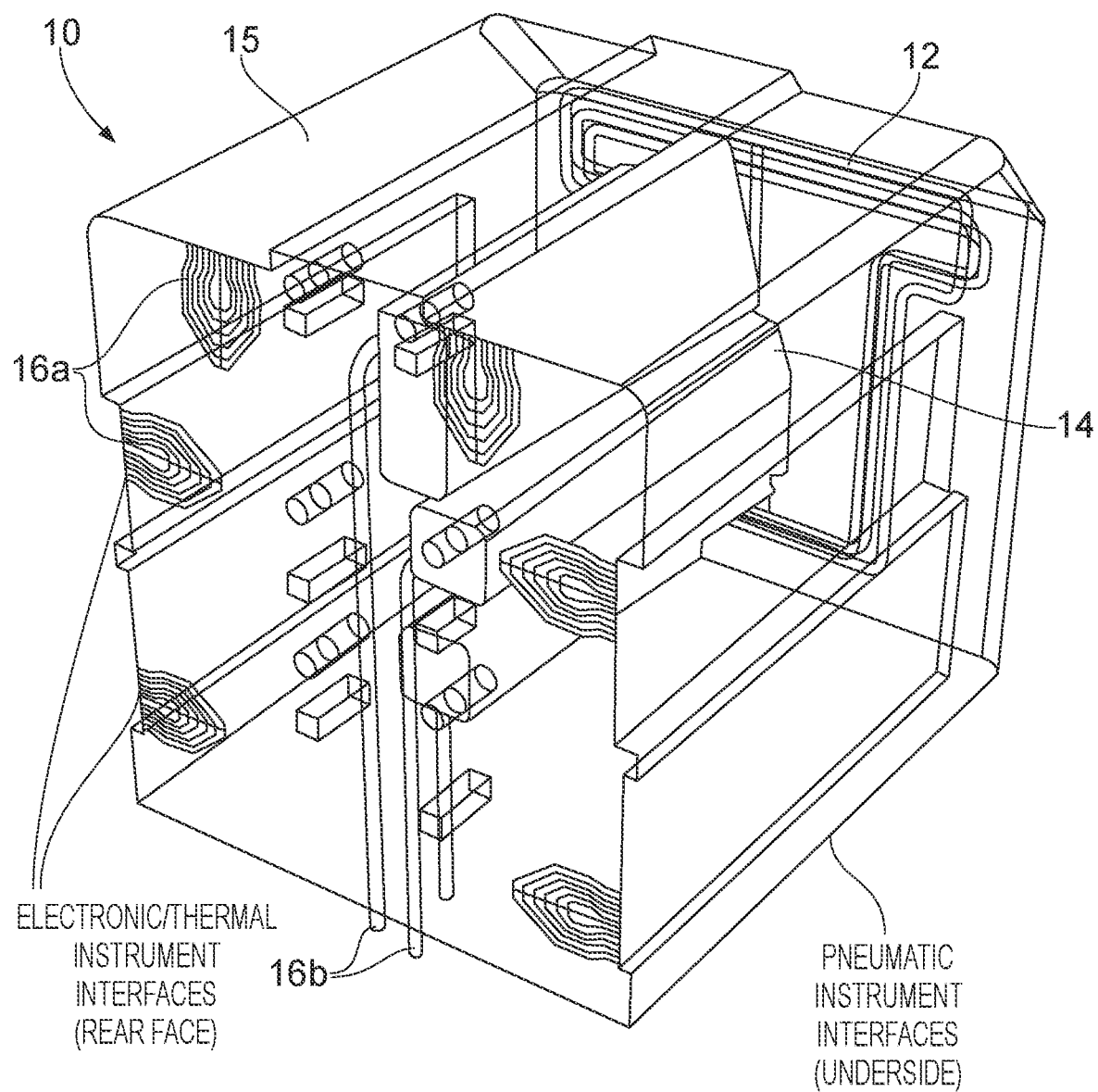

The cartridges all provide standardised features including a standard interface to the instrument (ports, connections etc.), and the ability to network with other cartridges on same instrument, and can support different levels of hardware in the cartridge The key physical features of the standard cartridge framework are illustrated in FIGS. 4A and 4B which show a cartridge 10 including a plurality of fluid paths or "buses" 12 and a plurality of volumes 14, all contained within an outer housing 15. The outer housing 15 has a plurality of interface points 16 which include ports 16a for fluid input/output and connectors 16b for electrical, thermal, pneumatic and/or optical connection to the instrument or base station. FIG. 4B shows a reverse view to that in FIG. 4A so that the interface points 16 can be more clearly seen. It can be seen in the example of FIGS. 4A and 4B that a particular cartridge 10 will not necessarily have internal components connected to each of the interface points 16. It will be appreciated from the detailed description below that the cartridge shown in FIG. 4 is a highly simplified embodiment in order to show the structure and arrangement of components.

The cartridge 10 has a fixed footprint in the horizontal plane (X-Y) as shown in FIG. 4, and may have a fixed vertical dimension as well, or may be scalable. The fixed footprint facilitates modular engagement with the instrument or base station. If the cartridge is scalable in the vertical dimension, then the interface points 16 are all located within the minimum vertical height and/or on the underside of the cartridge 10 so that they are always present to engage with corresponding interface points on the base station.

Thus the cartridge 10 has a standard framework in terms of the physical size and configuration (in particular the interface points 16), but has effectively infinite possibilities for its internal configuration with each configuration of internal components being customised to a particular application area.

Example applications for the cartridges include bioproduct R&D experiments and investigations such as: bioproduct design, build, test cycle including synthetic biology; design of experiment (DoE) approaches to experiments via broad techniques such as PCR and flow cytometry; cell characterisation and cell screening experiments (e.g. for cell variants with desired traits); biomanufacturing protocol development; bioproduct/therapy manufacturing; manufacturing protocol steps; upstream processing (i.e. cell culture); downstream processing; manufacturing quality assurance (QA) processes.

Variants of the cartridge architecture may also be customised to the application area where bioprocessing parameters and desired end bioproduct can differ between applications. Examples include; medicines manufacturing; cell therapies; gene therapies; vaccines; traditional biotherapeutics (e.g. antibody based medicines, insulin, biosimilars etc); biofuels; niche bioproducts; high value fragrances; speciality foods; chemical synthesis reactions; API manufacturing for small molecule medicines, generics etc.

Figure 5A:
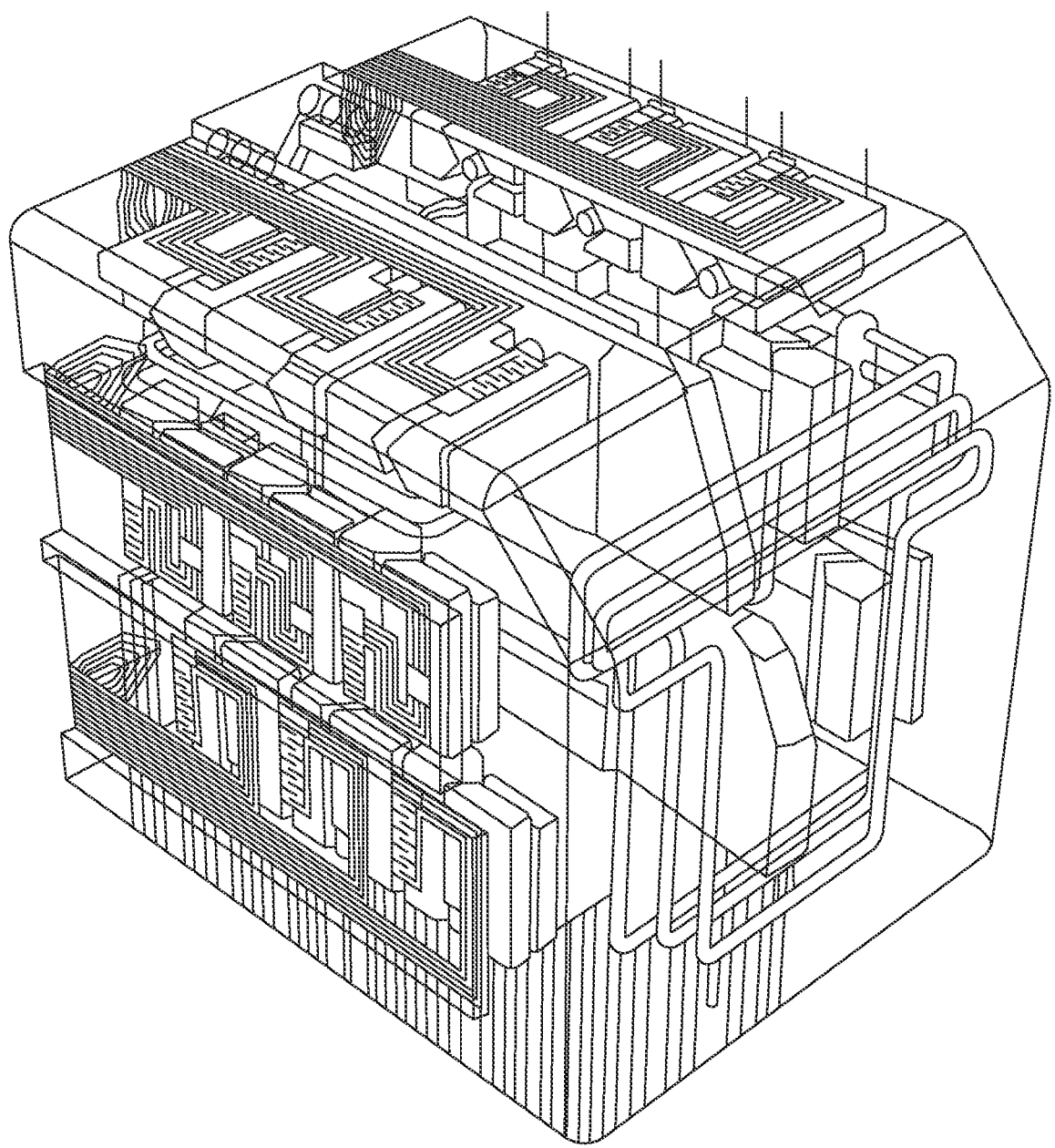
FIGS. 5A and 5B are drawings of a cartridge according to an embodiment of the present invention.
Figure 5B:
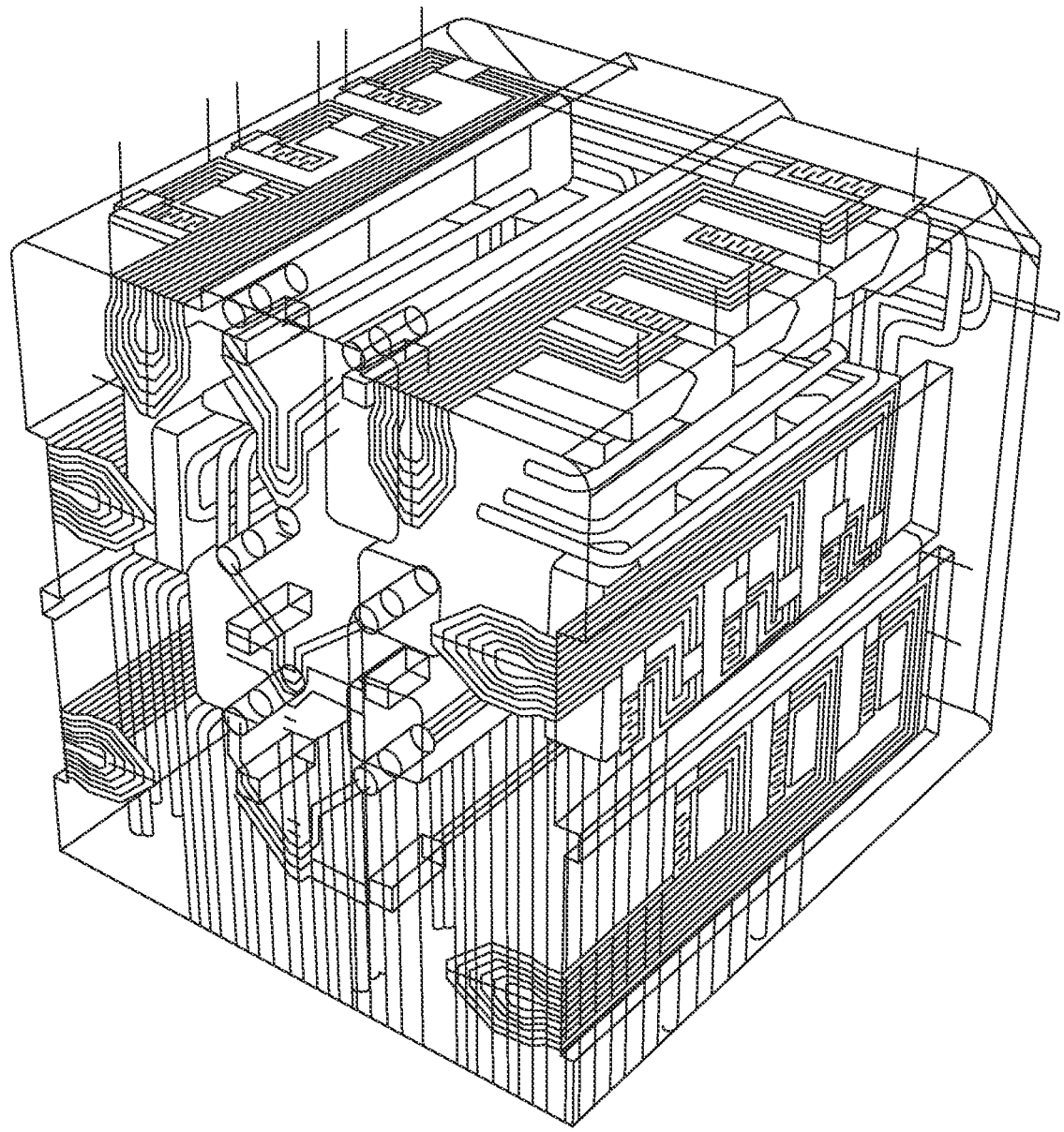

The specific embodiment of the standard cartridge architecture described above is a high complexity PCR cartridge. The overall design of the high complexity PCR cartridge according to the present embodiment is shown in FIGS. 5A and 5B. This embodiment, described in more detail below, is based upon the polymerase chain reaction (PCR), a ubiquitous life science technique that is discussed in this case in a bioproduct R&D scenario.

PCR is used a vehicle to illustrate the high complexity cartridge as it is a common technique and eliminates the need for the introduction of any new complex biomanufacturing techniques. However, it will be appreciated that this embodiment is just one way a high-complexity cartridge can be embodied.

Figure 6:
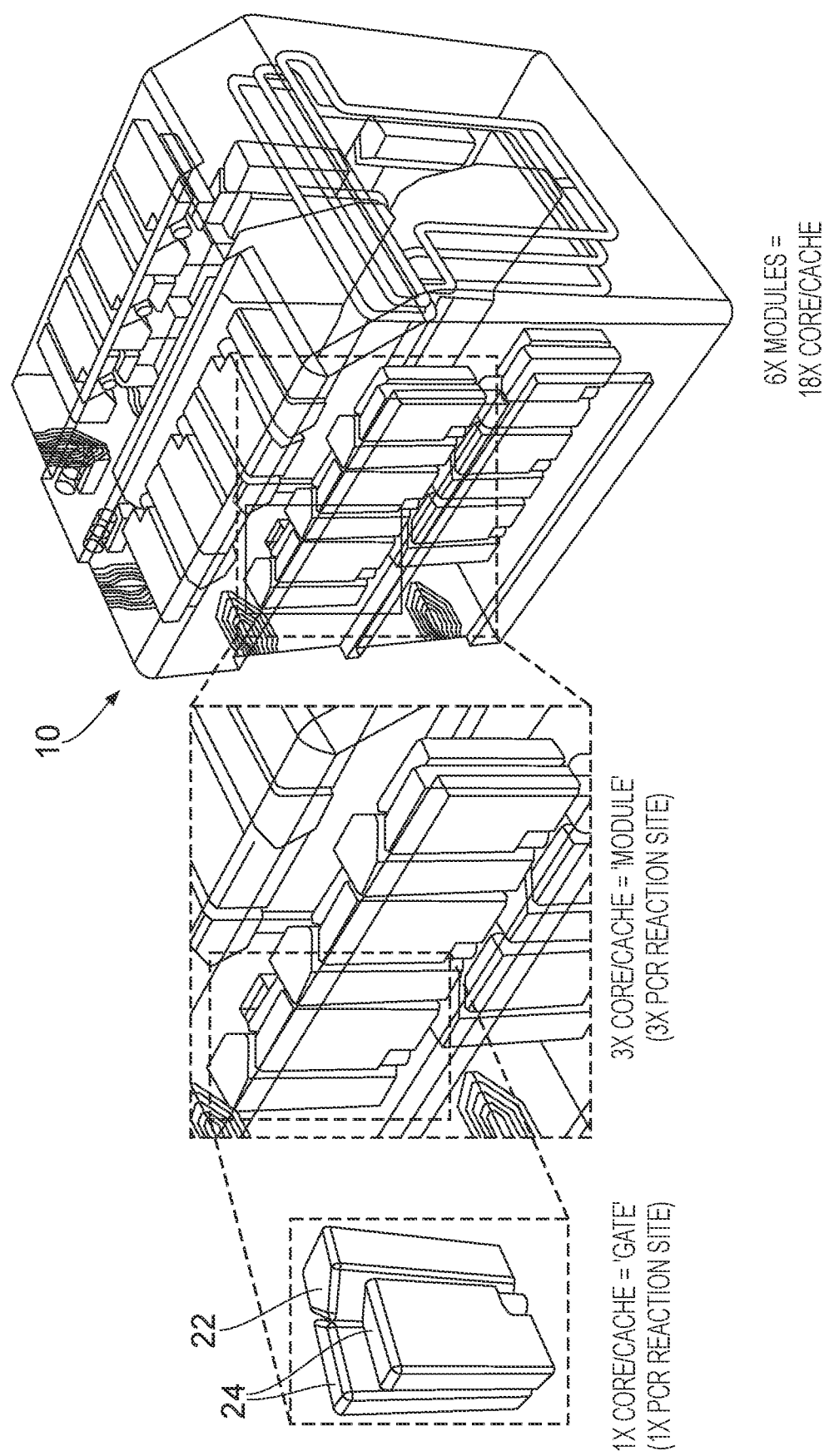
FIG. 6 is a schematic showing the major functionality of the cartridge of FIGS. 5A and 5B.

The high complexity cartridge is embodied in a physical design of the cartridge shown in FIG. 6 with key modules identified and detailed components removed for clarity. This shows how individual "modules" (such as a combination of a core 22 and a cache 24) can be used to build up parallel processing potential in the overall cartridge 10.

A physical addressing strategy is provided which enables the identification of any one of the 18 core/cache modules within the cartridge by using the following convention (as shown in FIG. 7):

[horizontal position], [vertical position], [number]

E.g. each core/cache module has a reference such as core/cache: [left], [middle], [1] or core/cache: [right], [lower], [3]

The high complexity PCR cartridge comprises a number of core building blocks enabled by 3D printing and referred to as 'Devices' with functionality in the following domain areas: fluidic; pneumatic; electronic; thermal; optical; and biology.

Each Device typically carries out a domain-specific function, whilst these Devices can be used in isolation they are more commonly used in in combinations as described in more detail below. The position of Devices in the abstraction hierarchy is shown in FIG. 1.

As 3D printing is a digital technique it is possible to digitally edit Device designs enabling the creation of parametric/scalable Device designs to suit different fluidic volumes and/or protocol steps and providing the ability to rapidly re-configure & create new variants of Device. The creation of new Devices and variants of existing Devices over the medium to longer term will enable expansion of Device libraries reducing overall cartridge development time, effort & cost.

Fluidic Devices

Fluidic Devices enable the storage, transport, modification (e.g. mixing of several liquids) and processing of liquid volumes within the cartridge.

Reagent Storage Device

The high-complexity PCR cartridge has three liquids stored in the cartridge: a sample; a buffer and nuclease-free water.

Figure 8:
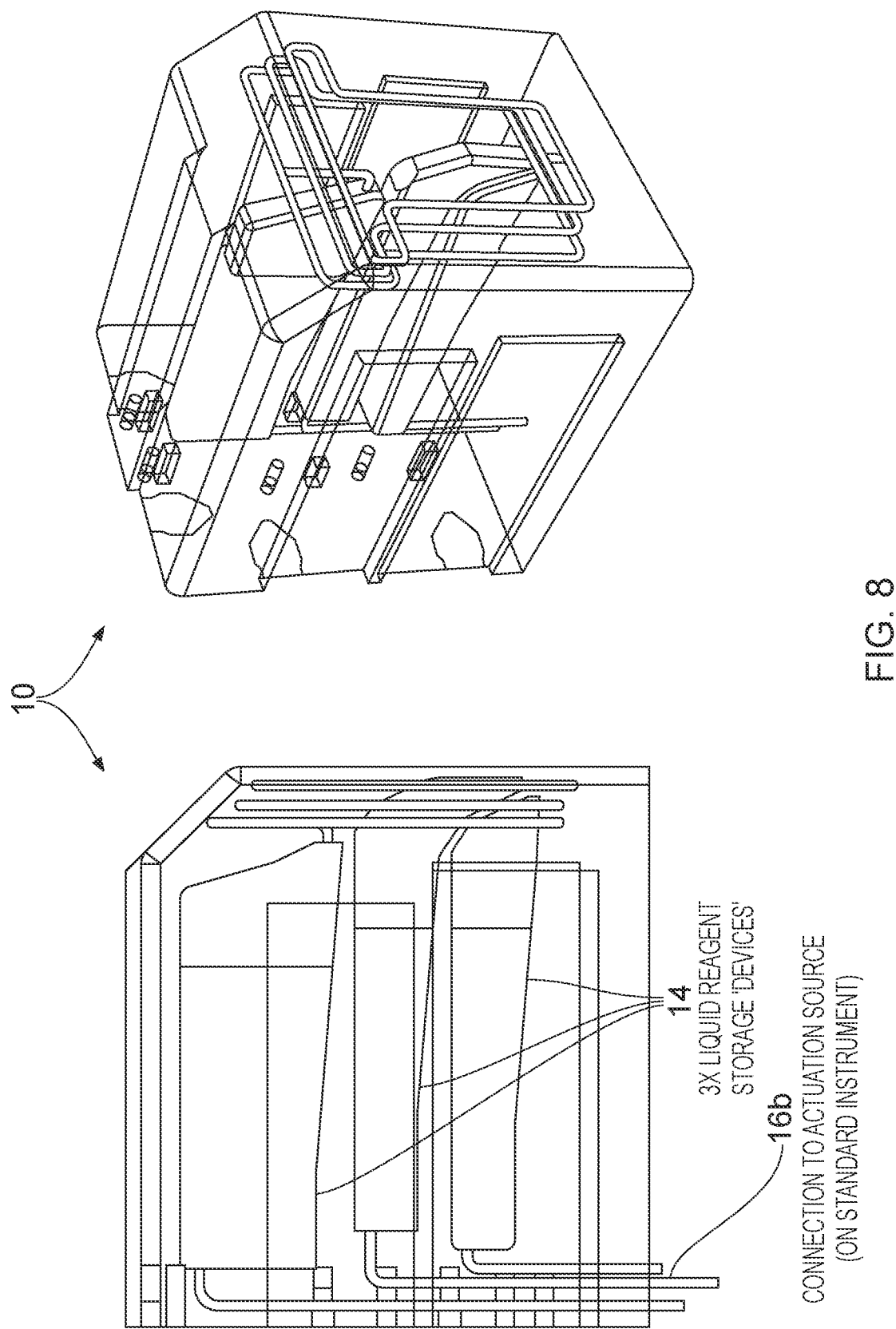
FIG. 8 shows how reagent storage devices are arranged in the cartridge of FIGS. 5A and 5B.

The reagent storage device provides a volume within the cartridge body to hold a given liquid volume. It may also allow for the insertion of the liquid volume prior to or during the cartridge fabrication process. FIG. 8 shows how the reagent storage devices 14 are arranged in the cartridge of this embodiment (with the other components largely stripped away for clarity).

Reagent storage devices provide a connection to the relevant fluidic bus to enable transportation of the liquid to other locations within the cartridge and will also provide a connection to an actuation source to provide the motive force for transportation of the liquid around the cartridge.

Reagent storage devices may provide a filtered vent function to allow the evacuation of displaced gas as the reagent volume is filled with liquid (described in more detail below).

The reagent storage volume consists of a void of material within the cartridge body (a volume not filled/created during the additive manufacturing process) with additional functions (e.g. a filtered vent) fabricated into the void or the surrounding material.

Multiple configurations are possible; the geometry and physical shape can be altered to suit the liquid volume and its particular properties (e.g. viscosity). The shape of the reagent storage can be modified to suit space constraints within the cartridge resulting in the use of irregular shapes. This can be useful where space is at a premium and can be used to enable a compact overall cartridge volume.

Storage volumes can range from one large reagent volume to several smaller sub volumes enabled by geometry.

The reagent storage device enables liquids to be stored in a volume sealed within 3D printed cartridge resulting in minimal or no leak paths which leads to a reduced risk of leakage and a reduced risk of contamination.

3D Parametric Filter Device

Liquid reagent volumes often require a vent path to allow displaced gas to escape. It is necessary to prevent the release of larger molecules at the same time gas escapes and filters are required on a vent to capture larger molecules.

The reagent storage device 14 has such a feature that consists of a suitable pore size (e.g. 20 µm). 3D fabrication enables pore size to be modified to suit the larger molecules of interest for each particular cartridge design. The pore size does not have to be uniform across the filter surface and may be modified to suit by various means (e.g. modification of actual pore size, modification of geometric construction that creates pores such as, but not limited to, a matrix type construction).

Filters may be fabricated from rigid materials, flexible materials or custom semi-flexible material blends that are enabled by 3D printing two materials simultaneously in differing ratios.

Fluidic Bus

The fluidic bus provides the means to transport liquid volume internally within the cartridge and operates in the same manner as a bus within an IC.

Figure 9:
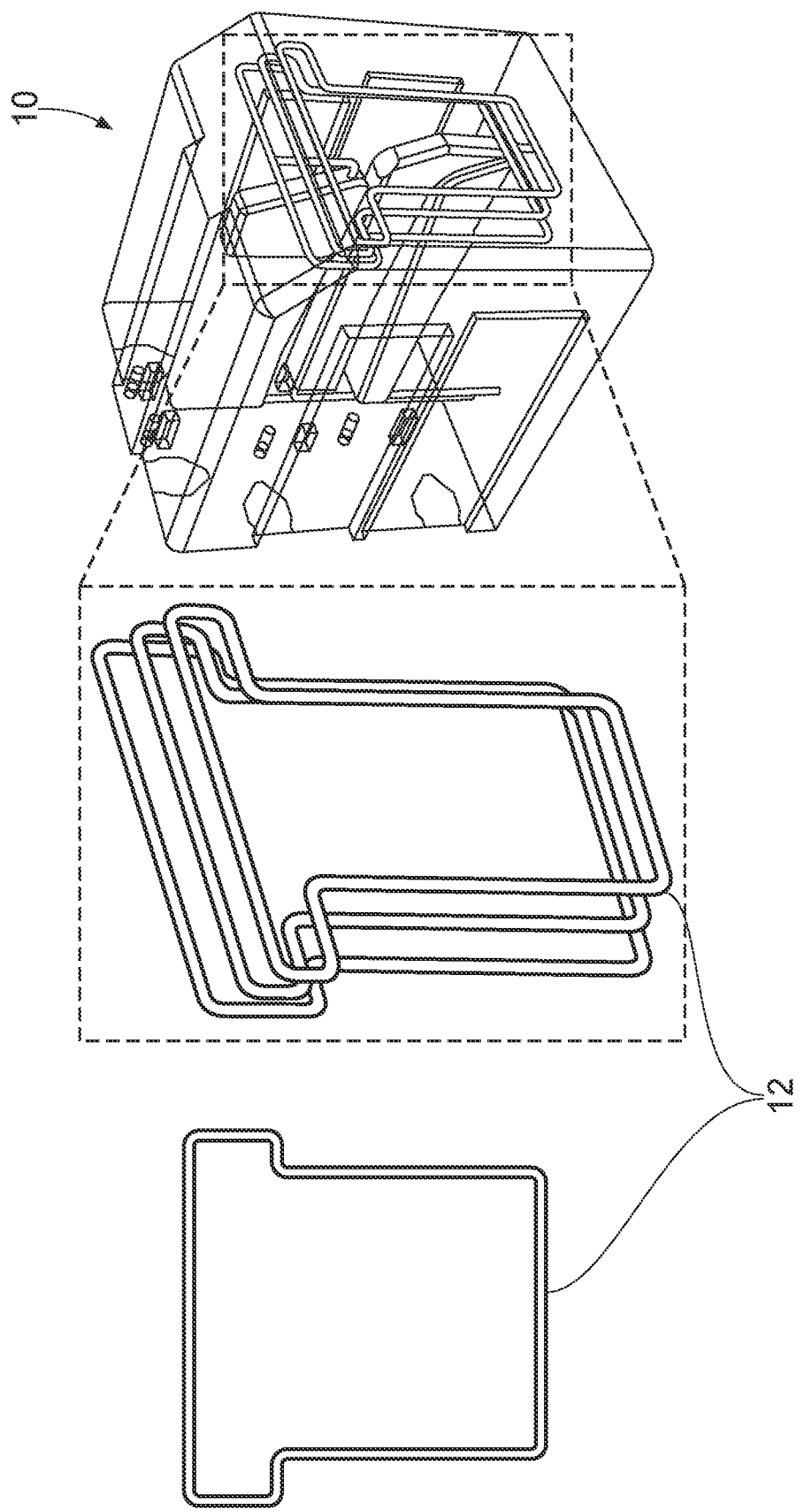
FIG. 9 shows how fluidic buses are arranged in the cartridge of FIGS. 5A and 5B.

The fluidic bus thus provides a means to transport liquids to different areas (or sub-areas) of the cartridge and in particular provides a fluidic connection between all major areas of the cartridge on one fluidic path. FIG. 9 shows how the fluidic buses 12 are arranged in the cartridge of this embodiment (with the other components largely stripped away for clarity).

The fluidic bus is capable of accommodating fluidic connection points to numerous areas (and sub-areas) of the cartridge and may have a vent function to allow the evacuation of displaced gas as the bus volume is filled with liquid.

As with the reagent storage, the bus consists of a void of material within the cartridge body.

Multiple configurations of the bus are possible and the size, geometry and physical shape can be altered to suit the liquid volume and its particular properties (e.g. liquid viscosity). The geometry and physical cross section of the bus can also be altered to suit the liquid(s) being transported.

Routing and packaging of the bus can be modified to suit space constraints within the cartridge resulting in the use of irregular shapes and single or multiple busses can be used together or in sequence.

Figure 10:
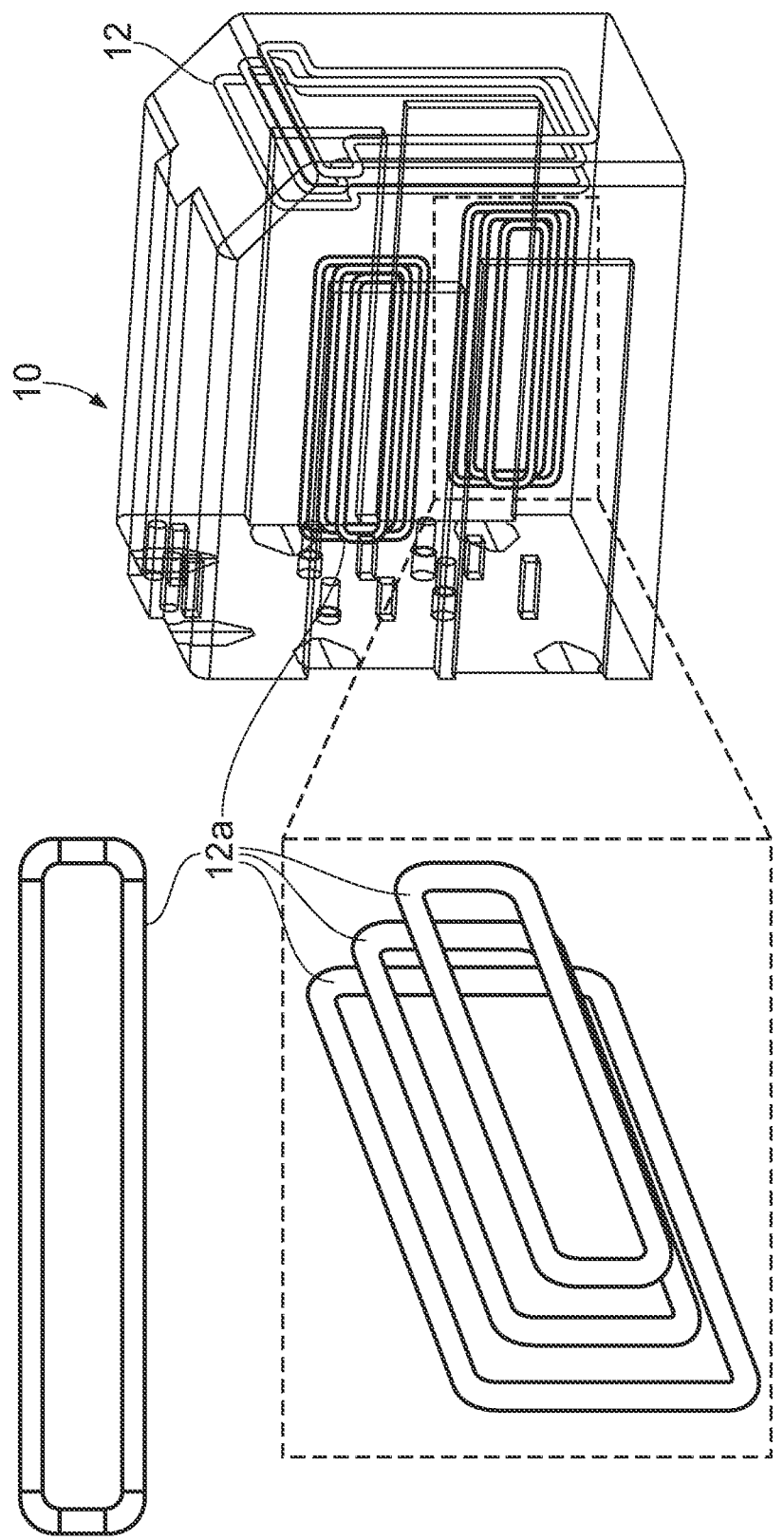
FIG. 10 shows the positioning of sub-buses in the cartridge of FIGS. 5A and 5B.

The bus may be embodied in a vertical orientation or a horizontal orientation (or indeed a mixture of the two, resulting in a 3D profile) and may be used in parallel with other busses to enhance the liquid throughput in the cartridge. Sub-busses arranged in parallel with a main bus can also be used. FIG. 10 illustrates the position of a number of sub-buses 12*a* within the PCR cartridge 10.

As the bus is contained within the cartridge body the need for separate fluidic tubing is eliminated which reduces assembly time and complication. Further, the bus design can be optimised to suit the particular liquid being transported.

Further, as the bus is contained within the body of the cartridge 10 (which is a high integrity container) it can be capable of withstanding high actuation pressures with minimal safety risk. Further the integrated manufacture of the bus within the body of the cartridge 10 significantly reduces or eliminates leak paths, particularly in comparison to tubing arrangements where each connection poses a leak risk, as well as reduced or eliminated risk of contamination.

Fluidic Mixer Device

Many biomanufacturing protocols require the mixing of two or more reagents (dried or liquid) and therefore the fluidic mixer device is described here even though it does not form part of the high complexity PCR cartridge embodiment The fluidic mixer device provides a tortuous 2D and/or 3D path through the body of the cartridge which promotes the mixing of at least two different fluids (liquid or gas).

As with the other fluidic components described above, the fluidic mixer consists of a features created by an absence of material in the cartridge body. The fluidic mixer device is connected to other fluidic devices (reagent storage, bus(es) etc.) through which fluids are supplied to the mixer and to which the results of the mixing are delivered. Actuators force the fluids through the 2D and/or 3D tortious path of the mixer.

Multiple configurations are possible and the geometry, physical shape and length of the 2D and/or 3D tortious path can be altered to suit the fluid volumes, mixing requirements and particular properties (e.g. liquid viscosity) as can the length of the tortious path.

The packaging of the 2D and/or 3D tortious path within the cartridge can be designed to suit space constraints within the cartridge resulting in the use of irregular shapes. In particular, the mixer device can be embodied in any 3D profile required, Multiple fluidic mixing devices could be used within a single cartridge, and each can be "tuned" to suit the specific requirements of the fluids which are to be mixed and/or the specific characteristics desired at a particular stage of a protocol execution Core Device In the high complexity PCR cartridge 10 the core device 22 acts as a reaction vessel where the PCR reaction is carried out. The core device 22 operates in conjunction with the cache device 24 described in more detail below.

Figure 11:
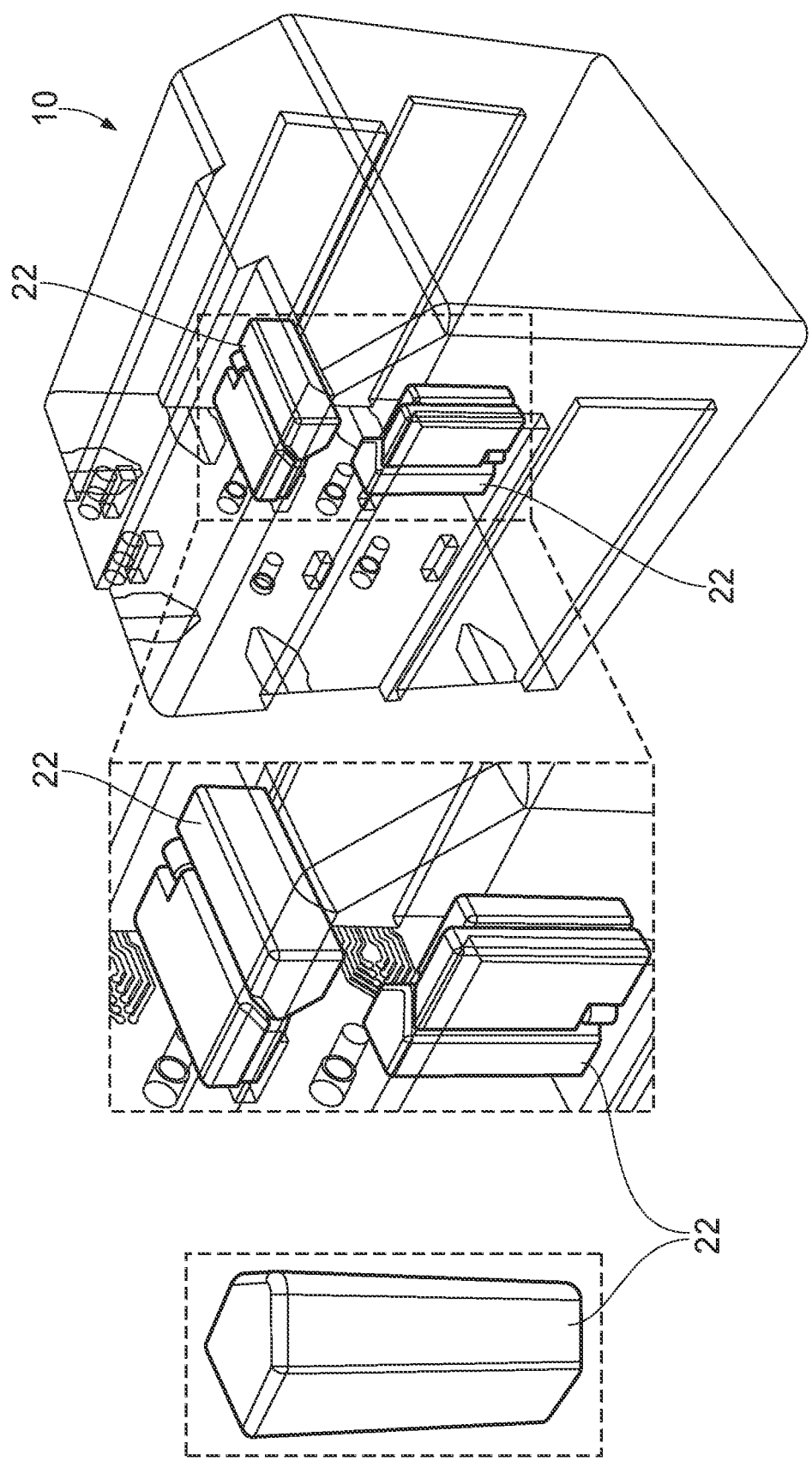
FIG. 11 shows an arrangement of core devices in the cartridge of FIGS. 5A and 5B.

The core device 22 provides a volume within the cartridge body 11 within which the PCR reaction can be carried out. It will be appreciated that cartridges designed for different reactions will also have core devices which will be adapted or configured for the specific reaction in question. FIG. 11 shows how the core devices 22 are arranged in the cartridge of this embodiment (with the other components largely stripped away for clarity).

The core device 22 has a fluidic connection to one or more cache devices to allow pre-stored liquids to be inserted into the core and a fluidic connection to a bus to enable the direct insertion of liquid to the core volume without use of a cache. It may also have a vent to allow the evacuation of displaced gas as the volume of the core device is filled with liquid.

As with the other fluidic components described, the core device 22 is formed as a void of material in the cartridge body. A range of configurations are possible and the size, geometry and/or physical shape can be chosen to suit the reaction liquid volume and its particular properties (e.g. liquid viscosity) and can also be configured or designed to provide favourable reaction kinetics.

The shape and configuration of the core device 22 can also be designed to suit space constraints within the cartridge resulting in the use of irregular shapes. Configuration options for a particular core device include a single large core device as well as several smaller sub-volumes enabled by the available space and geometry.

The core device 22 may be arranged to provide sufficient surface area to allow for integration of one or more associated devices, such as a thermal heater, which will enable or enhance the performance of the reaction in the core device.

Due to the flexibility in the size, shape and configuration of the core devices in each cartridge, each reaction site can be optimised to suit the particular reaction occurring at that site regardless of the other reaction vessels in the cartridge. This compares favourably with the use of, for example, 96-well plates in standard laboratory automation.

Further, the reactions taking place in the core device 22 occur within a sealed volume contained within the cartridge resulting in reduced or no leak paths and also a reduced risk of contamination.

Cache Device

In the PCR cartridge the cache device 24 allows material to be stored proximal or adjacent to a core device 22 prior to being used in a reaction in the core device 22. This enables pre-processing steps to occur (e.g. bringing to a given temperature prior to transfer into the core) and also reduces overall protocol execution times by reducing overall transit time to transport liquid 'packets' around the high complexity PCR cartridge.

Figure 12:
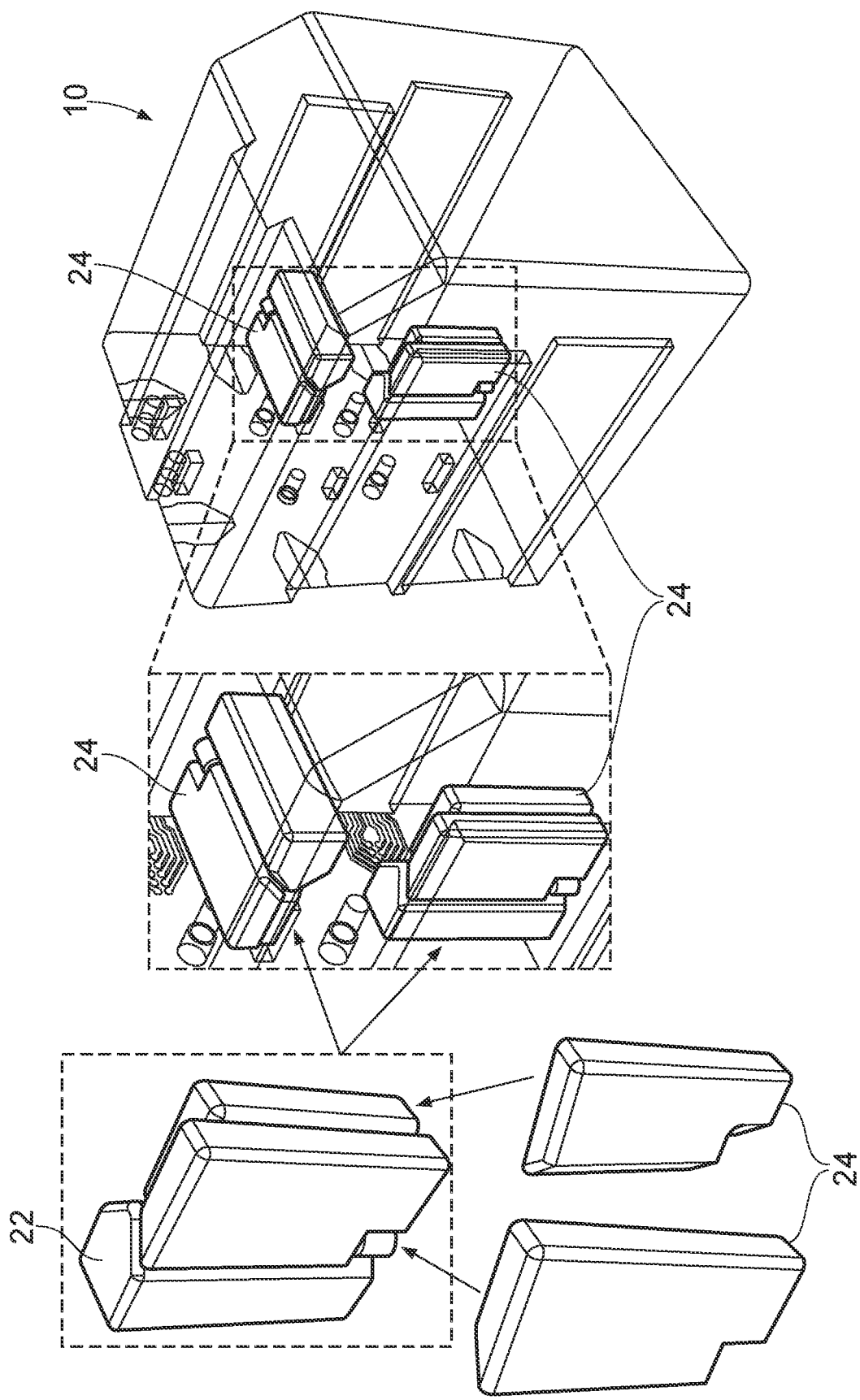
FIG. 12 shows an arrangement of cache devices in the cartridge of FIGS. 5A and 5B.

The cache device 24 provides a volume within the cartridge body to store fluid volumes and carry out pre-reaction processing on those fluid volumes prior to transfer to a core device to carry out the PCR reaction. FIG. 12 shows how the cache devices 24 are arranged in the cartridge of this embodiment (with the other components largely stripped away for clarity).

The cache device 24 has a fluidic connection to one or more core devices 22 to allow pre-stored liquids to be inserted into the core and a fluidic connection to a bus to enable the transfer of liquid "packets" into the cache device 24. It may also have a vent to allow the evacuation of displaced gas as the volume of the cache device is filled with liquid.

The cache device 24 may be arranged to provide sufficient surface area to allow for integration of one or more associated devices, such as a thermal heater, which will enable or enhance the performance of pre-processing steps in the cache device 24, for example by pre-heating reaction components prior to transfer to a core device 22.

The combined operation of the core and cache devices is described in more detail below.

As with the other fluidic components described, the cache device 24 is formed as a void of material in the cartridge body 10. A range of configurations are possible and the size, geometry and/or physical shape can be chosen to suit the reaction liquid volume and its particular properties (e.g. liquid viscosity) and can also be configured or designed to suit any pre-processing steps which are desired in the cache device 24.

Due to the flexibility in the size, shape and configuration of the cache devices 24 in each cartridge, each reaction site can be optimised to suit the particular reaction occurring at that site regardless of the other reaction vessels in the cartridge. This compares favourably with the use of, for example, 96-well plates in standard laboratory automation. It is also possible to implement the cache device as any of a single large cache to several smaller volumes to suit the geometry and available space. Arrangements with sub-caches arranged to feed to a larger cache may also be provided, for example if multiple materials are required and/or pre-processing operations are required prior to the main reaction.

Further, any pre-processing operations taking place in the cache device 24 occur within a sealed volume contained within the cartridge resulting in reduced or no leak paths and also a reduced risk of contamination.

Pneumatic Valves

The movement of liquid around the cartridge 10 is governed by valves 26 that open and/or close connections between busses 12 and cores 22/caches 24 and/or other components as required. The valves are pneumatically actuated by the base station through the connection between the cartridge & the manifold in the instrument. Various arrangements of valves 26 used in different portions of the cartridge 10 are shown in FIG. 13 with the surrounding components removed for clarity.

The valve 26 can be considered to be analogous to a transistor within an electronic circuit with the flow of current through the transistor controlled by a control signal.

The valves operate to control flow of liquid through a fluid path via opening and closing of the valve diaphragm. A control path is formed from the valve 26 to the exterior of the cartridge 10 which enables connection of the valve 26 to the base station or instrument via an interface point 16.

As with the other fluidic components described, the valves 26 are formed as a void of material in the cartridge body 10. In order to enable the operation of the valves, one or more elastomeric diaphragms are formed in the void.

The elastomeric diaphragm has a "non-active" position and is configured to remain in that position until activated. The diaphragm is activated by a pneumatic input (pressure), typically of compressed air, provided from and controlled by the instrument or base station which causes the diaphragm to move to one (or more) "active" positions. Removal of the pneumatic pressure allows the diaphragm to return to the "non-active" position. In certain arrangements, friction or other hysteresis effects may allow the diaphragm to remain in the active position even when no pressure is applied, or for a short time after the pressure stops being applied. In such circumstances, the diaphragm may be returned to the "non-active" position by the application of a reverse force (negative pressure or pressure in the opposite direction).

The valves 26 can be configured in two ways. A "normally closed" (NC) valve is arranged such that the flow of liquid through the valve is normally prohibited, whilst application of the pneumatic signal allows liquid to flow through the value for the duration the pneumatic signal is applied. A "normally open" (NO) valve is arranged such that the flow of liquid through the valve is normally allowed, application of the pneumatic signal prevents liquid from flowing through the value for the duration the pneumatic signal is applied.

As illustrated in FIG. 13, the number of fluidic channels controlled by the valve can be modified to suit the desired applications. Combinations of both NC & NO functionality may be integrated into a single valve body that may be controlling the flow of more than one liquid path.

Multiple configurations are possible for either NC or NO valves. The size, geometry and physical shape of the valve and diaphragm can be altered to suit the reaction liquid volume and its particular properties (i.e. liquid viscosity).

The valves and diaphragms can be arranged in any three dimensional profile required or desired. For example, each valve can be optimised to suit the particular liquids, flow rates, and biological material required at that site regardless of the adjacent valves. The configuration and profile can also be selected based on the surrounding components. The shape and packaging of the valve can be modified to suit space constraints within the cartridge resulting in the use of irregular shapes as required (not shown). This differs from the current state of the art microfluidic valves which are typically limited to flat two dimensions structures due to the lithographic fabrication methods.

The diaphragm profile, thickness and surface area can be chosen depending on the desired functionality and the elastomeric material used. Changes to these parameters will affect the dictating pneumatic pressure required and the response of valve. Changes to the profile may be used to create desired behaviour, such as double-action (closing one path whilst opening another).

The valve(s) are important components of the cartridges 10 of the embodiments of the present invention as they enable control or the movement and transfer of fluids around the other components in the cartridge.

Pneumatically operated valves simplifies the cartridge interface with the instrument by using mature pneumatic techniques. The valve design can also be rendered relatively simply in 3D printing. However, it will be appreciated that valves with electronically actuated components could be used instead of, or in addition to, the pneumatic valves.

The use of pneumatically driven valves allows all liquids to remain in the cartridge reducing the risk of contamination to bioproducts within the cartridge, reducing risk of instrument contamination and reducing instrument operator risk.

FIG. 13 shows examples of three types of valves.

The left hand drawings illustrate embodiments of main bus valves 26a. These control the flow of a sample or reagent to each 'block' of cores/caches. These valves 26a have 3 NC diaphragms mounted in one body with individual pneumatic control of each (via connectors 28). These enable flow of each liquid to occur as required, for example one liquid at a time or up to three liquids in parallel.

The middle drawings illustrate embodiments of cache control valves 26b. These control the supply of either sample or reagents into each cache. These valves 26b have 2 NC diaphragms mounted in a single body each with separate pneumatic control (via connectors 28). These enable single input into a cache or two inputs in parallel.

The right hand drawings illustrate embodiments of a core/cache module valve 26c. This controls the flow of liquid into the core from two different caches. This valve 26c has two NC diaphragms mounted in a single body each with separate pneumatic control. These enables contents of one or both caches to enter core volume, independent control of each allows different volumes of cache 1 and cache 2 liquid volumes to enter core depending on protocol required.

Further functionality may be provided by combining a quantity of valves together. Three examples of this are a multiplexer, a peristaltic pump and a mixer.

By combining a number of valves in parallel, each potentially with a differing number of inputs and outputs, into a single entity under one overall computer controller can produce a 'multiplexer' that enables a significant quantity of outputs for a relatively small quantity of controlled valves.

Figure 14:
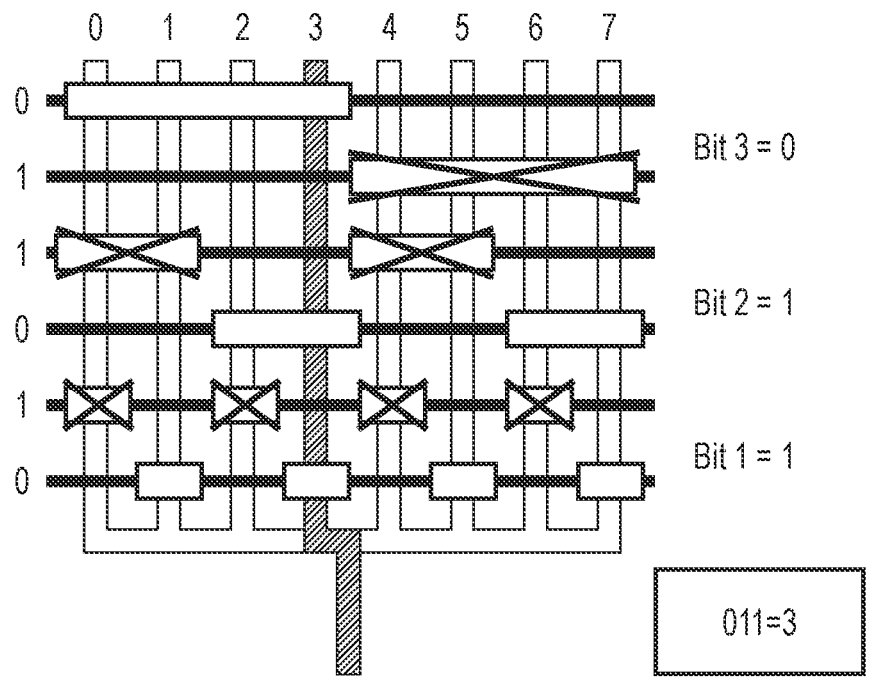
FIG. 14 is a schematic diagram showing how a plurality of valves may be combined in a multiplexer-type arrangement.

A schematic of an example of this kind of arrangement is shown in FIG. 14 for an essentially two dimensional arrangement of valves. Here three valves are used to control eight outputs. It will be noted that three dimensional design freedoms will enable new multiplexer designs that will differ significantly from the two dimensional design illustrated in FIG. 14.

A linear combination of three (or more) valves actuated in sequence enables a pump function to be created. Actuation of the valves in a pre-set sequence allows liquid to be forced through the valves in a manner resembling liquid actuated by a peristaltic pump.

Figure 15:
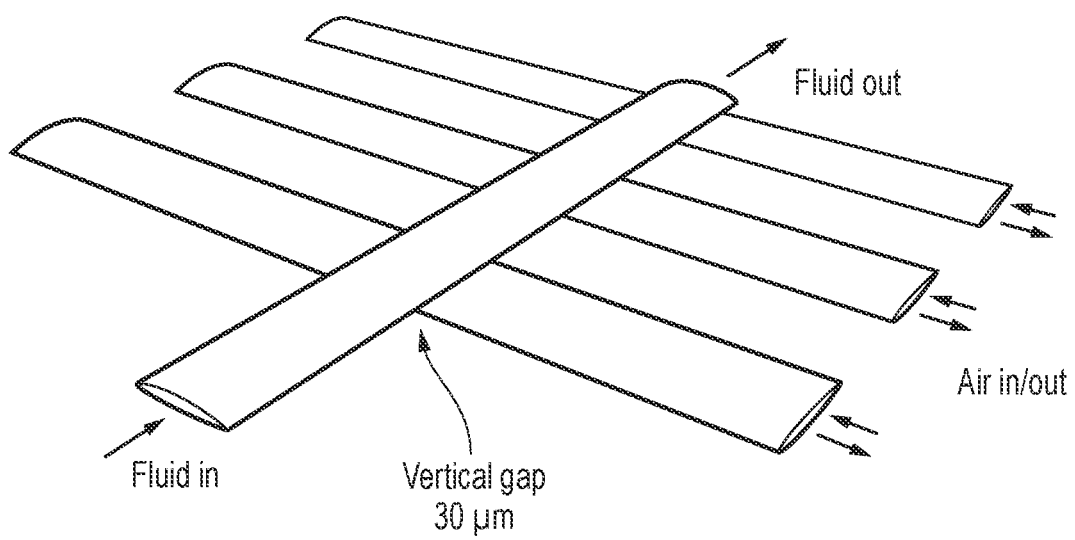
FIG. 15 shows how a plurality of valves may operate as a peristaltic pump.

FIG. 15 shows the operation of this principle. It will again be noted that 3D design freedoms will enable new pump designs that will differ significantly from the 2D design illustrated.

A modification to the actuation sequence of the valve arrangement shown in FIG. 14 also enables a mixing function to occur as inputs are permitted to combine together before passing to one or more outputs.

Electronic Devices

Electronic functionality within the cartridge 10 enables the integration of various sensing elements into different areas of the cartridge to measure and/or control multiple parameters.

Fabrication methods for electronic device(s) are not limited to 3D printing and also include inkjet printing on external surfaces.

In this particular embodiment a thermistor is described although this is merely one illustration of how a plethora of electronic sensors may be incorporated into the invention. The description below can be considered to apply to all electronic sensors.

Similar, many of the benefits of the integrated electronic sensors apply regardless of the sensor type.

As it is possible to digitally design and edit each electronic sensor design at each location (e.g. a core or PCR reaction site in the present embodiment), it is possible to customise each sensor to the measurements required at the specific site, for example in terms of sensitivity and dynamic range, as well as to calibrate each sensor individually.

As the sensors are manufactured as part of each cartridge during the manufacture of the cartridge and do not need to be manufactured or sourced as separate components, a significant numbers of sensors can be fabricated ('complexity is free') and added to many locations, even if they will not always be used in every use of the cartridge. This gives significantly greater flexibility than current arrangements. In particular, a greater quantity of sensors enables a greater degree of measurement with a resulting higher degree of control over biomanufacturing protocol execution resulting in higher quality bioproduct.

As the electronic sensors can be closely integrated into the cartridge in a manner not possible with conventional discrete electronic sensors, higher accuracy measurements can be obtained.

All electronic sensors can embodied in any 3D profile required and the profile can be chosen for or adapted to the requirements of the individual cartridge and the other components.

Thermistor

Figure 16:
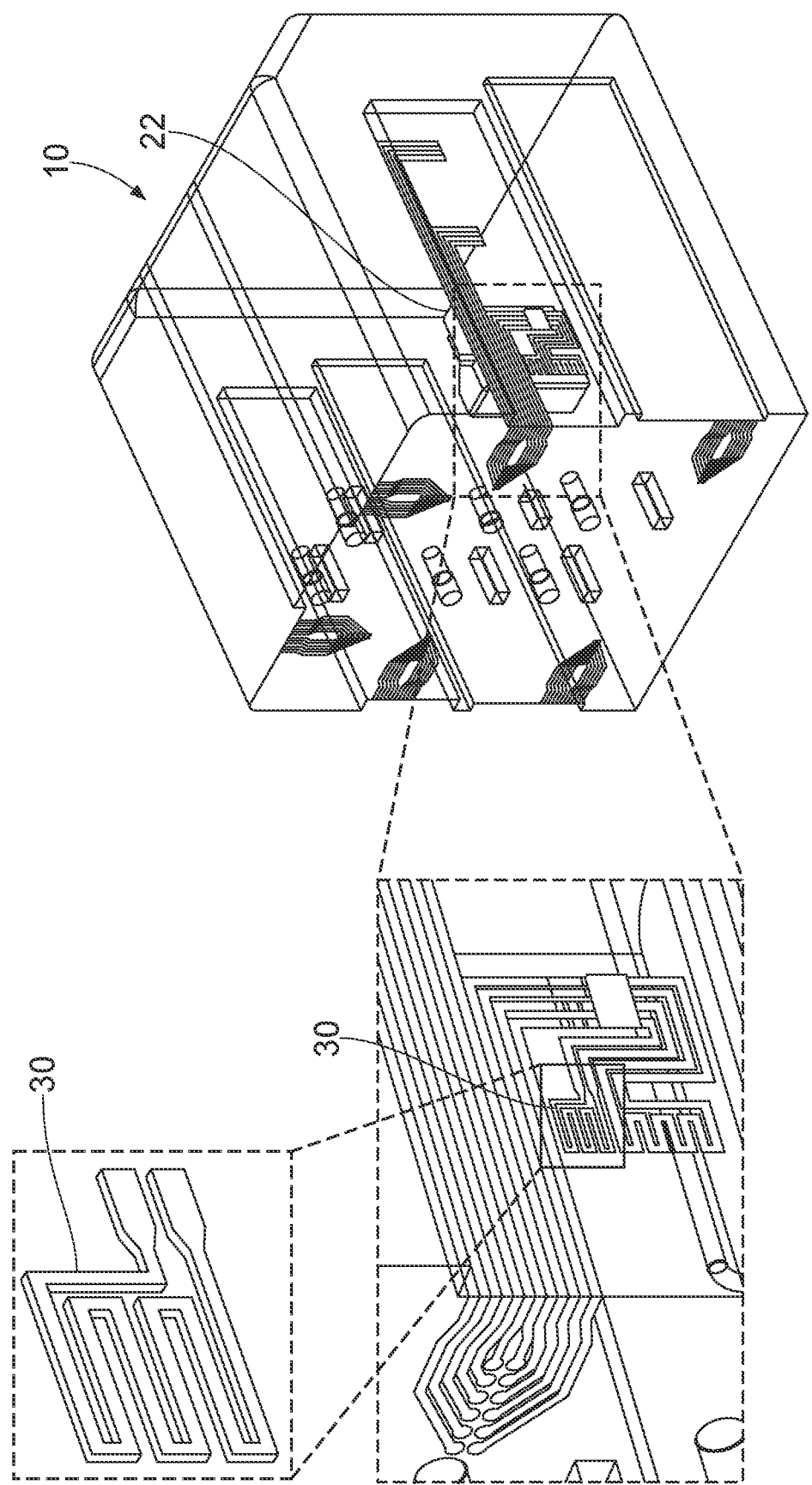
FIG. 16 shows an arrangement of a thermistor in the cartridge of FIGS. 5A and 5B.

The cartridge 10 used for PCR has a thermistor 30 at each core 24 (PCR reaction site) to measure the temperature of the reaction liquid and enable the local controller to modify the input to the thermal heater (described further below) resulting in the closed loop control of each PCR reaction site. FIG. 16 shows an example of a thermistor 30 in the PCR cartridge 10 of an embodiment of the present invention.

The thermistor provides an electrical signal to the instrument or base station for the specific core/PCR reaction site that it is connected to. This signal can be converted by a controller into a temperature value.

The thermistor 30 can be fabricated very adjacent to the associated core device (PCR reaction site) 22. The thermistor is formed from conductive ink fabricated in a predefined path as part of the cartridge manufacturing process with the input and output of the path connected to an interface 16 on the exterior of the cartridge and thus to a thermal controller in the base station. The dimensions of the conductive ink path is configured to suit the desired level of temperature measurement required.

The thermal controller sends a known electrical current to one side of the thermistor 30 conductive ink path. The current along the conductive ink path is modified proportionally by the thermal behaviour of the liquid in the core 22 (PCR reaction site). The thermal controller reads the value of the current on the other end of the thermistor conductive ink path thus providing a quantified value of the temperature of the liquid in the core 22 (PCR reaction site).

The thermistor may be configured so as to adapt to one or more of: the size or location of the core, the desired thermal sensitivity and temperature range to be measured.

In certain embodiments, a plurality of thermistors may be provided in series or in parallel with each other (or in a combination of series and parallel arrangements).

The thermistors may take any configuration of path length, serpentine profile (spacing and quantity of "coils"), path width (which may be fixed along the path length or modified accordingly at points along path length).

Additional/Alternative Electronic Functionality

In addition to the thermistor described above, other electronic devices can be fabricated in cartridge 10. These may include one or more of:

Other sensors such as: pH sensors, conductivity sensors; pressure sensors and/or flow sensors;

Passive electronic functionality such as: communication functionality (e.g. RFID/NFC antennas) or capacitive sensors (e.g. for sensing liquid flow within the cartridge);

Active electronic functionality such as: printed batteries or printed photovoltaic functionality (see, for example: "3D Printing for the Rapid Prototyping of Structural Electronics", Macdonald et al—2014 and "3D Inkjet Printing of Electronics Using UV Conversion", Saleh et al—2017)

Thermal Devices

Control over thermal conditions experienced by biological material before and during reactions is a key aspect of biomanufacturing hardware. For example, thermal cycling is a critical aspect of the PCR technique executed in the PCR cartridge of the present embodiment.

Two examples of thermal devices will be described here, which can be used individually or in any combination as desired. However, the following benefits apply irrespective of the type of thermal device incorporated.

As it is possible to digitally design and edit each thermal device at each location (e.g. a core or PCR reaction site in the present embodiment), it is possible to customise each heater sensor to the heating requirements of each specific site, for example in terms of speed of heating, total amount of heat delivery, etc.

As the thermal devices are manufactured as part of each cartridge during the manufacture of the cartridge and do not need to be manufactured or sourced as separate components, a significant numbers of thermal devices can be fabricated ('complexity is free') and added to many locations, even if they will not always be used in every use of the cartridge. This gives significantly greater flexibility than current arrangements. In particular, a greater quantity of thermal devices enables a greater degree of thermal control over specific liquid volumes resulting higher degree of control over biomanufacturing protocol execution resulting in higher quality bioproduct.

As the thermal devices can be closely integrated into the cartridge in a manner not possible with conventional discrete electronic sensors, higher accuracy measurements can be obtained.

All thermal devices can embodied in any 3D profile required and the profile can be chosen for or adapted to the requirements of the individual cartridge and the other components.

Thermal Heater

Figure 17:
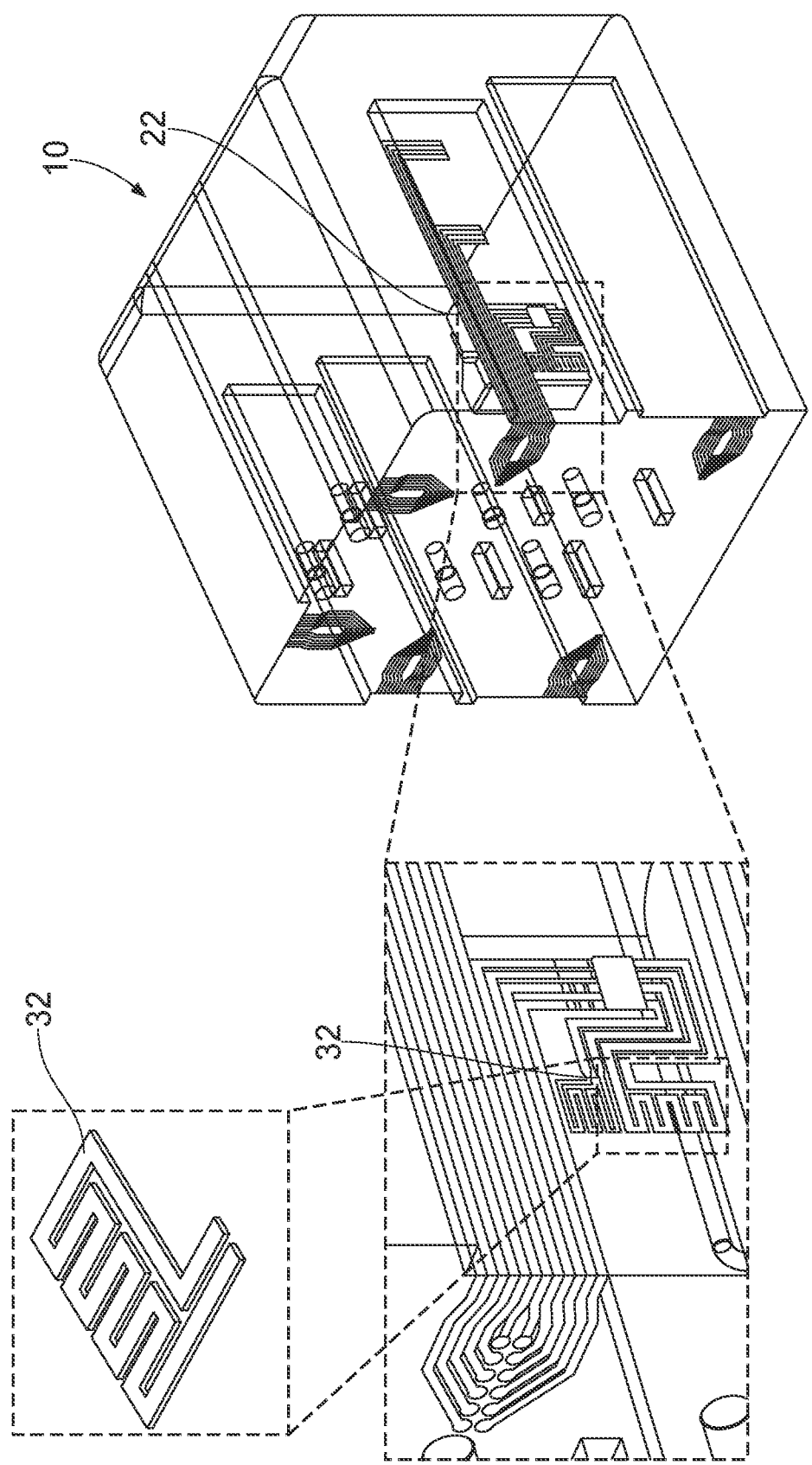
FIG. 17 shows an arrangement of a thermal heater in the cartridge of FIGS. 5A and 5B.
Figure 18:
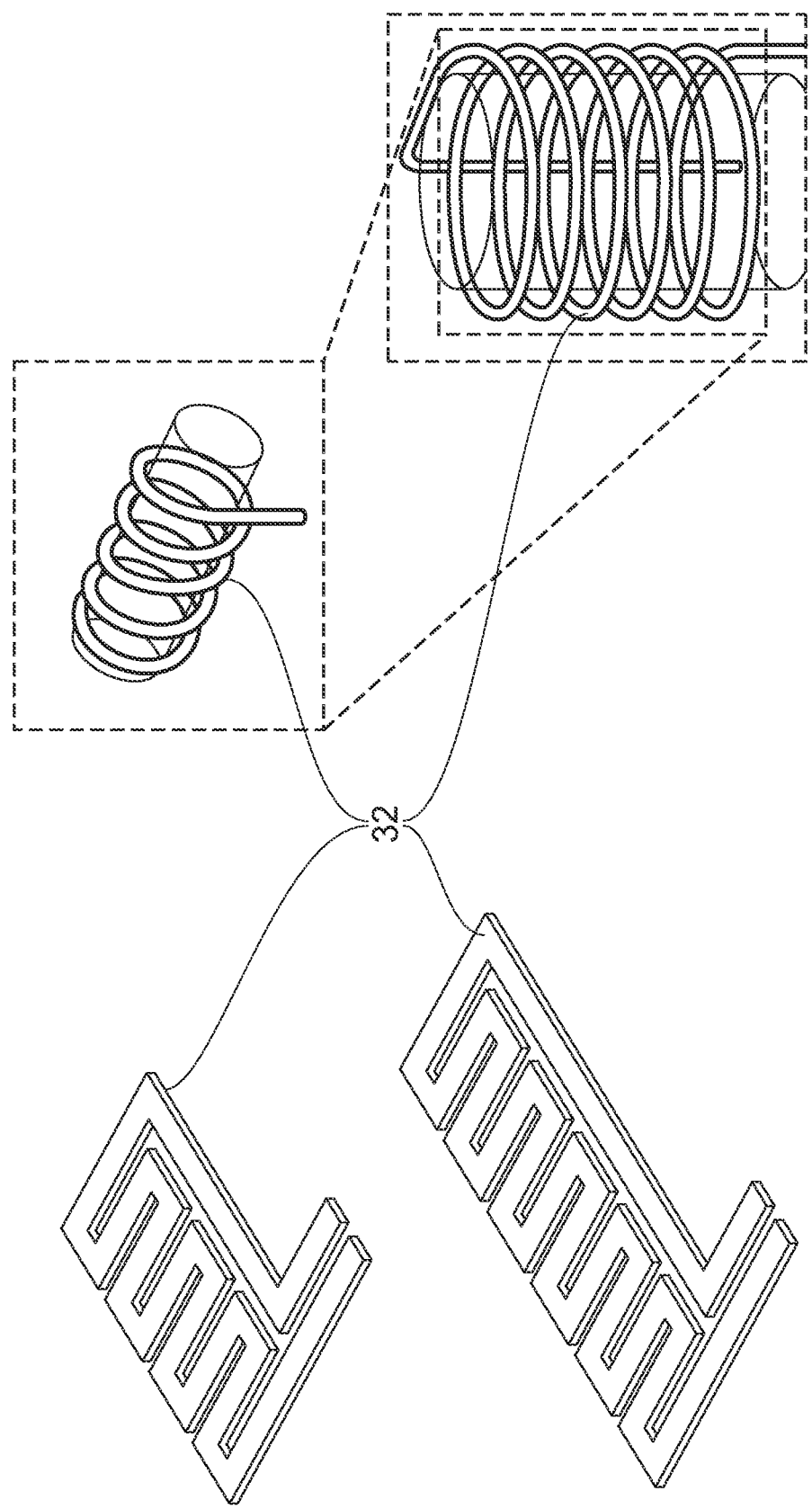
FIG. 18 shows an alternative configuration for thermal elements in the cartridge of FIGS. 5A and 5B.

The PCR cartridge 10 of the present embodiment has a thermal heater 32 at each core 22 (PCR reaction site) to control the temperature of the reaction liquid. The thermal heater is driven by the local controller with closed loop feedback from the thermistor electronic sensor (described above). FIG. 17 shows an example of a thermal heater 32 in the PCR cartridge 10 of an embodiment of the present invention. FIG. 18 shows alternative configurations for thermal heaters 32 which are arranged to heat different components within a cartridge.

The thermal heater 32 acts to transform input electrical energy into thermal energy which is transferred to the core 22 (or other target site; for example it may be transferred to a cache in order to pre-heat the contents prior to them being supplied to a core for a reaction to be carried out).

The thermal heater 32 can be fabricated very adjacent to the associated core 22 (PCR reaction site). The thermal heater 32 is formed from conductive ink fabricated in a pre-defined path as part of the cartridge manufacturing process with the input and output of the path connected to an interface 16 on the exterior of the cartridge and thus to a thermal controller in the base station. The dimensions of the conductive ink path is configured to suit the desired level of temperature input required.

By the thermal controller sending a known electrical current into the thermal heater conductive ink path and by designing the path such that the resistance of the path varies at certain points (or the path is concentrated in a particular area, for example by the serpentine configuration shown in FIG. 17) an increase in temperature along the whole or part of the length of the thermal heater can be caused.

Due to the proximity of the core 22 to highly resistive, or concentrated portions of the thermal heater 32, liquids in the core can thus be heated. It will be appreciated that thermal heaters can also be used to heat other components, for example to pre-heat reagents stored in caches, or fluids passing through buses.

The thermal heater may be configured so as to adapt to one or more of: the size or location of the core, the desired thermal range or speed of heating required.

In certain embodiments, a plurality of thermal heaters may be provided in series or in parallel with each other (or in a combination of series and parallel arrangements).

The thermal heaters may take any configuration of path length, serpentine profile (spacing and quantity of "coils"), path width (which may be fixed along the path length or modified accordingly at points along path length).

3D Heat Pipe

It is also possible to effectively transport heat from an off-cartridge thermal energy source or sink (e.g. the base station or instrument) to one or more desired locations within the cartridge 10.

This is enabled by a 3D-printed heat pipe with the vapour cavity structure fabricated inside the casing to provide an enclosed and sealed heat pipe isolated from other cartridge functionality except where desired. The heat pipe connects to an interface 16 on the exterior of the cartridge.

The heat pipe structure can be designed in a parametric manner enabling rapid configuration of a heat pipe to suit the needs of a specific location within a cartridge thus enabling customisation of multiple heat pipes within a single cartridge body The 3D heat pipe can be fabricated inside the cartridge body in almost unconstrained geometries to allow the transport of heat into or out of the internal volume of the cartridge as required.

3D heat pipes are particularly advantageous in applications where cooling is required (for example because a reaction being performed is highly exothermic), as they allow heat to be removed from components within the cartridge. For example, heat pipes can operate with cooling fluid being circulated through them. Where functionality for cooling and heating is provided, separate interfaces on the base station may be used so that the base station may be configured to provide sources of both hot and cold fluids.

Optical Devices

Optical functionality is used extensively in life science applications for analysis of reactions (e.g. measurement of fluorophore quantity in PCR) and also for other sensing modalities where non-contact sensing of biological material are desirable.

In the present embodiment, optical functionality is included in the PCR cartridge for the purposes of measuring PCR reactions.

The PCR cartridge includes LEDs for the generation of electromagnetic energy at differing wavelengths and photodiodes for the detection of electromagnetic energy at differing wavelengths. It is not currently possible to create these LEDs and photodiodes by 3D printing techniques, so they will be off-the-shelf components which are inserted into the cartridge during the manufacturing step. After insertion, the 3D printing process may seal these components into the overall body of the cartridge and/or connect them to other elements of the cartridge structure, such as electrical connections.

3D design freedoms enable the optical devices to be located in an almost unlimited number of locations and orientations to suit the desired function. Further, the use of 3D geometry to locate the optical device results in a high level of control over geometric tolerance stacks (e.g. compared to conventional fabrication methods such as high-precision machining) resulting in a high precision optical measurement system.

As 3D printing techniques improve and develop, it is envisaged that future cartridge embodiments will include 3D printed and/or inkjet-printed optical functionality including 3D printed and/or inkjet-printed LEDs and/or 3D printed and/or inkjet-printed photodiodes.

When this is available, these components can be manufactured integrally with the cartridge with the advantages set out below in relation to the optical waveguides.

Optical Waveguide

Optical waveguides may be designed and manufactured in the body of the cartridge to transmit electromagnetic energy to/from different physical locations within the cartridge for the purposes of making optical readings (for example of a PCR reaction).

The optical waveguide ('core') is fabricated from a polymer material within the body of the cartridge. Surrounding the core is a material of differing optical refraction, in this case an elastomeric material ('cladding'), the cladding completely surrounds the core along its length. Thus it is possible to effectively design and manufacture an optical fibre configuration within the internal volume of the cartridge.

One end of the waveguide is mated to either a source of electromagnetic energy (e.g. an LED) or a detector of electromagnetic energy (e.g. a photodiode). The opposite end of the waveguide is located within the internal volume of a core containing the liquid to be optically analysed.

The tip of the core of the waveguide is shaped as an optical lens to focus or disperse electromagnetic energy accordingly.

The waveguide can thus transfer electromagnetic waves along its length to or from locations within the cartridge. For example, in the PCR embodiment, the waveguide may run from an interface 16 on the exterior of the cartridge 10 to a core 22 so that the liquid in the core can be illuminated by a light source external to the cartridge to excite the fluorophores within it. A further waveguide transmits the observed fluorescence back to another interface 16 on the exterior of the cartridge 10 where it connects to an optical sensor.

Optical waveguides may be fabricated in various core diameters, lengths and pathways. For example, and without limitation, it is possible to have: a single optical waveguide with larger core diameter; a series of optical waveguides of smaller diameter arranged in parallel; or configurations of varying core diameter to suit differing optical wavelengths.

Optical waveguides may be embodied in any 3D profile required, for example dependent on the configuration and design of other components within the cartridge and can be effectively embedded within the cartridge body as desired. Networks and sub-networks of waveguides can also be designed and manufactured.

The integration of the optical waveguide into the cartridge body enables closer optical coupling between the optical waveguide and the material to be analysed enabling a higher degree of sensitivity compared the use of separate devices. Further, the integrated nature avoids complexities or complications arising from sealing the optical components to the reaction volume or the potential for leakage from the reaction volume.

The ability to digitally edit the optical waveguide at each core (PCR reaction site) allows the optical waveguide to be customised to suit the specific reaction (e.g. fluorophore wavelengths) carried out at each site.

As the waveguides are manufactured as part of each cartridge during the manufacture of the cartridge and do not need to be manufactured or sourced as separate components, a significant numbers of optical devices can be fabricated ('complexity is free') and added to many locations, even if they will not always be used in every use of the cartridge. This gives significantly greater flexibility than current arrangements.

Multi-material 3D printing enables the fabrication of cladding material at the same time the core of the optical waveguide is printed allowing close integration of many optical waveguides with minimal crosstalk between them.

As the waveguides can be closely integrated into the cartridge in a manner not possible with discrete waveguides which are supplied separately, higher degrees of sensitivity can be obtained.

The waveguides can be embodied in any 3D profile required and the profile can be chosen for or adapted to the requirements of the individual cartridge and the other components.

Other Optical Devices

The ability to fabricate an optical waveguide with core and cladding enables the fabrication of additional optical devices within the cartridge, these include but are not limited to beam splitters and diffraction gratings.

Optical Filter

Multi-material 3D printing enables the simultaneous printing of different materials and the blending of these materials to create hybrid "digital materials". The blending of a transparent polymer (i.e. as proposed for the core material in the optical waveguide) along with multiple different coloured materials enables fabrication of custom optical filters that can be modified as required to allow specific electromagnetic wavelengths through.

Optical filters are intrinsic to the optical analysis of PCR reactions to enable quantification of fluorophores of different optical wavelengths. The PCR cartridge embodies 3D printed optical filters fabricated in situ at each LED and photodiode to allow for the transmission of wavelengths of interest which differ for each set of LEDs and photodiodes.

Biological Devices and Components

Dried PCR Reagents

Multi-material 3D printing enables the possibility of printing biological materials into the cartridge such as the fabrication of dried PCR reagents in the PCR cartridge. Biological reagents required to enable the PCR reaction to occur at each core when combined with liquid reagents and liquid sample can be printed in advance and so do not need to be supplied to the cartridge at the point of use.

The PCR reagents are freeze dried and contained within a small tablet-like carrier structure that dissolves upon contact with liquid. The dried PCR agents are loaded into one raw material location of the 3D printer prior to cartridge fabrication. The carrier material is loaded into another one raw material location of the 3D printer prior to cartridge fabrication During cartridge fabrication the tablet-like device containing PCR reagents and carrier material is fabricated in situ within each core (PCR reaction site) by the 3D printer simultaneously with the cartridge fabrication process. The PCR regents remain in the core until the cartridge is used.

At the point of use liquid reagent and/or liquid are introduced to the core (PCR reaction site) where they dissolve the tablet-like structure releasing the PCR reagents and starting the PCR reaction.

The dried PCR reagents may be fabricated in an almost limitless range of configurations to suit the PCR reaction parameters. These configurations include, without limitation, a discrete "device" and printing within the structure of the cartridge itself, for example on any surface of the cartridge structure (e.g. on the wall of a reaction vessel), potentially creating part of the cartridge structure from the reagent(s).

Where multiple reagent sites exist within one cartridge, dried reagents can also be configured to the particular reaction and protocol step carried at each core (PCR reaction site) within the cartridge.

The geometry, shape and internal structure of the carrier material may also be customised to suit the reaction desired (e.g. the internal morphology of a tablet-like device can be tuned to suit the liquid properties). The dried reagents and carrier material are not limited to 2D profiles and may be fabricated in any 3D geometry desired.

The quantity and density of the dried reagent(s) and carrier material can also be varied as desired.

In situ fabrication of the reagents within the cartridge body generally enables a higher degree of reaction performance as the design of the dried reagents and the core can be made complimentary.

In situ fabrication of the dried reagents eliminates assembly complication and the risk of incorrect reagents being assembled in the wrong location.

The ability to digitally edit the reagents at each core (or elsewhere in the cartridge layout) allows customisation to suit the specific reaction carried out at each site.

Reference Test Reagents

Cartridges may be subjected to a series of tests during the fabrication process. However, it is not possible to test the actual application specific reagents during cartridge test as this will prevent their use during actual cartridge use. It is therefore useful to fabricate dedicated test reagents that can be used during post-fabrication testing, successful testing of the reference material infers the correct fabrication of the actual dried reagents for the intended use (e.g. PCR).

Additional Biological Materials

Other organic & biological materials may also be fabricated in situ in a cartridge during the cartridge fabrication process. These organic & biological materials may include—but are not limited to—raw biological material (e.g. cells) in addition to supporting materials such as reagents as illustrated in the list below:

- Printed wet reagents fabricated into cartridge during the 3D printing process
- Printed dry reagents fabricated into cartridge during the 3D printing process
- Printed wet biological material (e.g. prokaryote or eukaryote cells) fabricated into cartridge during the 3D printing process
- Printed dry biological material (e.g. prokaryote or eukaryote cells) fabricated into cartridge during the 3D printing process
- Adhesion/growth promoters (chemical and other stimuli)
- Antibodies, enzymes, hormones, DNA oligonucleotides
- Biopolymers and scaffolds (e.g. laminin, PGLA)
- Cells (e.g. osteoblasts)
- Existing cells
- Engineered organisms
- Viruses (e.g. bacteriophages)
- Organic compounds (e.g. glucose, urea)
- Blocking agents (e.g. bovine serum albumin)
- Reagents (e.g. butanol)
- Media (e.g. cell growth media)
- Printed Biological Reagent Storage Whilst 3D printing enables on-demand fabrication of a cartridge, scenarios may arise where the immediate use of a cartridge is not possible or stockpiling or advance manufacturing is desirable.

In these scenarios, the biological material fabricated in the cartridge may require an additional secondary layer of protection to prevent degradation. This secondary structure may be provided by (but is not limited to) mechanically deformable structures or thermally deformable structures.

Mechanically deformable structures provide a secondary structure in which the printed biological reagents are contained during manufacture. This secondary structure can be deformed when liquid reagent is bought into contact with the structure as pressure from the liquid reagent provides a mechanical force to deform the secondary structure at pre-defined weak points and release the printed biological reagents.

The design of the mechanical structure can be customised to suit the printed biological reagents, the liquid reagent volume and the actuation forces required.

Thermally deformable structures provide an alternative secondary structure which is fabricated from a thermally susceptible material such that the secondary structure deforms in a controlled manner at pre-defined weak points when the local temperature is elevated. The elevated temperature thus results in the removal of the secondary layer exposing the printed biological reagents as required. This embodiment is particularly advantageous when liquid contact with printed biological reagents is not desired.

The design of the thermally deformable structure can be customised to suit the printed biological reagents and a defined amount of thermal energy.

It will be appreciated that other forms of sustained release may be used to protect the biological reagents until they are required for use.

Circuit-Level Design and Implementation

The devices in the cartridge (for example those described above) may be integrated into "circuits" comprised of two or more co-operating devices arranged to carry out specific tasks within the operation of the cartridge.

The circuits allow customisation of domain-specific characteristics. For example a bus circuit (described in more detail below) may be customised to suit flow rates, viscosity etc. for specific liquid reagent and an optical circuit (described in more detail below) customised to specific excitation/emission optical wavelengths.

Formation of such "circuits" also allows the circuit design to be digitally edited to enable scalable designs to suit different fluidic volumes and/or protocol steps and the ability to rapidly re-configure and create new versions.

Bus Circuit

Figure 19:
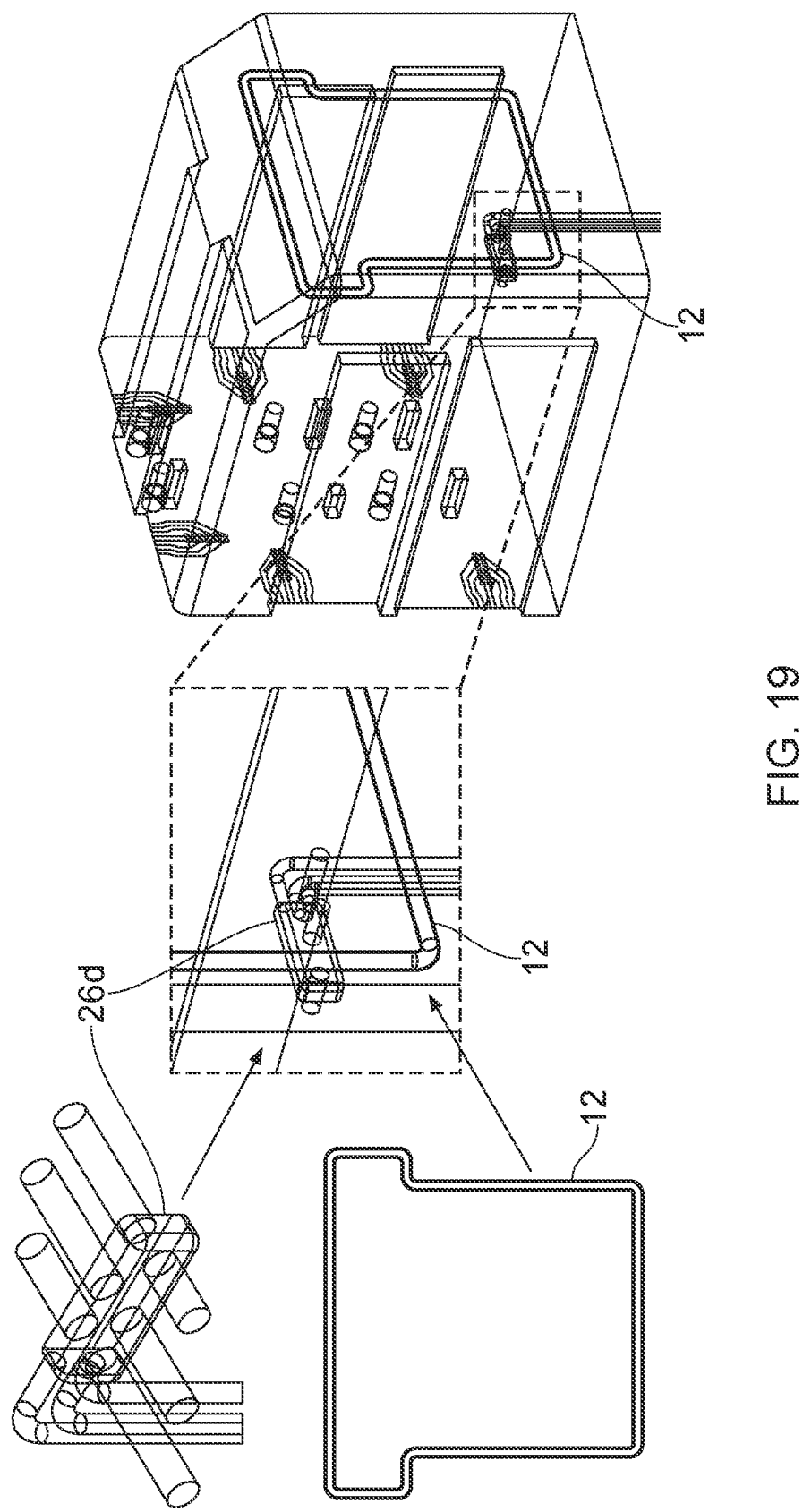
FIG. 19 shows an example of a bus circuit in the cartridge of FIGS. 5A and 5B.

A bus circuit is formed from the integration of a bus 12 with a 3-way pneumatic valve 26d, for example as shown in FIG. 19. The circuit allows rapid insertion and removal of liquid from the bus and provides an efficient means of transporting liquid material from one part of the cartridge to another and a specific addressable transport path for liquid material to follow when being sent from one location to another.

Multiple busses and pneumatic valves may be combined in a circuit, as required and, as noted previously, the orientation of the components can be chosen to suit the packing around other components of the cartridge.

The bus circuit provides the basic ability to move liquid packets from different parts of the cartridge to another efficiently. By sub-dividing the operation of the components, it is possible to operate multiple busses and valves in parallel, which allows for the transfer of significant amount of liquid in a short duration reducing overall system latency. The bus circuit allows the transport of single packets of liquid or multiple packets depending on protocol and system clock cycle.

Bus circuits can provide for addressable routes for liquid packets thus enabling the transfer of liquid from any given location to any other given location as required. Bus circuits are scalable units which allows the creation of to create sub-buses and sub-sub buses as required, thus providing efficient manner of transporting significant quantity of liquid packets in a very high complexity cartridge.

Figure 20:
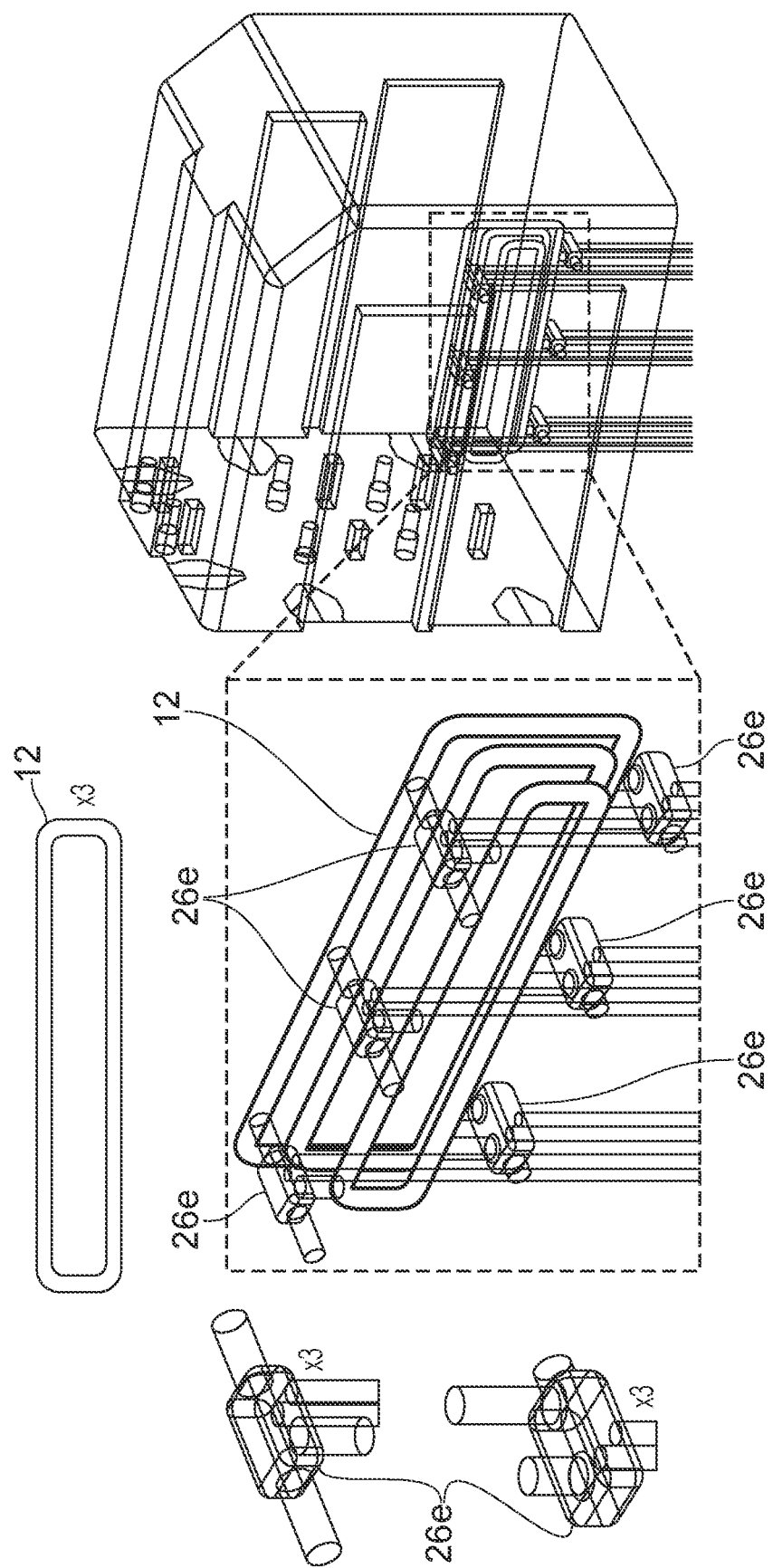
FIG. 20 shows an example of a sub-bus circuit in the cartridge of FIGS. 5A and 5B.

An example of a sub-bus circuit is shown in FIG. 20. The sub-bus circuit of this configuration includes several sub-buses 12 and several 2-way pneumatic valves 26e. The sub-bus is supplied by a bus circuit as described above and provides a further layer of control when transporting liquid packets around the cartridge.

Core/Cache Circuit

Figure 21:
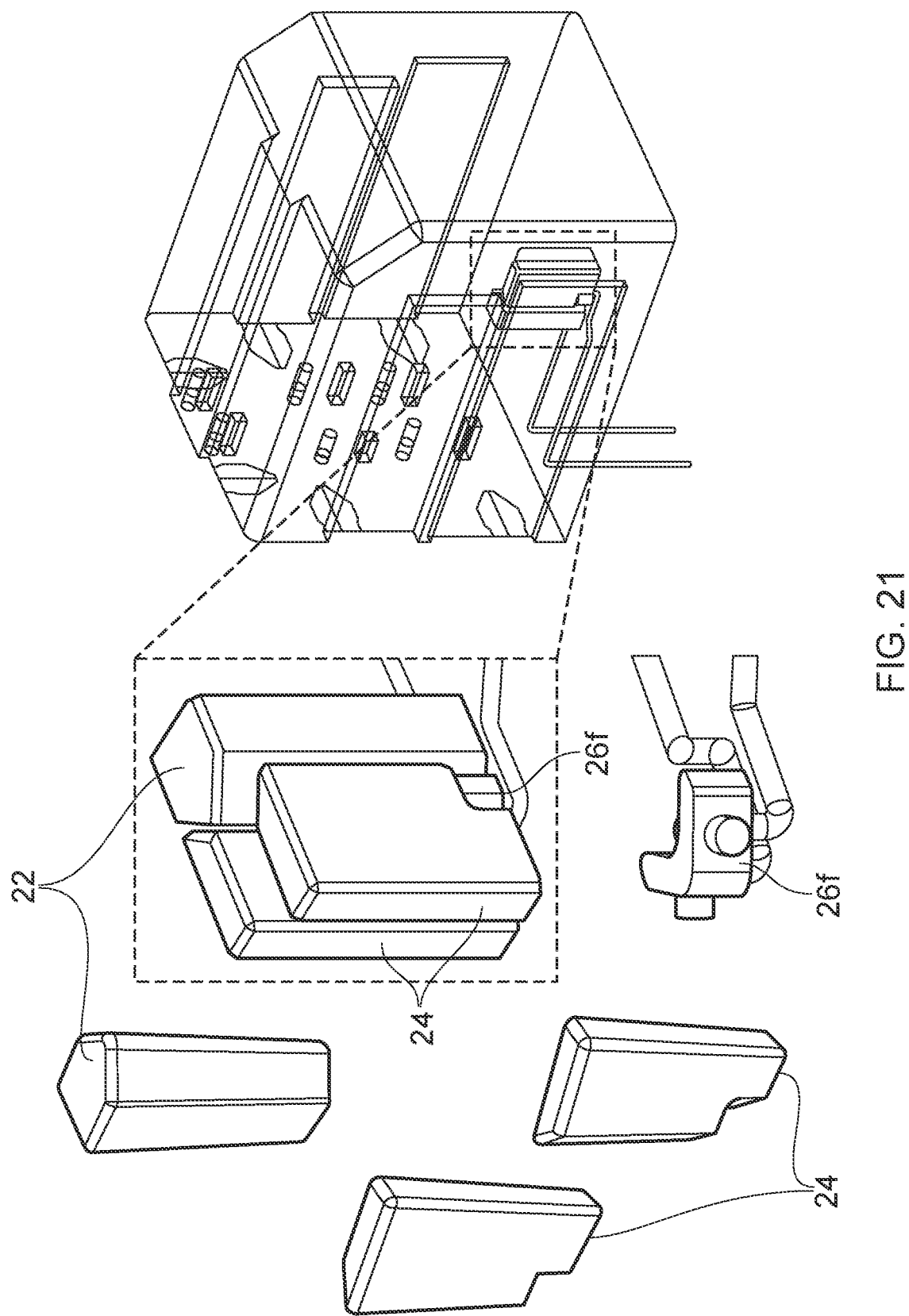
FIG. 21 shows an example of a core/cache circuit in the cartridge of FIGS. 5A and 5B.

A core/cache circuit is formed from the integration of a core 22 with a cache 24 and a core/cache valve 26f, for example as shown in FIG. 21. This circuit provides an integrated PCR reaction site capable of holding and pre-processing liquid material prior to the point of use and execution of a protocol sub-task (a PCR reaction).

Figure 22:
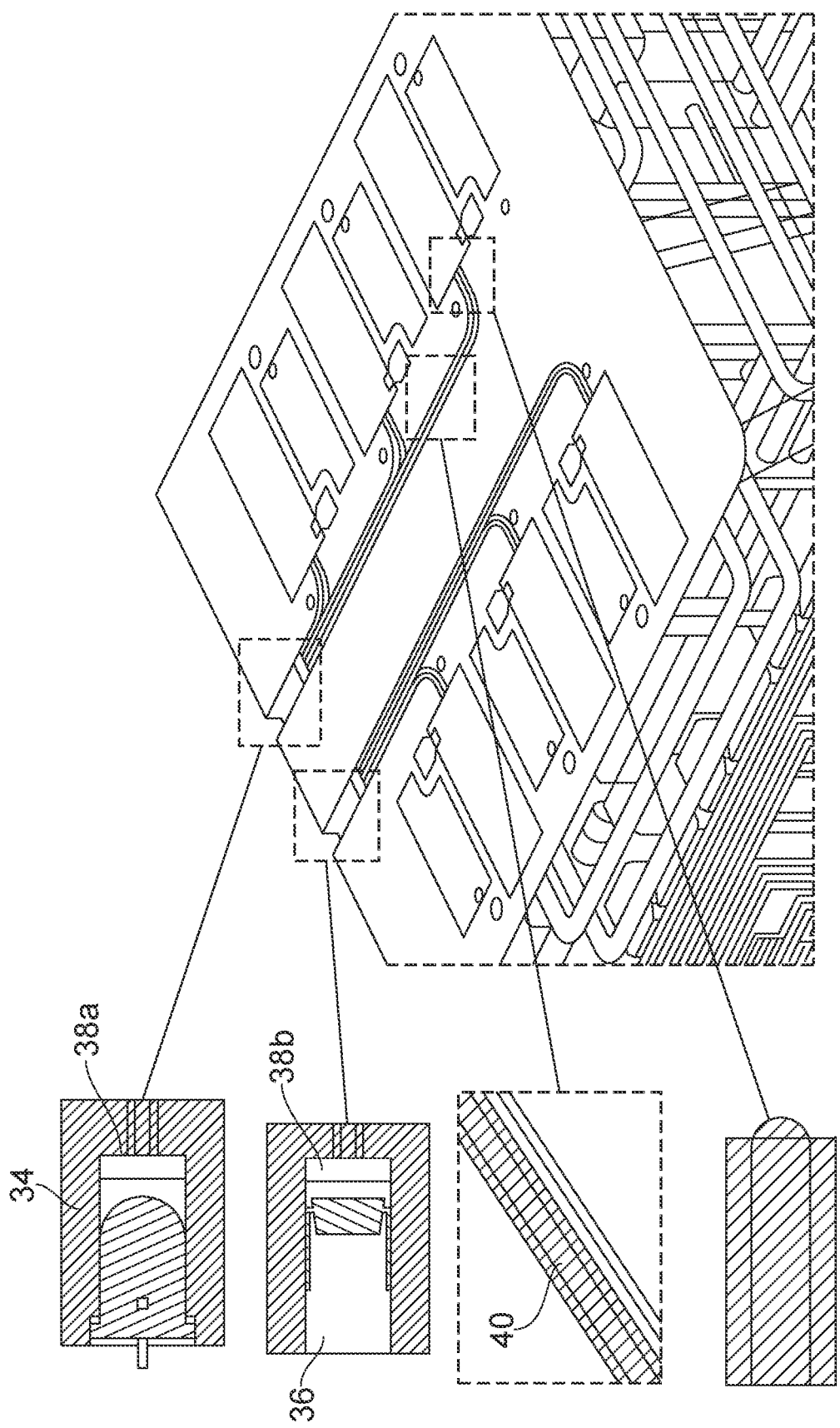
FIG. 22 shows an example of an optical circuit in the cartridge of FIGS. 5A and 5B.

One or more caches 24 may be used with a single core 22, for example two as shown in FIG. 22. Sub-caches may be included, for example if any reagents require modification/storage prior to any pre-processing steps. As noted previously, the orientation of the components can be chosen to suit the packing around other components of the cartridge.

The overall system efficiency is improved by the use of smaller fluid volumes and the ability to hold these prior to use. For example if the volume of a core is 30 ml then 3×10 ml volumes can be transferred in three separate movements in parallel with other liquid packets. This can be achieved quicker than transferring a single 30 ml packet.

The core/cache circuit reduces overall system latency in the transportation of liquid packets to the point of protocol execution prior to use and reduces the overall time duration to execute complex protocols by parallelising of material transport simultaneously with protocol execution steps (for example bulk reagent can be bought to the core before it is required thus reducing process time due to transfer time).

The core/cache circuit provides an ability to accommodate differing protocol steps with solutions customised to each and a scalable unit applicable to differing liquid volumes and number of reagents/pre-processing required at different protocol execution steps.

Thermal Controller Circuit

The thermal controller circuit is one example of a domain-specific controller. Other domain-specific controllers can also be provided along similar lines, such as an optical controller circuit and will not be described further here.

The thermal controller circuit integrates a thermistor, a thermal heater, the standard cartridge interfaces for electronics and, depending on the nature of the thermal heater, thermal inputs and, optionally, a local microcontroller on the cartridge.

The thermal controller provides closed-loop control of a specific domain function at a specific reaction site.

Multiple configurations are possible with varying quantities of electronic sensors and heaters. The electronic sensors, thermal heaters and local microcontrollers may be mounted in either close proximity or separated from each other as physical constraints allow The thermal controller circuit enables high accuracy control over very specific aspects of protocol execution such as temperature of a specific site in the cartridge. Hardware and control software/algorithms can be customised to each reaction site as required.

A reduction in overall system latency can be achieved via local control of the reaction site behaviour and the control approach is scalable to suit differing core/cache sizes with different numbers of sensors and heaters, or different sizes of sensors and heaters.

Optical Circuit

An example of an optical circuit is shown in FIG. 22. The optical circuit integrates an LED 34, an excitation optical filter 38a, one or more optical waveguides 40, an emission optical filter 38b and a photodiode 36.

The optical circuit provides an overall optical solution for the PCR reaction that can be customised to suit each PCR reaction site and enables a protocol specific optical solution customised to each PCR reaction site. The optical circuit also provides high optical sensitivity through close integration of the optical solution to PCR reaction site. and a scalable optical approach possible to suit differing core/cache sizes with fewer or greater quantities of optical components integrated as required.

Multiple configurations are possible with varying quantities of each optical component as required including, without limitation, a single LED coupled to a single optical fibre, or a broadband LED with multiple optical filters and multiple waveguides coupled thereto.

Gate-Level Design and Implementation

Two or more circuits can be integrated to form a "gate" which is a combination of hardware specific to one sub-task of a biomanufacturing or bioproduct R&D protocol.

Formation of such "gates" also allows the gate design to be digitally edited to enable scalable designs to suit different fluidic volumes and/or protocol steps and the ability to rapidly re-configure and create new versions.

PCR Reaction Site Gate

Figure 23:
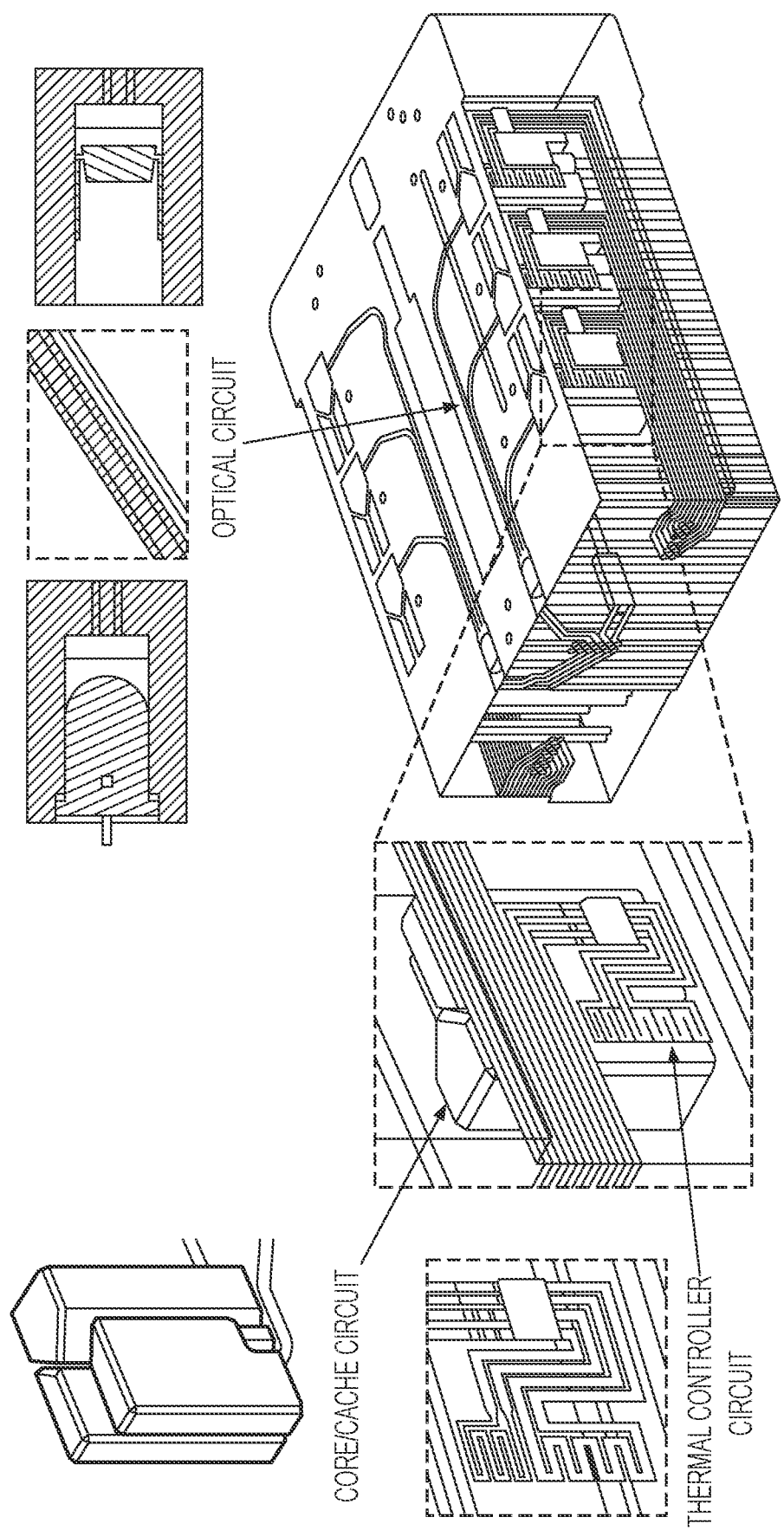
FIG. 23 shows an example of a PCR reaction site gate in the cartridge of FIGS. 5A and 5B.

The PCR reaction site gate integrates a core/cache circuit as described above, a thermal controller circuit as described above and an optical circuit as described above. An exemplary configuration of a PCR reaction site gate is shown in FIG. 23.

The PCR reaction site gate integrates the fluidic, thermal and optical functionality required to carry out a PCR reaction.

The precise configuration of the PCR reaction site gate can vary, in particular depending on the fluidic volumes involved. For example a relatively small volume core/cache can be integrated with a single thermal controller having a single thermistor and a single thermal heater, and a single optical circuit. A larger volume core/cache could be integrated with multiple thermal controllers, each having multiple thermistors and multiple thermal heaters, and multiple optical circuits allowing for optical analysis at multiple locations.

The PCR reaction site gate enables a protocol specific hardware solution customised to each PCR reaction site. High accuracy PCR reactions can be enabled by close integration of thermal & optical aspects each optimised for the specific PCR reaction occurring at that reaction site. The integration also provides a scalable hardware approach possible to suit differing PCR reaction fluidic volumes and differing PCR protocols.

Main Cartridge Bus Gate

Figure 24:
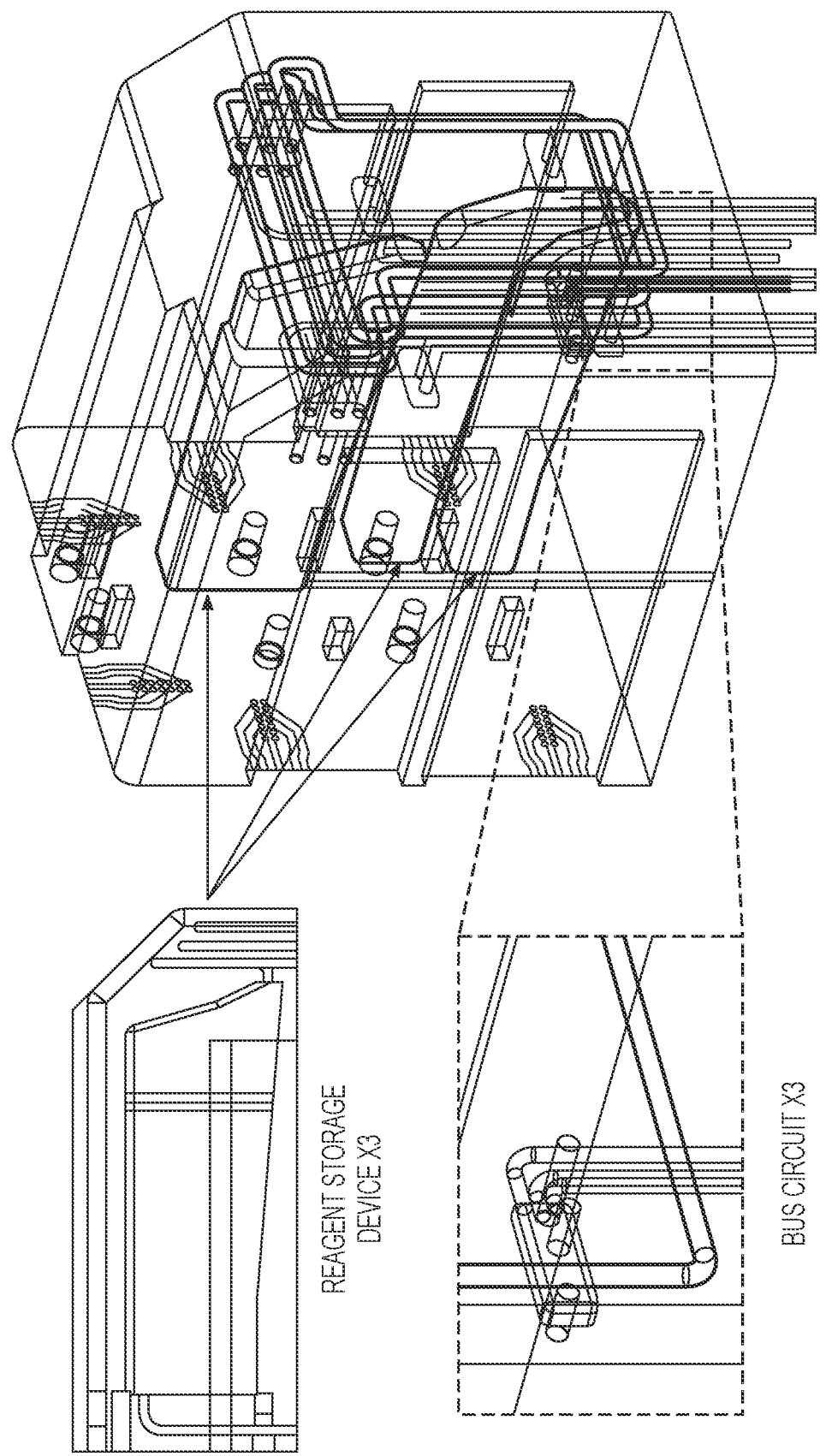
FIG. 24 shows an example of a main cartridge bus gate in the cartridge of FIGS. 5A and 5B.

The main cartridge bus gate integrates a bus circuit as described above and a reagent storage device. An exemplary main cartridge bus gate is shown in FIG. 24. The main cartridge bus gate integrates fluidic storage and transportation functionality to provide an integrated and optimised solution to the movement of liquid to different areas of the PCR cartridge.

In embodiments of the main cartridge bus gate, multiple configurations are possible. These may be used to accommodate differences in overall liquid volumes, size of liquid packets required, throughput of liquid material and overall complexity of the cartridge. In these different embodiments different numbers of each constituent circuit may be provided and integrated as required.

The main cartridge bus gate enables a protocol specific hardware solution customised to the liquid handling needs of each protocol and resulting cartridge design, whilst being scalable to suit different fluidic volumes and protocols.

Other Gates

In addition to the gates described above, further designs of gates are possible from the devices and circuits described above (and others). Without limitation, these include:

Cell line storage gates

Cell line preparation gates (e.g. thawing of frozen cell lines)

Reagent storage gates providing precise environmental control of reagents (e.g. cell media)

Cell culture gates (e.g. bioreactor)

Gas storage gates (e.g. oxygen for cell culture)

Downstream processing gates (e.g. for performing filtration and/or chromatography steps)

Quality control operations gates (e.g. flow cytometry)

Bioproduct finishing gate (e.g. product concentration)

Waste storage and management gate

Module-Level Design and Implementation

A plurality of gates can be combined, optionally with additional circuits and devices, to form a "module". Modules provide hardware specific to a major task or step of a biomanufacturing or bioproduct R&D protocol.

Each module design can be digitally edited to enable scalable designs to suit different fluidic volumes and/or protocol steps and the ability to rapidly re-configure and create new versions.

PCR Experiment Module

Figure 25:
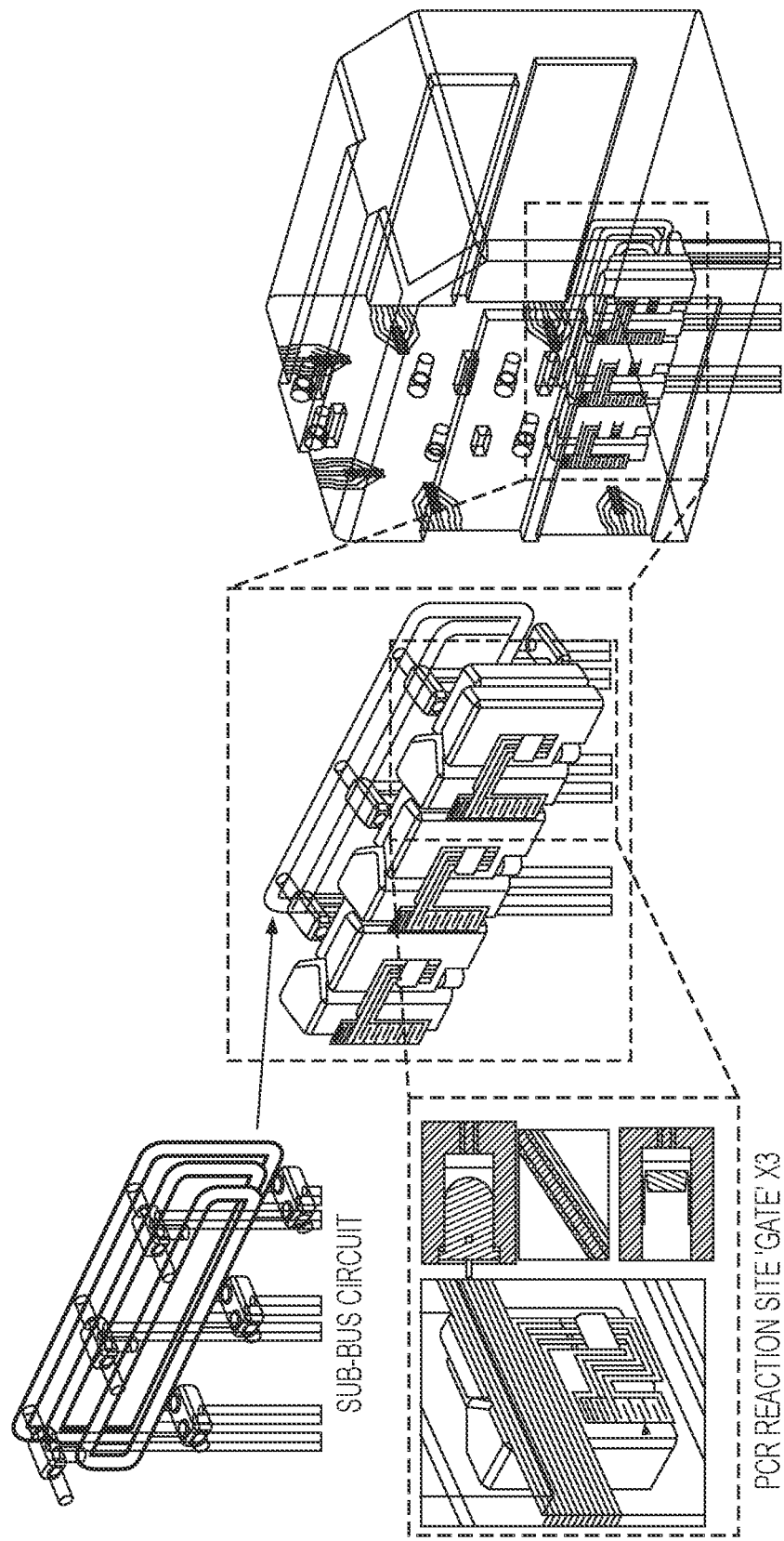
FIG. 25 shows an example of a PCR experiment module in the cartridge of FIGS. 5A and 5B.

One example module according to an embodiment of the present invention is a PCR Experiment Module, and example of which is shown in FIG. 25 which integrates three PCR reaction site gates with a sub-bus circuit.

This module integrates PCR reaction sites and fluidic transportation functionality to provide an integrated and optimised solution for the execution of several PCR reactions either in parallel or series.

Configurations

Multiple configurations are possible driven by overall PCR reactions required, protocol execution, liquid volumes and overall complexity of the cartridge Multiple configurations are possible with varying quantities of each gate/circuit integrated as required with these two examples at either end of the range of possibilities:

Single PCR reaction site gates and single sub-bus circuit

Multiple PCR reaction site gates with multiple sub-bus gates

Benefits

Enables protocol specific hardware solution customised to the needs of each PCR experiment to be carried out Scalable hardware approach possible to suit differing PCR experiments and overall protocols Other Modules The PCR module described above with 3×PCR reaction site gates is specific to the high-complexity PCR cartridge embodiment described. Other combinations of gates are possible to create integrated modules for particular biomanufacturing operations. An example of another module is integration of:

A cell culture gate (e.g. bioreactor)

A quality control operations gate (e.g. flow cytometry)

A PCR gate

A downstream processing gate (e.g. for performing filtration and/or chromatography steps)

A sub-bus circuit

Integration of these gates could provide a self-contained biomanufacturing module optimised for the particular biomanufacturing operation required with customisation/optimisation of each module possible accordingly.

System-Level Design and Implementation

At the top of the hierarchy, a system integrates several modules to create an application specific hardware solution for biomanufacturing protocols and/or bioproduct R&D experiments. In general terms, as many modules are integrated as required to provide the top-level solution required for the execution of the bioproduct R&D experiment and/or biomanufacturing protocol.

Figure 26:
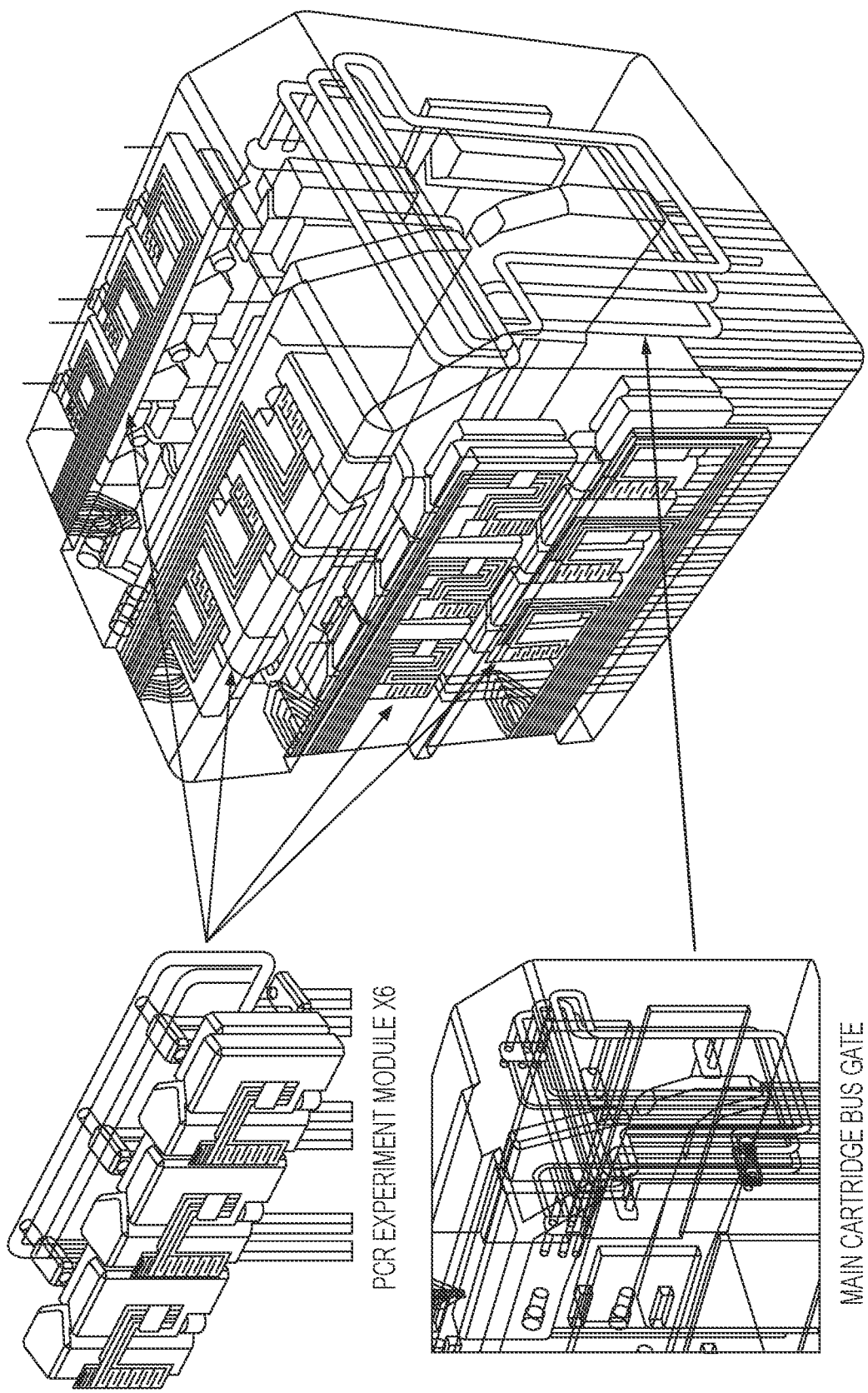
FIG. 26 shows how modules and gates are assembled into a cartridge according to an embodiment of the present invention.

One embodiment of a system provides a high-complexity PCR cartridge, formed from components described above, all integrated into the standard cartridge architecture. Specifically the high-complexity PCR cartridge integrates six PCR experiment modules with a main cartridge bus gate (integrated to each sub-bus circuit). FIG. 26 shows the high-complexity PCR cartridge according to this embodiment.

In further embodiments of the present invention, a less-complex PCR cartridge may be provided, for example which includes two or four PCR experiment modules.

It is also possible to create alternative high complexity cartridges which have a number of different modules (as opposed to the identical modules in the high-complexity PCR cartridge embodiment). These cartridges can be directed to applications requiring a greater variety of functionality, for example covering one or more of upstream and downstream processing in biomanufacturing protocols, or hybrid combinations of upstream and downstream processing steps such as cell therapies and gene therapies.

Similarly, it is also possible to have further modules in a cartridge. This may be accomplished by stacking further modules in the vertical (z-axis) direction so that the footprint of the standard cartridge architecture in the x-y plane is maintained and the interface to the instrument can be standardised.

Standard Instrument/Base Station—overview

The standard instrument or base station provides the interface with the cartridges described above.

The standard instrument is a key enabler of the functionality embodied in the cartridges according to embodiments of the present invention and controls the execution of the protocols on those cartridges and thus the method of operation enabled the cartridges.

The functionality described above in relation to cartridges according to embodiments of the present invention enables the creation of application specific cartridges for multiple life sciences applications including bioproduct R&D and biomanufacturing.

However, whilst the cartridge is highly integrated the general functionality to run a cartridge, for example providing power, process control, user interfaces etc. is still needed. This general functionality is provided by the standard instrument.

The standard instrument provides this general functionality in standard form to allow the execution of protocols on multiple cartridges which may be connected to it. The use of a common cartridge interface (for both hardware and processing) allows any cartridge to be used on a standard instrument whilst the hardware specific to each application is accommodated in the cartridge. This allows a single standard instrument to be provided at each site where manufacturing or processing is to take place, with the cartridge(s) for the specific manufacturing or processing being provided when the need arises (effectively "on demand").

Protocol execution for each cartridge is controlled on the standard instrument by the use of a software program unique to each application specific cartridge. The software is built around the use of a common program structure to create varied protocol execution programs within a standard framework. The flexibility required by the instrument to operate each cartridge is accommodated for in the software.

The use of a standard cartridge interface and customised software using standard program structures and commands allow the standard instrument to effectively become a universal instrument capable of running many varied bioproduct & biomanufacturing protocols.

Customisation of the central manufacture of the cartridges and/or the specific instruction sets distributed to enable the standard instrument to control the operation of each cartridge allows modifications to the process performed by a cartridge without modification of the standard instrument.

Format and Functionality

An embodiment of the standard instrument 50 is shown in FIG. 27 in open and closed configurations. The standard instrument 50 is a physically small, automated, desktop mounted device with a modular and flexible architecture.

The standard instrument 50 has a standardised cartridge interface 60 which provides connectors in a standardised pattern for standardised electronic and pneumatic connection to a cartridge. This interface allows the standard instrument to operate a wide variety of biomanufacturing cartridges and to effectively provide a single universal instrument regardless of the specific bioproduct & biomanufacturing protocol executed on each cartridge.

The standard instrument 50 can simultaneously execute several biomanufacturing protocols via separate cartridges being run in parallel at different "ports" or "stations" in the instrument. The standard instrument 50 shown in FIG. 27 has two such stations, but it will be appreciated that variations can be provided which have more stations, or which only have a single station.

The integration between the standard instrument 50 and the cartridge designs mean make it possible to provide a "plug and play" or "walkaway" capability in which a cartridge can be inserted into the standard instrument, and the appropriate software for the cartridge loaded and started, such that a low-skilled user can effectively execute complex biomanufacturing protocols with minimal intervention on the automated instrument.

The standard instrument 50 has a built-in graphical user interface (GUI) 52 for providing an overview of the progress of a biomanufacturing protocol being performed by the cartridge(s).

It is possible to network several cartridges and/or standard instruments in different configurations depending upon experiment and biomanufacturing protocol complexity. This might include, for example, connecting cartridges on a single standard instrument, networking several standard instruments by physically connecting them, and/or networking several standard instruments virtually via an IoT-type network at an enterprise level.

The application-specific nature of the cartridges and the standard-yet-flexible functionality of the standard instrument effectively allowing one instrument to be used for a wide variety of biomanufacturing protocols. The hardware customisation for each biomanufacturing protocol is accommodated within the cartridge that interfaces to the standard instrument via the standardised instrument interface.

Control Architecture

Figure 28:
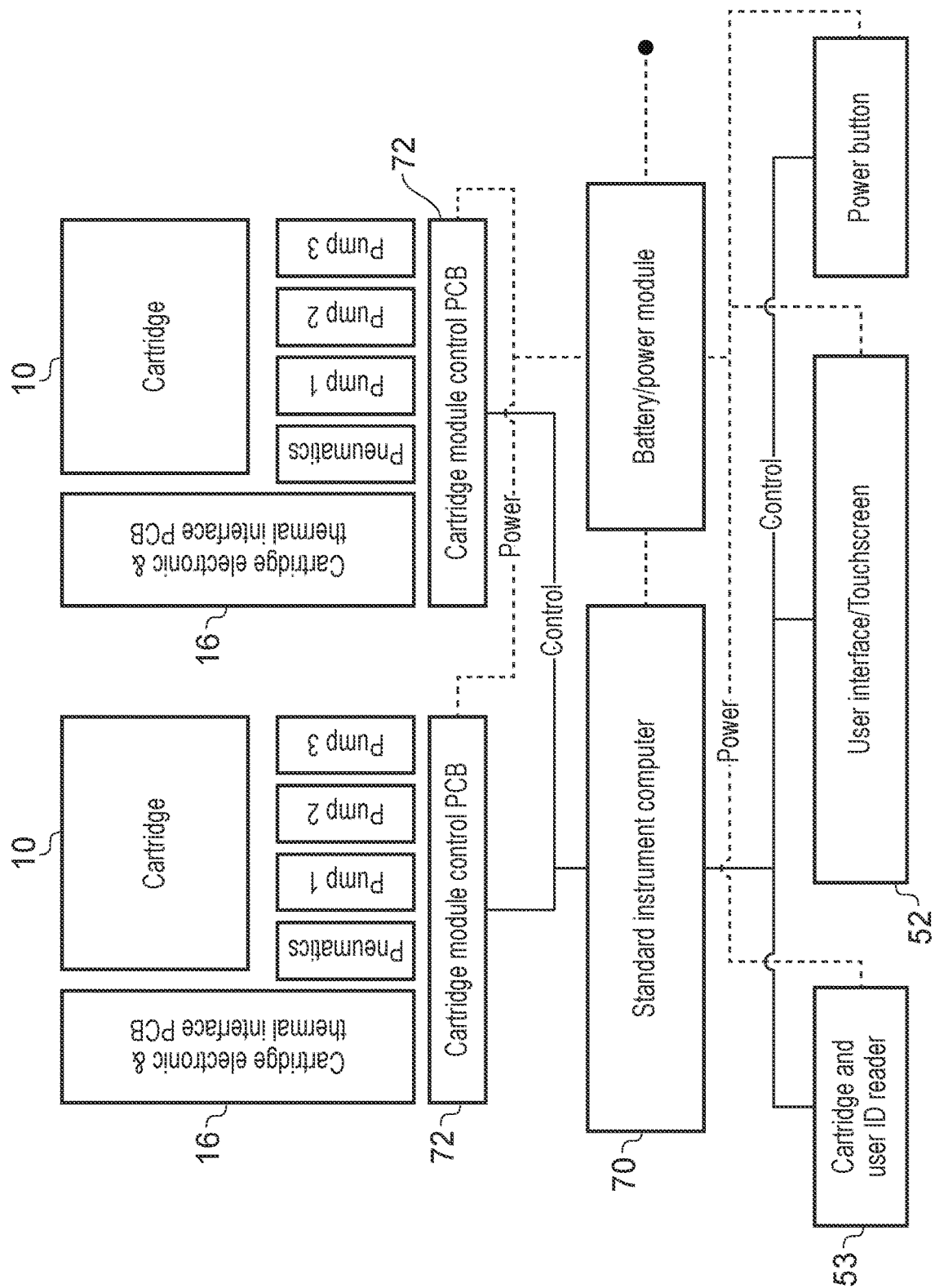
FIG. 28 is a schematic illustration of the control architecture of an embodiment of a standard instrument according to an embodiment of the present invention.

The standard instrument 50 can control multiple cartridges simultaneously via a CANBUS-type network designed for distributed I/O between the main instrument computer and the distributed cartridge modules. This control architecture is illustrated in FIG. 28 and described in more detail below.

The standard instrument computer 70 executes all control programs required to operate the standard instrument via instrument software and/or embedded firmware. It is also provides data and communications functionality for connection to wider network (not shown), such as communication to a cloud database.

The standard instrument computer 70 connects to the module control 72 for each cartridge 10 and provides overview control of all biomanufacturing protocols executed on the instrument. It distributes downloaded experimental programs and data to each cartridge module control 72 as required and manages distribution of power throughout instrument, as shown by the dashed lines in FIG. 29. It also has an on-board process analytics processor.

The cartridge control module PCB 72 for each cartridge 10 is provided with firmware that executes the method of operation instructions for experimental protocol execution on the cartridge and transmits measurement data from the executed protocol back to standard instrument computer 70 for on-instrument data analysis or off-instrument process control.

The standard instrument computer runs instrument software which is designed to enable portability of biomanufacturing protocol from one instrument to another and between generations of cartridge architecture. This software may have varying privilege levels for different users.

Experimental protocol control execution can be carried out on-instrument by local control. The data may be communicated to cloud for off-instrument data analysis and decision making. Depending on the criticality of control decisions and/or regulatory requirements, a hybrid of these approaches may be used.

Data Capabilities

The standard instrument has means for both on-instrument data operations and the use of communications networks (wired or wireless) for off-instrument data operations and can combine these as appropriate. The available functionality includes collecting and aggregating data; receiving data; storing data; transmission of data and mining/analysis of data.

This functionality means the software controlling process execution on the instrument is also capable of collecting biomanufacturing process analytical data that can be used in the process execution itself and/or transmitted to an external local, such as a cloud-based software application layer/database.

The standard instrument will be capable of exploiting artificial intelligence (AI) and machine learning (ML) approaches to optimise biomanufacturing protocol execution and control. These AI and ML capabilities could be executed using standard instrument functionality or carried out in the cloud and then communicated back to the standard instrument via a communication network.

By providing network connectivity, the standard instrument manufacturer can remotely communicate with the standard instrument to monitor, maintain, update, upgrade and repair.

Modular Architecture

The modular and flexible architecture used by the standard instrument enables an almost infinite number of possible configurations. For example, in one embodiment the standard instrument is a very small compact instrument with a single module capable of running a single cartridge for low throughput scenarios such as the manufacture of bioproduct (e.g. biology-based medicines) in a home or point-of-care setting.

In an alternative embodiment, a single standard instrument can accommodate a number of modules in one instrument with a larger footprint suitable for high throughout scenarios such as a hospital pharmacy where there is a need to simultaneously execute multiple biomanufacturing operations (e.g. manufacture of biology-based medicines) on-demand.

Similarly, regardless of the number of modules that can be accommodated, different cartridge configurations can be accommodated in all standard instruments.

Thus the standard instrument provides the ability to create a hardware solution to suit the complexity of each biomanufacturing protocol and usage scenario as required.

Multiple users may potentially interact with the standard instrument and/or the data obtained from the execution of the biomanufacturing protocol. To accommodate this, each user may be provided with a different user profile loaded into the instrument software to ensure only the relevant information is accessed and/or that only certain users can initiate or stop experiments.

Standard Instrument—Detailed Description

This section of the document describes an embodiment of the standard instrument 50 for executing the method of operation described in more detail below on a cartridge 10 such as the high-complexity PCR cartridge described above. The general configuration of the standard instrument 50 of this embodiment is shown in FIG. 27.

The standard instrument 50 has a base 54 that the remaining elements are secured to, in particular the enclosure body 56, the modules/cartridges (not shown in FIG. 27; it will be appreciated that, dependent on the configuration, the modules/cartridges may be secured to the enclosure body instead of or as well as to the base) and the battery/power module. The base 54 is designed to accommodate some components which are common to the whole instrument (such as the power module), and some that are repeated dependent on the number of slots for accommodating cartridges (such as the cartridge interfaces 60). In the arrangement shown in FIG. 27, the base 54 can be extended in the width direction to accommodate different quantities of modules side-by-side.

The enclosure body 56 provides a housing to isolate and protect the internal aspects of the standard instrument 50 from the external environment to protect cartridges and assist in maintaining the internal temperature of the standard instrument. The enclosure body 56 is constructed from a plastic material or similar with rounded and no sharp edges to assist in cleaning down and for preventing the accumulation of debris etc.

The precise design of the enclosure body 56 (and the lid 58 described further below) can be adapted to suit the use environment. For example a ruggedized version may be produced for use in external or hostile environments and visually attractive designs could be produced for in-home use.

Like the base 54, the enclosure body 56 is designed to be a flexible design that can be manufactured in a number of configurations to accommodate different quantities of modules.

The enclosure body 56 has a lid 58 mounted on it which acts to isolate the internals of the standard instrument from the external environment by eliminating ambient light and preventing accumulation of airborne particulate on modules not operating a cartridge.

The dimensions of the lid 58 may vary to accommodate taller cartridges. The lid 58 may be provided as a plurality of independent but inter-locking lids so that it is possible to open the lid to access one cartridge without unduly interfering with another cartridge mounted in the instrument.

A user interface 52, which includes a screen for displaying information (which may be a touchscreen to receive user input as well) is provided to allow user interaction with the standard instrument 50. The screen may display some or all of instructions, information, data or messages for the user. The user interaction may include some or all of entering data, adjusting settings, acknowledging messages.

A battery/power module (not shown) provides electrical power for the standard instrument 50. The power module may provide for connection to an external power source, as well as, or instead of, an instrument-mounted battery. The provision of a battery enables the standard instrument to run without connection to an external power source for a limited time. The battery may be recharged when the standard instrument is next connected to an external power source.

A cartridge and/or user ID reader 53 provide means of capturing machine-readable data from external sources. For example it may read barcodes or other identification (e.g. RFID tags) from cartridges and/or user identification badges or fobs.

Cartridge Interface/Module

Figure 29:
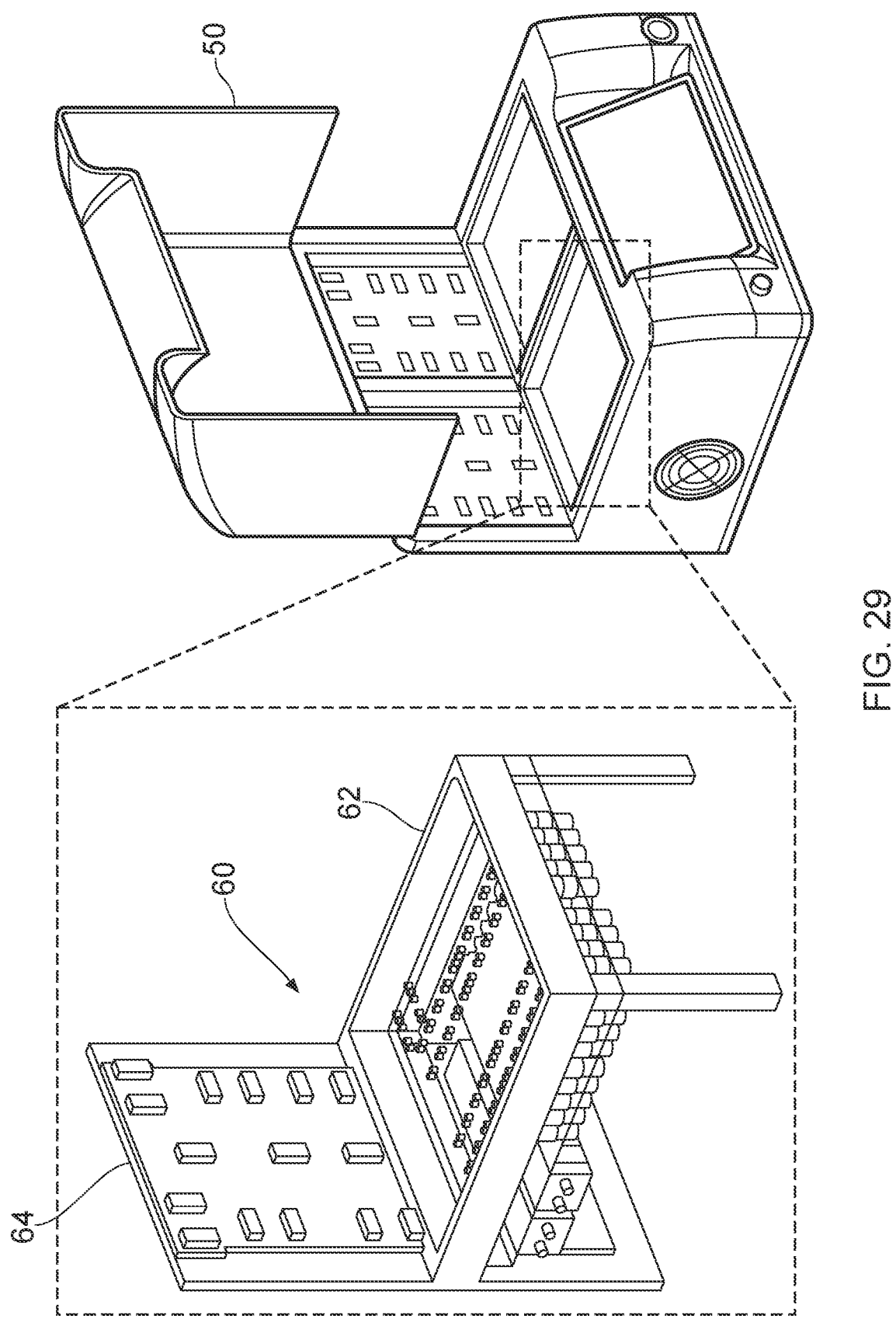
FIG. 29 shows a cartridge module of the standard instrument of FIG. 27.

The cartridge interface or module 60 is a self-contained unit within the standard instrument 50 which provides the interface for a cartridge to execute protocols under control of the standard instrument. As discussed above, the quantity of identical cartridge modules 60 used in any particular embodiment of the standard instrument 50 can vary. The current embodiment has two cartridge modules. FIG. 29 shows one of the cartridge modules 60 of the present embodiment with the other parts of the standard instrument stripped away for clarity.

The cartridge module 60 includes a chassis 62 which provides a mounting frame to hold all components of the cartridge module. The chassis 62 provides mechanical connection to the base component 54 and defines a standard XY footprint for all cartridge designs but does not limit the size of cartridge that can be accommodated in the Z direction.

Figure 30:
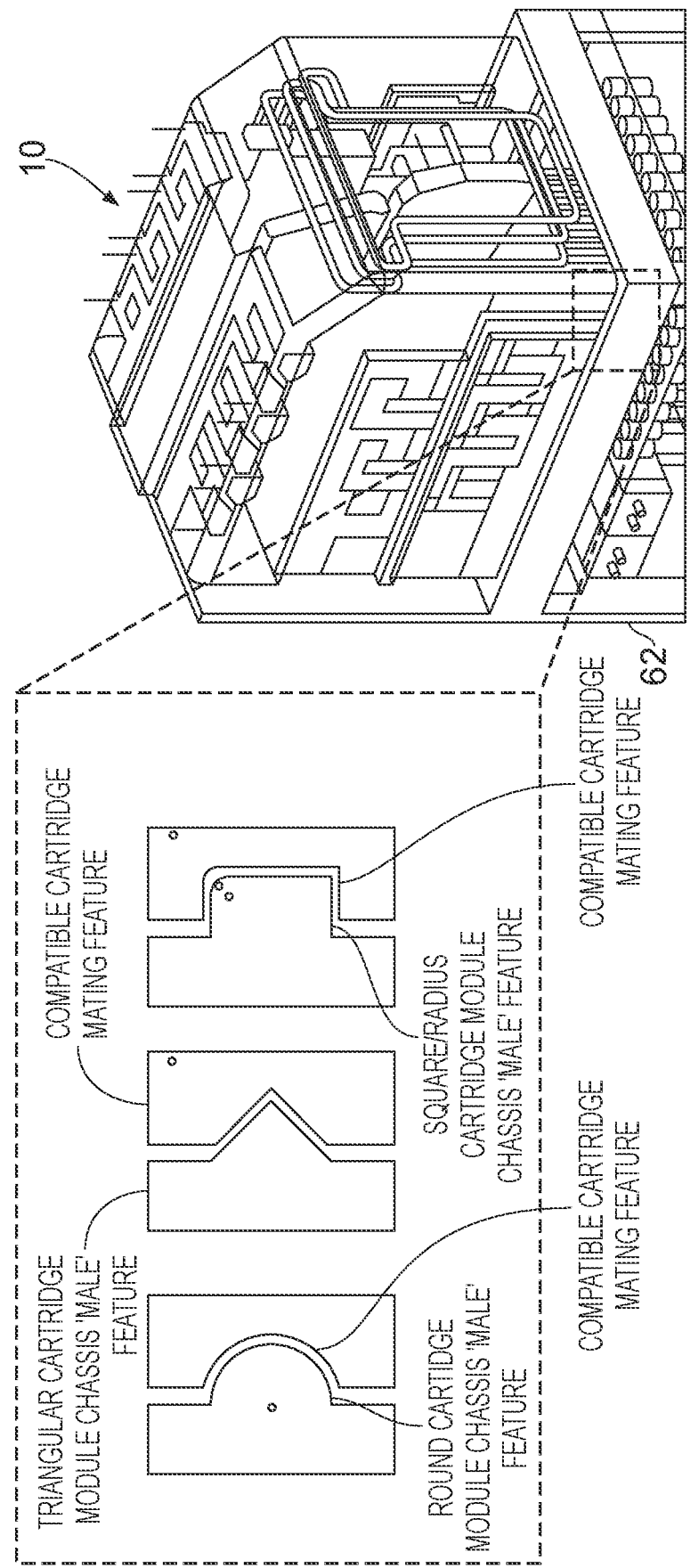
FIG. 30 shows the keyway functionality of the cartridge module of FIG. 29.

The chassis 62 provides a 'keyway' feature as shown in FIG. 30 to prevent the loading and interface of undesired cartridges. The male feature on the chassis mounting component interfaces with the female profile on the cartridge thereby preventing cartridges with incompatible features from being loaded.

Figure 31:
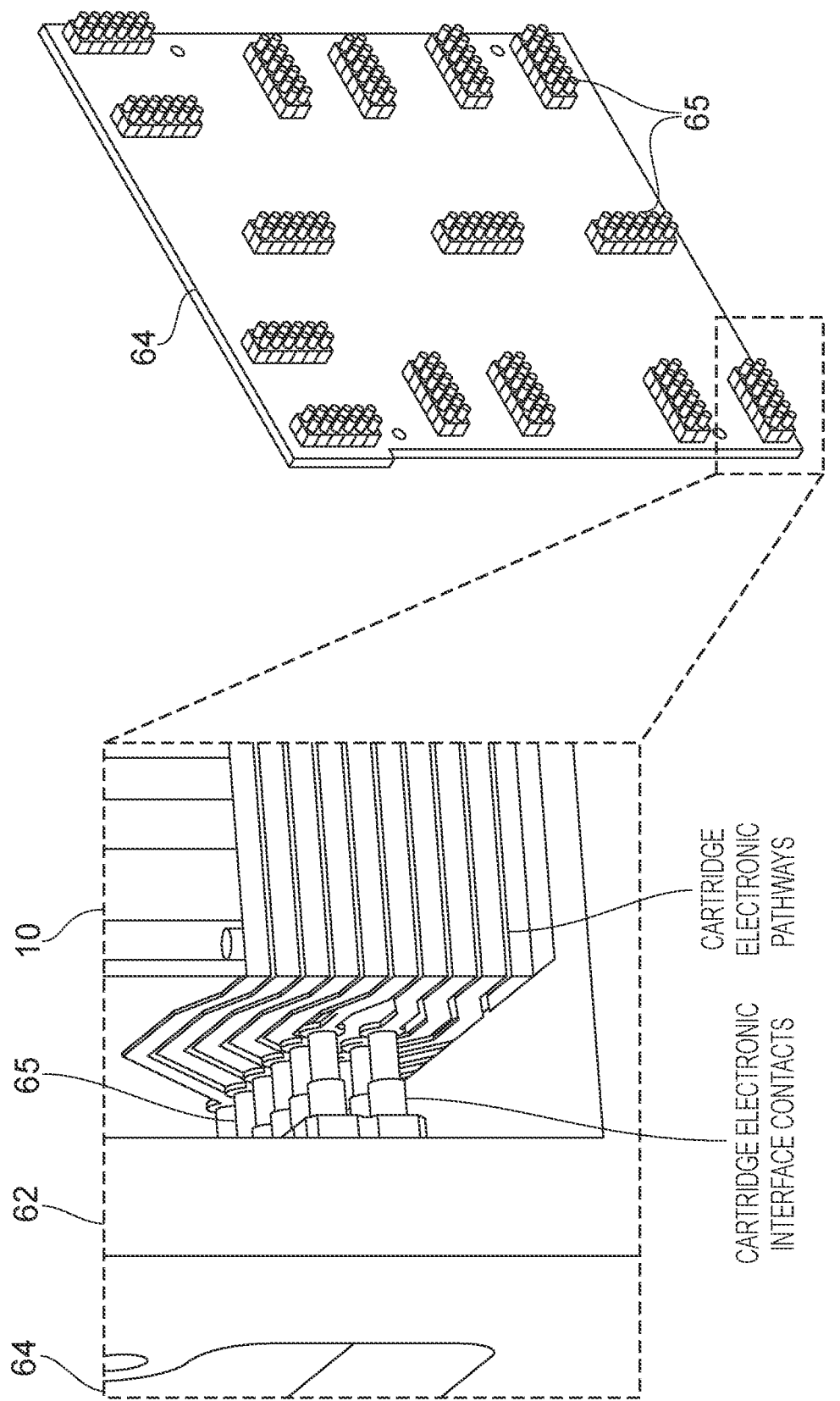
FIG. 31 shows the arrangement of electronic and thermal interface portion of the cartridge module of FIG. 29.

A vertically-mounted PCB 64 on the rear of the chassis 62 provides an electronic and thermal interface between the standard instrument and a cartridge 10. FIG. 31 shows an exemplary arrangement of the electronic and thermal interface PCB 64 and an exploded view showing one of the connectors 65 from that PCB interfacing with a cartridge 10.

The PCB is a standardised design with fixed physical dimensions. Mounted on the PCB are multiple arrangements of commercially available 'pogo-pins' 65 with spring mounted contacts to interface with electronic pathways on a mounted cartridge.

Individual cartridges will not necessarily engage with all of the connectors 65 on the PCB 64. The provision of redundant connectors 65 allows for a large number of electronic contacts and provides flexibility to accommodate different cartridge designs and requirements.

The PCB 64, through the connectors 65 provides electrical power from the standard instrument to a mounted cartridge 10 for powering electronic functionality on the cartridge. It also provides electrical power from standard instrument to the cartridge for the purposes of powering thermal functionality on the cartridge (e.g. resistive thermal heaters) as discussed in more detail above.

As well as providing power, the connectors 65 on the PCB 64 can provide paths for bi-directional exchange of electronic control signals between the standard instrument and a mounted cartridge.

Figure 33:
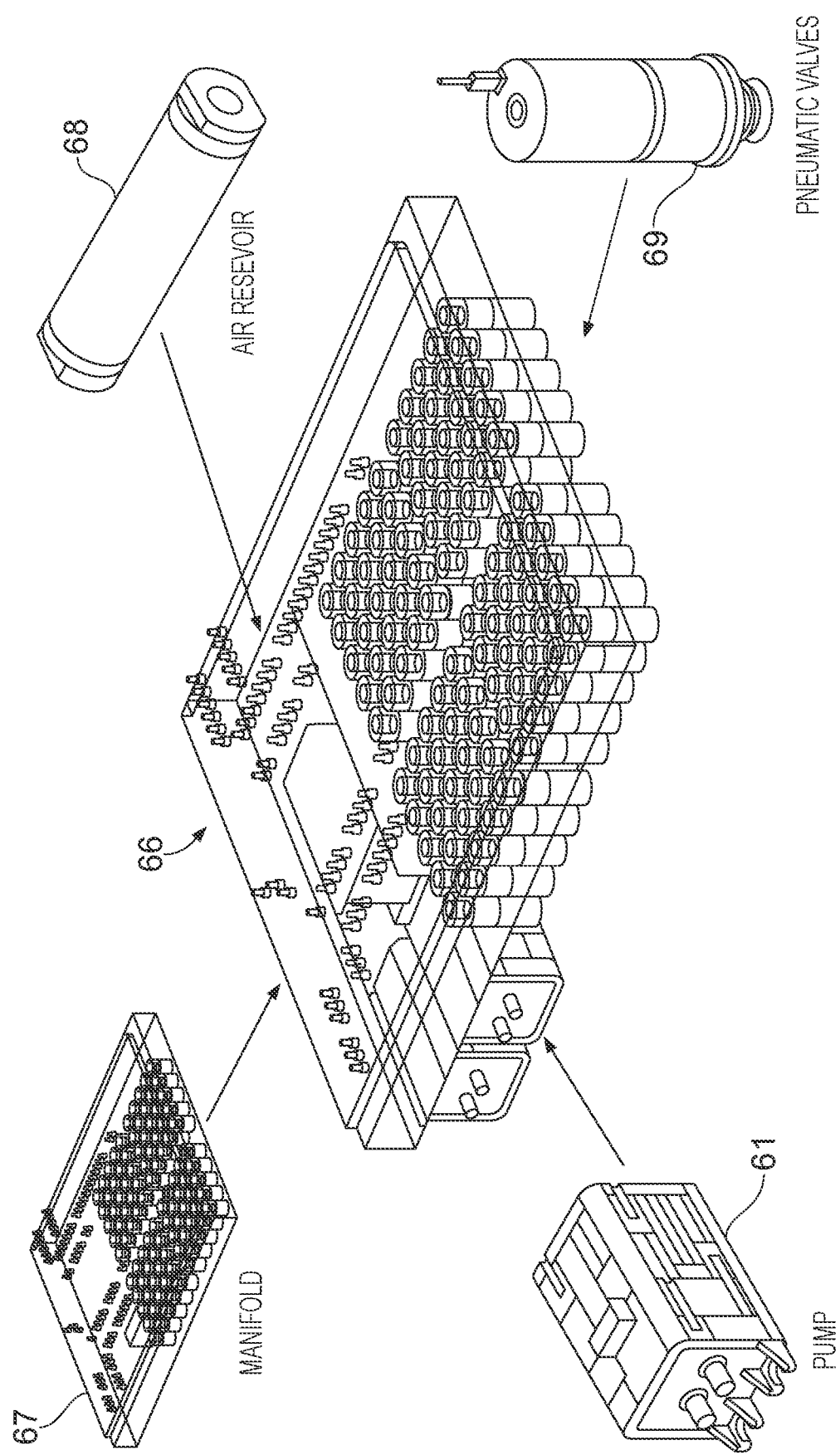
FIG. 33 shows the pneumatic interface of FIG. 32 in more detail.
Figure 38:
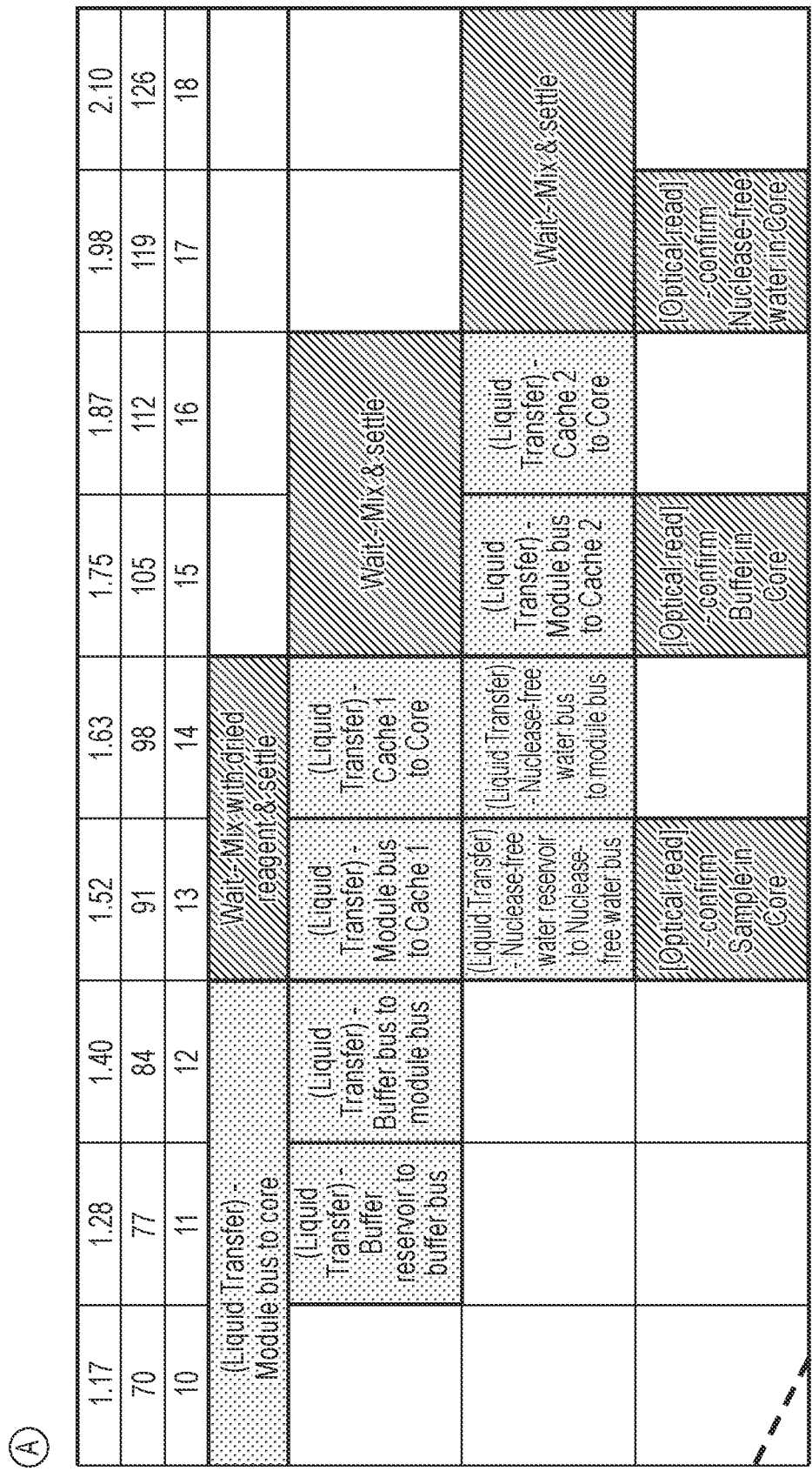
FIG. 38 shows an example of using standardised operations in a schedule for a method of operation according to an embodiment of the present invention.
Figure 38:
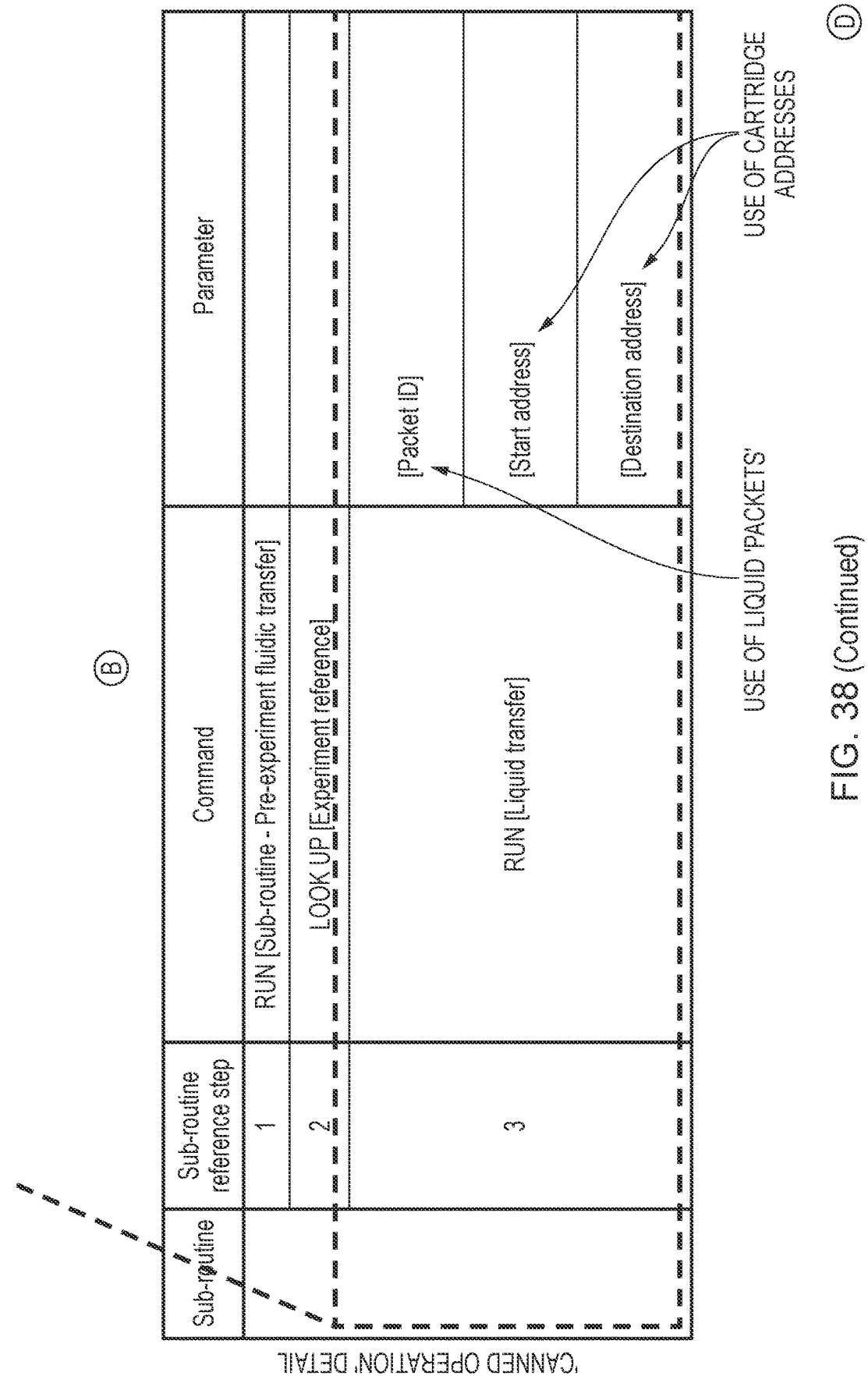

A pneumatic interface 66 is mounted horizontally in the chassis 62 and provides a mechanical interface for locating and securing a cartridge 10 to the standard instrument 50. The standardised XY dimensions of this interface 66 defines the XY footprint of cartridges. FIG. 32 shows an exemplary arrangement of the mounting of the interface 66 on the chassis 62 and an exploded view of the interface itself. FIG. 33 shows the interface 66 by itself along with exploded views of various pneumatic components which are mounted on it.

The pneumatic interface 66 accommodates a large number of pneumatic connections and components which provides flexibility to accommodate different cartridge designs and requirements, even if specific cartridges do not require or interact with all of the connections or components.

The typical pneumatic components provided on the pneumatic interface 66 are shown in FIG. 33 and are described individually below. It will be appreciated that the arrangement of these components shown in that figure is only one of numerous possibilities.

A main manifold 67 provides an interface to the underside of a mounted cartridge at specific locations. Each connected location corresponds to a pneumatic valve within the cartridge. The manifold 67 contains a large number of pathways for the flow of compressed air from the air reservoir 68 to the specific manifold/cartridge interface.

The air reservoir 68 is a reservoir pre-filled with compressed air which provides the energy source for the actuation of the valves contained within the mounted cartridge. The flow of the compressed air to the valves in the mounted cartridge is controlled by the pneumatic valves 69 within the pneumatic interface 66.

Multiple air reservoirs 68 could be accommodated to enable sustained operation of multiple cartridges over a sustained time period. The pneumatic interface may provide connections between the air reservoir(s) 68 and a pump for recharging the reservoirs, or for connection to an external air source for recharging. Alternatively or additionally, the air reservoirs 68 may be removable connected to the pneumatic interface 66 so that they can be interchanged as required.

A plurality of pneumatic valves 69 control the flow of fluid (e.g. compressed air) in the pneumatic interface. These valves are controlled by the cartridge module control PCB 72 and are actuated dependent on the experimental protocol specific to the mounted cartridge. The valves are electronically connected to the cartridge module control PCB 72 via a ribbon cable to allow the electronic control of each valve.

Liquid pumps 61 provide an actuation source to the liquid reservoirs within the mounted cartridge to enable liquid movement operations within the cartridge. The pumps 61 are activated in conjunction with corresponding pneumatic valves 69 to synchronise the movement of liquids within the mounted cartridge.

The pumps 61 are connected to and controlled by the cartridge module control PCB 72) and are actuated dependent on the experimental protocol specific to the mounted cartridge.

It will be appreciated that, whilst the mounting of the pneumatic interface 66 and the electrical interface PCB 64 in the manner described above and shown in the figures may be advantageous in terms of separating the electrical/electronic functions from the pneumatic functions, these interfaces could be combined, and/or arranged in different combinations or orientations, provided that a standardised arrangement of connectors across different standard instruments is provided to allow for modular cartridge design.

The cartridge module control PCB 72 provides control of all functionality (electronic, thermal, pneumatic, pumps) on the cartridge interface 60 in order to execute experimental protocols on the mounted cartridge(s). As described above, the control PCB 72 is electronically connected to the pneumatic valves 69, the pumps 61 and the electronic interface PCB 64.

As shown in FIG. 28, the control PCB 72 is also connected to the standard instrument computer 70 that provides overall control of all cartridge modules in the standard instrument.

The specific software program for controlling each mounted cartridge is downloaded to the cartridge module control PCB 72 from the standard instrument computer 70.

Networking and Connections

The cartridge 10 and standard instrument 50 can be networked in a number of different ways depending on the desired application.

This networking may include intra-instrument networking by physical connection of multiple cartridges mounted on one instrument in a Local Area Network (LAN)-type arrangement in which each cartridge acts like a node on the LAN. This can allow resource monitoring and resource allocation techniques described in more detail below and enable fluids to be moved between multiple cartridges as if they were a single entity. This can allow a particular biomanufacturing protocol to be implemented across a plurality of cartridges.

This networking can alternatively or additionally include inter-instrument networking by physical connection of multiple standard instruments together in a Wide Area Network (WAN)-type arrangement in which each standard instrument is a node on the WAN and each cartridge is a sub-node on the WAN. This can allow resource monitoring and resource allocation techniques described in more detail below and enable fluids to be moved between multiple cartridges (including on different standard instruments) as if they were a single entity. This can allow a particular biomanufacturing protocol to be implemented across a plurality of cartridges.

This networking can alternatively or additionally include the formation of a virtual network by non-physical connection of multiple standard instruments (e.g. via wireless protocols) to share data and experimental execution. A central controller and/or database may be connected to the network. This virtual network can allow the efficient execution of multiple experiments. Resource monitoring can allows the network to allocate experiments to separate instruments or combinations of instruments or even to individual cartridges depending upon the complexity of the experiment and the availability of different resources.

Method of Operation

The benefits of the integrated and miniaturised hardware provided by cartridges according to embodiments of the present invention (embodied in the PCR cartridge described in detail above) are maximised by the adoption of a new approach to protocol execution on that hardware.

The method of operation described in the embodiment below exploits the use of reduced liquid volumes within the cartridge and enables the parallel processing of small batches of bioproduct within the liquid volume.

Parallel processing of multiple small volumes is analogous to the way an IC/SoC operates with 'packets' of data moved in parallel with a clock cycle. Consequently the method of operation used in the embodiment of the control of a PCR cartridge can be considered analogous to an Instruction Set Architecture (ISA) used in System on Chips (SoCs) that defines how an SoC is controlled using the following key features:

Liquid 'packets'
Clock
Cartridge addressing scheme
'Canned' operations
Sub-routines (both standard and application specific)
Protocol execution convention The benefits of each of the above key features build upon each other and enable further functionality that culminates in the ability to execute a complex protocol (e.g. a PCR protocol). The use of standard key features with the ability to create application specific aspects reduces overall development effort for application specific protocols whilst still operating within a standard framework.

Overview of Key Method of Operation Features

Before describing the overall operation of a PCR cartridge according to an embodiment of the present invention, the key method of operation features are described below.

Liquid "Packets"

Cartridges according to embodiments of the present invention allow the simultaneous transportation of small liquid volumes around the cartridge; these are analogous to 'packets' of data transported around an IC system. In the PCR embodiment each packet is a small volume of liquid of either sample, buffer or nuclease-free water.

Each liquid is assigned a base volume based on the smallest liquid volume to transported within the cartridge, this becomes the base unit for liquid 'packets' within the cartridge. The value of the base volume of each can be configured on a cartridge-by-cartridge basis and may be determined by and/or constrained by considerations such as liquid viscosity and potential transfer time between cartridge units (e.g. from main bus to sub-bus, from sub-bus to core, etc.).

The volumes of each packet do not have to be identical and it is possible to transport a large volume as a multiple of the base unit (e.g. 'double' or 'triple' volumes as required).

The use of packets also enables each packet to be identified with the convention described below, providing a shorthand identification scheme. This scheme can be applied to different configurations of the cartridge providing a standardised manner to describe the movement of material around the cartridge.

The use of pre-defined liquid packets of a given size for each reagent/liquid enables standard liquid volumes (or multiples thereof) to be transported around the cartridge. The use of standard liquid volumes also enables the synchronisation of different operations within the cartridge and a standardised method of synchronising operations which, in turn enables parallelisation of several operations.

The determination of liquid packet size/volume is illustrated in FIG. 34 with the highlighted row identified as the smallest liquid volume.

Once the size of the liquid packet for each liquid has been determined it is possible to identify all the liquid packets required for protocol execution. In the high-complexity PCR cartridge described in the embodiment above, this list is shown in FIG. 35.

Clock

The cartridge executes multiple packet transport operations in parallel with experimental execution tasks. The clock signal is the cornerstone of parallel operation providing the timing reference for the correct temporal operation of the protocol carried out in the cartridge.

As the clock is used as a reference for the protocol steps rather than timing elapsed duration the clock has less emphasis on 'time' and greater emphasis on operations and synchronisation of those operations. Accordingly, the actual time unit used for a clock cycle can differ between cartridges. The specific time value is dictated by the transfer time required to move the smallest liquid volume from one gate/module to the next gate/module and thus let another liquid packet follow.

Multiple clocks can be provided, for example a system clock, a cartridge clock and/or a module clock. These clocks can be synchronised with each other ("synchronous") or can be running independently of each other ("asynchronous"). In asynchronous operation the system clock will remain the primary clock for overall scheduling.

Multiple clocks enable accommodation of local fluctuation within each experiment whilst still ensuring that operations are in sync with overall protocol execution.

There are multiple benefits of using a central clock. It ensures that physical timing constraints are met and only allow the next cycle to start when all transitions are settled and system has reached a steady state. It also accounts for the delays inherent in all gates and wiring. Further, it serves as a logical ordering mechanism for global system events by providing a time base determining what happens next. On every clock transition, operations occur that change the state of the system.

The use of clocks enables efficient scheduling of operations, sub-operations and sub-sub operations leading to scheduling efficiencies which are highly beneficial for longer protocols. This is particularly relevant for example in cell therapy and gene therapy manufacturing protocols which may last several weeks. Clocks also enable a greater degree of control over sub-process synchronisation contributing to reduced overall protocol duration.

A clock also optimises resource use within the cartridge enabling high complexity protocols to be executed with less hardware by increasing the efficiency of hardware use. The use of multiple clocks enables adaptive process control methods to be implemented within the cartridge. This is beneficial for inherently dynamic biological process (e.g. cell growth) enabling multiple sub-processes to be carried out within the cartridge, each having its own clock cycle but still under the control of a global system clock.

The use of a standard protocol execution unit (i.e. a clock cycle) enables the prediction of resource consumption and the planning of optimal use of remaining resources in inherently dynamic biological processes. For example it can optimise the use of cell media and batch feed cycles in cell growth scenarios.

The clock embodied in the high complexity PCR cartridge of the embodiment described above is used to dictate the movement of liquid packets and synchronise the execution of different experiments. The determination of the appropriate clock cycle (7 seconds) is illustrated in FIG. 36 and is based on the time that it will take to move the smallest packet and is a function of distance to be travelled, flow rate, fluid path diameter, viscosity of fluids, etc.

The clock cycle determined for the high complexity PCR cartridge can be illustrated as follows:

Smallest liquid volume (a single packet) is 0.695 mL (see above)

7 seconds required to transfer a liquid packet from the sample reservoir to the main bus=1 clock cycle (i.e. clock cycle 1)

7 seconds then required to move the first liquid packet from the main bus to the module sub-bus (i.e. clock cycle 2)

in parallel with second operation, a second liquid packet is transferred from the sample reservoir to the main bus (i.e. on clock cycle 2)

The clock cycle determined above is used to control the scheduling of 'canned operations' (described in more detail below) carried out in sub-routines executed in the cartridge. The clock synchronises multiple 'canned operations' in parallel to reduce overall sub-routine duration and maximise hardware utilisation (e.g. the ability to transfer liquids to cache 1 and cache 2 of the same core in parallel). FIG. 37 shows how these canned operations can be synchronised in parallel.

Cartridge Addressing Scheme

The cartridges use an address convention to identify each location within a cartridge. The addressing convention allows the identification of devices/circuits/gates (see description above) within modules on different cartridges on different instruments. The addressing convention allows identification of each start and destination location for each liquid packet. The addressing location further identifies functions requiring activation in the transportation of a liquid packet from one location to another, such as which valves need to open./close, which actuation source is required etc.

Each address can be stored in a look up table that has a single reference number (e.g. 'Location 122') enabling a convenient shorthand for identifying each function within the cartridge whilst hiding the complexity. Address identification in a shorthand form allows for the ease of writing protocols and the implementation of 'canned operations'.

This scheme can be applied to different configurations of cartridge providing a standardised manner to describe locations within any cartridge An example of an addressing convention based on the physical design of the high complexity PCR cartridge described above is:

[Location ID]=[Network ref], [Instrument ref], [Cartridge ref], [Horizontal ref], [Vertical ref], [Core ref ID], [Domain ref], [ID ref]

The addressing scheme used in the high complexity PCR cartridge of the embodiment described above is based upon the different cores and the position of each core and the devices/circuits/gates/modules relative to each core.

Canned Operations

Protocol execution in the cartridges is made up of a finite number of sequenced operations often requiring execution several times over the course of a protocol such as the transportation of liquid packets from one location to another on each clock cycle.

Canned operations build on the use of the previously described liquid packets and cartridge addresses. The principle behind canned operations is that certain operations will be carried out by particular modules within a cartridge and these can be pre-identified prior to any protocol creation work. For example a thermal heater module in the PCR cartridge will carry out a PCR thermal cycle.

It is thus possible to create a look up table of these common operations and use a shorthand scheme to identify each potential operation. For example the common operation of transporting a liquid packet from one location to another on each clock cycle may be given the reference [Liquid transfer] followed by a destination address. This scheme can be applied to different configurations of cartridge providing a standardised manner to describe the operation of typical protocol operations within any cartridge.

Each canned operation may have certain variables or parameters associated with it which specify the specific actions and behaviours required during the execution of the typical operations, such as a source, a destination or a period of time.

The shorthand for the canned operations can be considered analogous to a programming language and the use of common operations enables standardisation and the creation of routines, sub-routines, etc.

The use of existing canned operations and combinations of several canned operations in a sub-routine enables the creation of high-complexity protocols with minimal effort and high reliability. This also allows the decoupling of operational detail from the main protocol execution program, so that changes to the behaviour in the execution of a specific operation can be instigated with minimal effort and without affecting the overall execution of an entire protocol.

Figure 39:
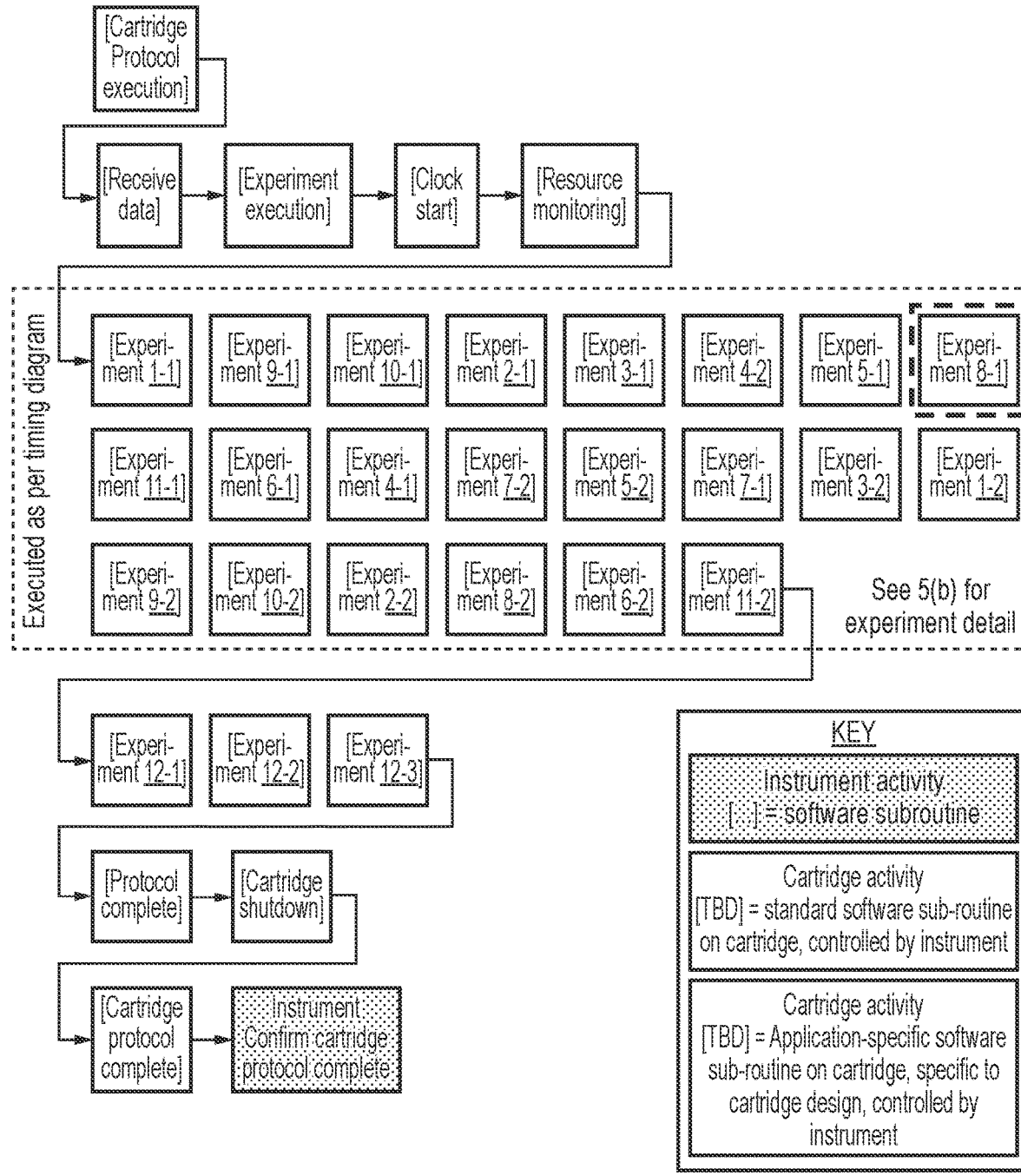
FIG. 39 is a protocol execution timing diagram for the performance of an experiment according to an embodiment of the present invention.
Figure 39:
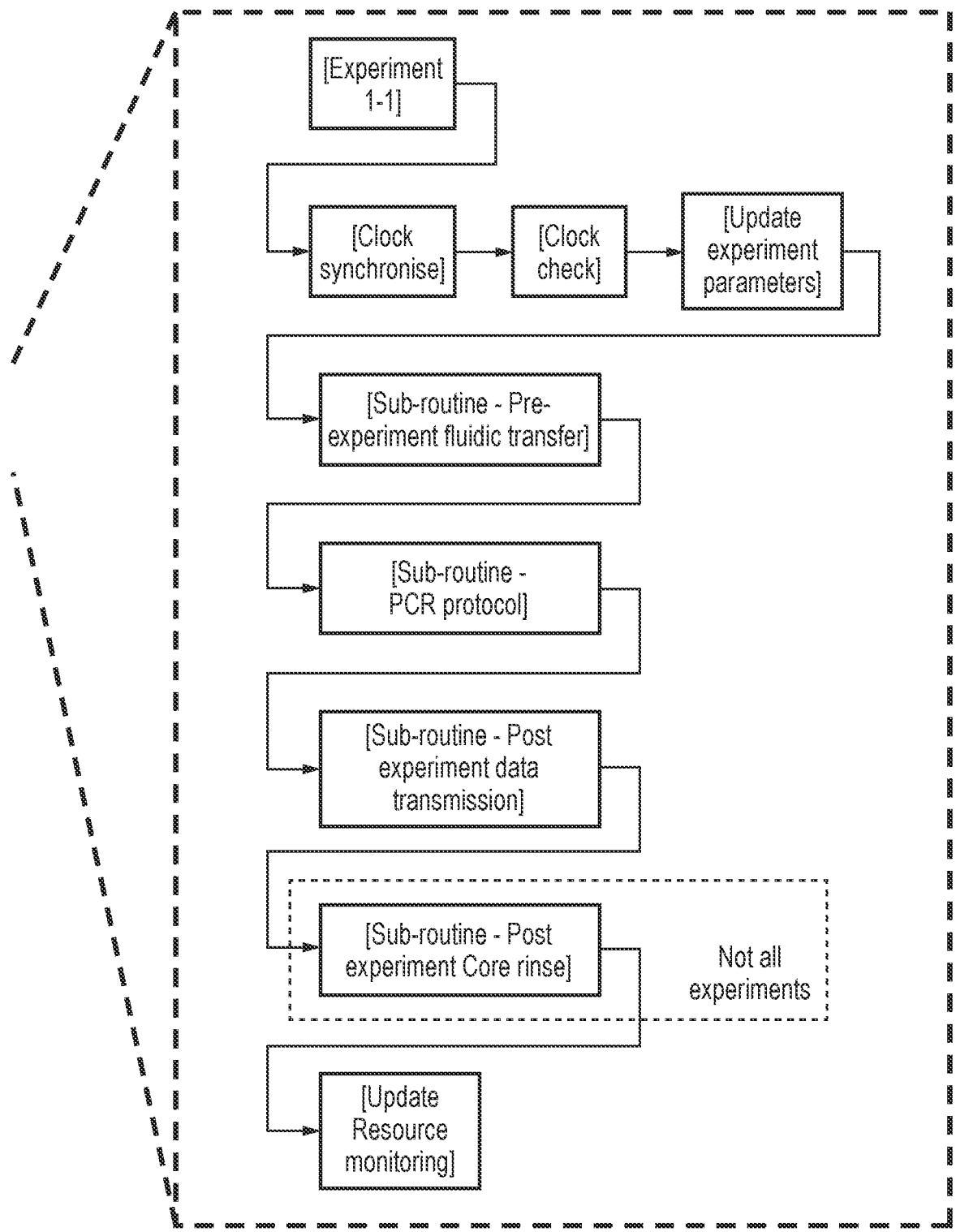

FIG. 39 shows an example of use of canned operations in sub-routines used in the protocol executed within the high complexity PCR cartridge, with the sequencing of each canned operation determined by the cartridge clock.

The software code to execute the [Liquid transfer] canned operation identifies the liquid packet required in addition to the start and destination addresses required.

Sub-routines build on the functionality described above and codify and synchronise sequences of canned operations. Sub-routines provide another layer in the hierarchy of the method of operation enabling modification to particular aspects of the protocol that can ripple through a complete protocol reducing risk of errors and minimising development effort.

Cartridges will have two classes of sub-routine: standard sub-routines which codify common procedures required for each cartridge regardless of specific functionality such as testing and priming of cartridge prior to use; and application specific sub-routines which are specific operations to be carried out specific to each cartridge design and can differ between each cartridge design, such as the rinsing of cores between PCR experiments which is highly specific to the PCR cartridge embodiment.

The hardware described in the embodiments above has a number of standard operations that need to be carried out when a cartridge is loaded on the instrument and prior to protocol execution (e.g. cartridge built-in test, priming of the cartridge etc.). These operations occur regardless of the cartridge design or protocol to be executed.

Standard sub-routines prove a convenient way to describe standard operations avoiding the need to re-create these processes each time a new cartridge design is created.

Exemplary cartridge standard sub-routines include but are not limited to:

[Cartridge BIT]—tests key cartridge hardware to check correct function when the cartridge is first loaded onto the instrument

[Cartridge Prime]—removes air from the cartridge fluidic pathways & primes the main busses with the relevant liquids

[Cartridge Shutdown]—moves all liquid to relevant storage areas and de-pressurises the cartridge prior to removal from the instrument and disposal.

In addition to standard sub-routines for typical cartridge operations, it is possible to use sub-routines to describe application specific operations required for each differing cartridge design. In contrast to standard sub-routines, custom sub-routines are created for each application specific and the creation of these custom sub-routines forms the basis of cartridge design and the focus of the design effort.

The high complexity PCR cartridge of the embodiment described above embodies several custom sub-routines that create a single PCR experiment:

[Sub-routine—Pre-experiment fluidic transfer]—transfers all liquids to the relevant core/caches

[Sub-routine—PCR protocol]—executes the thermal and optical operations in the PCR reaction

[Sub-routine—Post-experiment data transmission]—transmits experimental data to cloud database

[Sub-routine—Post experiment core rinse]—transfers liquids to core/caches being used to carry out further PCR reactions The use of sub-routines and canned operations allows a high-complexity protocol to be described in a concise manner with the detail required behind each operation hidden in look-up tables.

By describing the top-level protocol, the standard instrument computer controller is able to execute the operation of the cartridge in a flexible manner using the clock to schedule different operations in parallel and as efficiently as possible.

For example the protocol executed on the high complexity PCR cartridge of the embodiment described above comprises multiple PCR experiments each with differing experimental parameters (e.g. temperature) and differing durations. Protocol execution ensures that these multiple experiments are executed in the most optimum manner that enables multiple experiments in parallel yet using as few resources as possible.

Protocol execution in the specific format enables the ability to accept inputs and protocols from numerous other external software sources databases (e.g. Microsoft Station B and other lab software platforms) at a higher level that can then be converted into a format that can be executed on the cartridge.

Moreover, the overarching format of the program structure can be modified and updated as required to interact with existing and future standards that standardise descriptions of genes and biological parts (e.g. the SBOL standard) as well as databases of existing biological parts (e.g. iGEM Registry of Standard Biological Parts).

In the case of networked cartridges and/or instruments, the standard protocol execution allows the same protocol or parts of the protocol to be pushed out to multiple locations on a network. For example this can enable an identical protocol to be pushed out to a network to enable multiple replicates and/or portions of very high complexity protocols may be delegated to different locations on one or multiple networks enabling the massive parallelisation of massive experiments regardless of physical location.

Protocol execution will typically differs between cartridge designs. Protocol execution may also differ for each use of a specific cartridge design. As the protocol execution is controlled by the instrument (via software) it can be edited and updated as required. Further, protocols can be updated to resolve issues and/or further optimised as experimental data is obtained for each cartridge design.

However, protocol execution is also not necessarily specific to a cartridge design and protocols (via software) may be transferred to other cartridge designs as required. In this way cartridge designs and the protocols executed on them are interchangeable enabling a fixed cartridge design to execute a single protocol that is updated as required to enable further optimisation or brand new protocols that exploit the existing cartridge design in new and different ways. Similarly a fixed protocol may be executed on a cartridge design that is updated as required to enable further optimisation and/or on brand new cartridge designs either as a complete protocol in its own right or as part of a larger, higher complexity protocol.

The establishment of the entire protocol on the high complexity PCR cartridge of the embodiment described above starts with identifying the timing diagram and execution logic for each PCR experiment. Each experiment comprises custom sub-routines and resulting canned operations.

It is then necessary to identify specific parameters (e.g. differing temperatures, quantities of PCR reaction cycles etc.) and the timing duration for each PCR experiment. A top-level protocol execution plan then identifies series and/or parallel execution of PCR experiments to reduce overall protocol duration and minimise hardware resources.

This enables the construction of a protocol execution timing diagram which identifies the specific clock cycle that specific sub-routines for each PCR experiment should be executed at. This protocol execution timing diagram is then used to create the protocol execution logic diagram that identifies additional standard sub-routines required in addition to each PCR experiment as shown in FIG. 39.

The protocol execution logic is then used to create the specific program for the execution of the protocol on the high complexity PCR cartridge.

Additional Method of Operation Functionality

This section describes potential Method of Operation functionality that is not embodied in the high complexity PCR cartridge described above but could be exploited in other cartridge designs and protocols.

Flexible Protocol Execution

The standard instrument computer controller enables flexible routing of materials within the cartridge during protocol execution. Cartridge address locations are mapped, and the computer controller is able to identify multiple possible options to execute an operation and select the most appropriate operation execution route accordingly. For example in the [Liquid transfer] operation within a sub-routine, the movement of liquid from one address to another may be possible via several routes and the opening of different combinations of valves.

Therefore the standard instrument computer controller is arranged to assess the multiple potential routes for each liquid packet several clock cycles ahead of execution and check for potential collisions of liquid packets on the available routes.

This flexible protocol execution manner enabled by the use of liquid packet and the cartridge addressing schemes also enables the computer controller to respond to measurements and readings obtained during protocol execution and schedule/execute downstream operations thus providing a degree of adaptive control.

As part of this approach the computer controller can also analyse forthcoming operations in the protocol and select the optimum operation execution route relative to the cartridge workload anticipated at the forthcoming point in time.

The concepts of flexible protocol execution do not just apply to the transfer of liquid packets; for example it may be desirable to transfer reaction material from one core to another during the execution of a reaction. This functionality is highly desirable when multiple separate volumes of cells are being cultured in parallel. Liquid volumes/cell populations from a smaller core (e.g. 25 ml volume) can be transferred to a larger core volume (e.g. 75 ml) to accommodate expanding cell populations. This can leave smaller volume cores free to initiate further cell culture operations and by matching the right task to the right core volume, overall protocol execution is optimised. This approach is analogous to 'core threading' techniques used in SoC/IC applications.

Priority Based Servicing

The default operating method of a protocol within a cartridge is to run as many operations as possible in parallel. However, scenarios may arise where a specific protocol step needs to be carried out rapidly in response to unforeseen scenarios during protocol execution, such as if rapid transfer of a large bulk of material/liquid is required and this would take many, many clock cycles if carried out in parallel with other operations.

Flexible protocol execution enables the use of priority-based servicing where required to ensure each protocol operation has the most appropriate bandwidth required for peak protocol execution.

Redundant Functionality

As discussed above, cartridges may contain redundant features (e.g. an excessive number of core gates) that are not expected to be used in the normal execution of a protocol but provide a degree of flexibility if required for unforeseen issues during the execution of highly complex protocols.

Redundant functionality within a cartridge is also highly beneficial for high complexity biomanufacturing processes with variable quality starting material (e.g. raw material taken from patients in the case of cell and gene therapies). There may be a number of processing routes within the cartridge that could be executed on by the instrument computer controller although this cannot be determined until raw material enters the cartridge and the protocol commences. The instrument computer controller can then decide which processing route to adopt in a given process based on data from the ongoing process.

Cartridge Design and Use Methodology

This section describes a biomanufacturing protocol and design/simulation tools according to embodiments of the present invention. This design methodology is an overarching aspect and enables the realisation of the benefits of the hardware described above.

Figure 40:
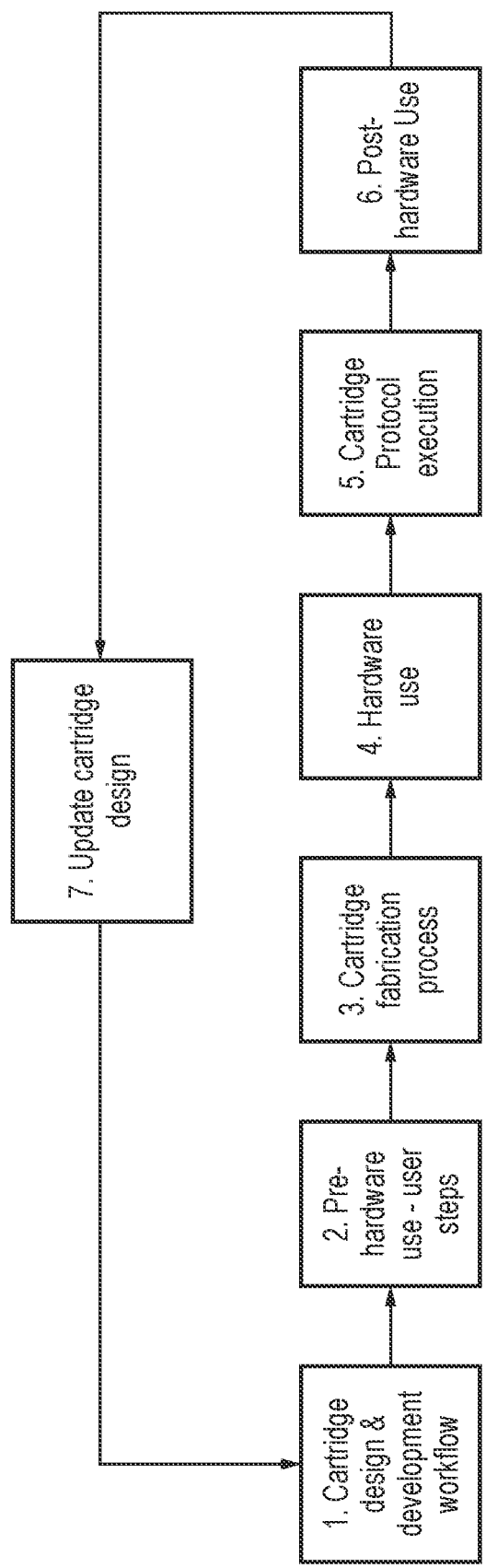
FIG. 40 is an overview of the cartridge design workflow steps.

The methodology described in this subsection of the document describes the process used to design the cartridges according to embodiments of the present invention, such as the high complexity PCR cartridge described in detail above and can be considered analogous to the methodology used in the design of custom SoCs. An overview of the cartridge design workflow is shown in FIG. 40.

Digital Master File

The digital master file is the electronic documentation required for a particular cartridge. It records all aspects of the cartridge including:

Original design intent and associated documentation and data (e.g. protocol timing diagrams)

Fabrication related documentation and data (e.g. CAD data and 3D printer settings)

Testing and Quality Control test data (e.g. data required for all post-3D printing tests)

Cartridge use and history data (e.g. cartridge serial number, user ID, order number etc.)

Cartridge Design & Development Workflow

Figure 41:
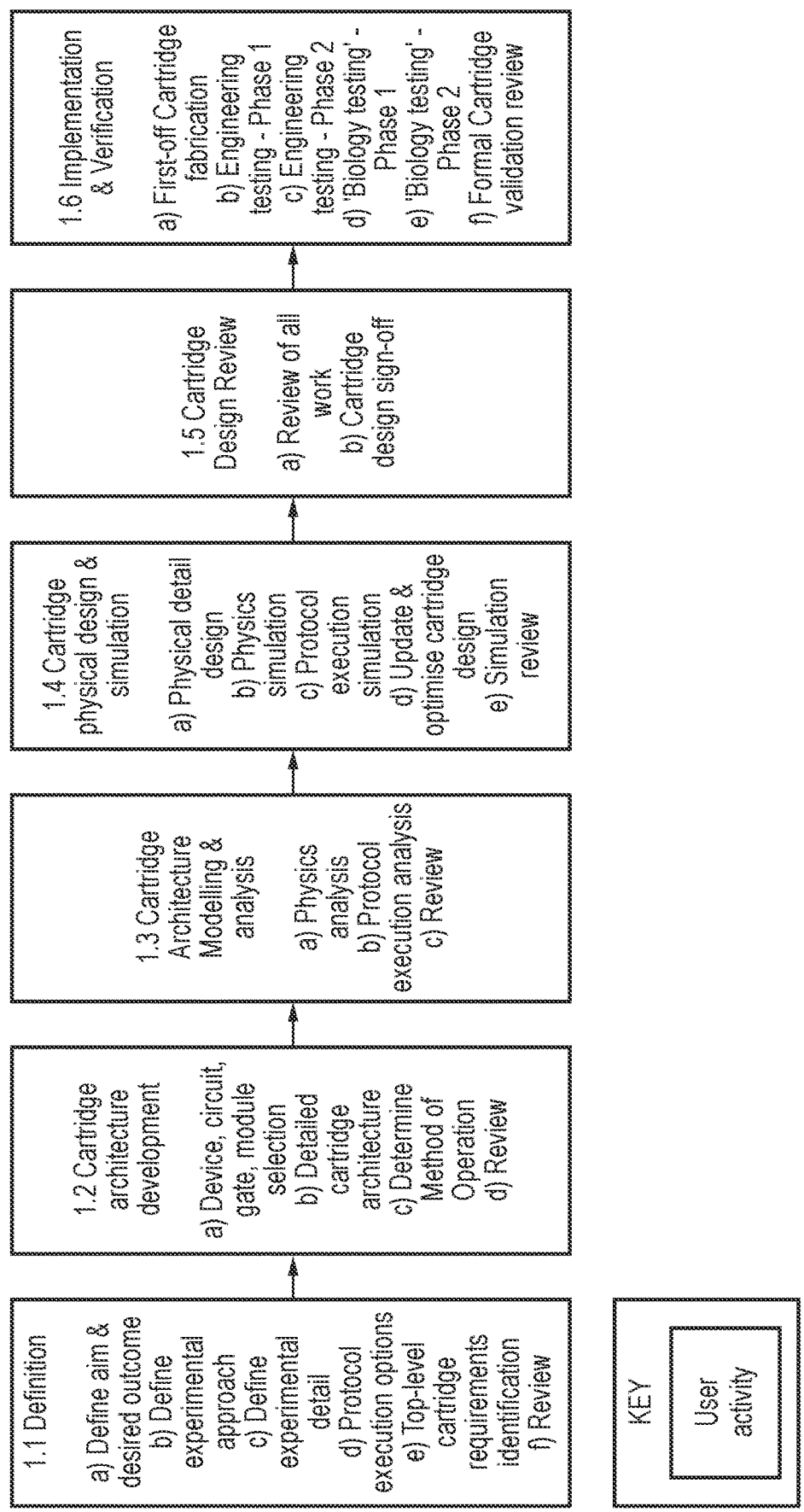
FIG. 41 is an overview of the cartridge design and development workflow steps.

The design and development workflow is the first step in the cartridge design and use methodology as shown in FIG. 40. The constituent sub-steps of this step are shown in FIG. 41. The outputs of all of the steps of the cartridge design are stored in the Digital Master File for that cartridge design.

1.1 Definition

This step involves defining the overall bioproduct R&D experiment and possible execution routes to identify top-level cartridge requirements.

a) Identification of Top-Level Aim of the Process and Key Desired Outcomes

For the high complexity PCR cartridge embodiment which is performing an R&D application, minimal work is likely to be required prior to following the methodology set out below. However, biomanufacturing applications would likely require the following aspects to be identified prior to commencing this cartridge design process:

Identification of overall biomanufacturing process;

Quality Assurance (QA) checks required within the process;

Critical Quality Attributes (CCQAs) of the bioproduct being manufactured;

Quality by Design (QbD) methodologies;

Critical Process Parameters (CPPs) for the biomanufacturing process.

The key steps in this stage are: identification of key investigation/production aim; identification of constraints; identification of baseline/control; identification of key process parameters and variables; identification of desired outcome.

b) Defining Experimental Approach

The aim of this step is to identify possible experimental approaches possible, resulting specific experiments or processes required and their parameters.

The key steps in this stage are: identification of overall experimental approach; identification of specific experiments; identification of values of key parameters for each experiment; identification of experimental materials; summary of experiment durations; identification of the maximum and minimum duration experiments.

c) Define Experimental Detail

The aim of this step is to identify the specific detail of each experiment to be performed in the cartridge to identify overall experimental steps, liquid packets required and clock cycle implications.

Defining liquid packets is key to cartridge design as this determines some or all of the following in latter steps: degree of parallel operation possible; the cartridge clock cycle; impact on overall protocol complexity; resulting complexity of the overall cartridge.

Optionally at this stage it may be useful to also identify specific storage, handling and transfer requirements for specific liquids and biological material contained within them.

The key steps in this stage are: identifying experiment liquids; determining liquid packet and clock cycle parameters; determining pre- and post-experiment steps and relevant details; determining specific experiment steps; determining experiment timing summary; identifying liquid packets and assigning IDs.

Firstly, the process establishes all liquids required per experiment and determines the total number of reaction vessels (cores and caches) required, as well as the volume(s) required in each.

Next the process determines the liquid packet size (the smallest liquid size used in the protocol) and thus the multiples of the packet size for each liquid used in the experiments. This allows the clock cycle unit to be determined so as to reconcile with experiment durations. As a guide, this unit is likely to be the time taken to transfer the minimum packet size from a main bus to a sub-bus.

Next a summary of the pre- and post-experiments steps is determined and specific steps and timing/clock cycles for those in order to establish relevant sub-routines.

Next the specific experiment steps are identified and a summary of maximum and minimum experimental durations created. Specific steps and timing/clock cycles for each sub-experiment are then determined.

An overall experiment timing summary can then be produced which is a graphical illustration of all experiment timing.

Finally the liquid packets used are identified and assigned IDs.

d) Protocol Execution Options

The aim of this step is to identify available options/routes to execute the multiple experiments previously identified.

This step may be less applicable to R&D experiments (e.g. such as the PCR reactions carried out in the high complexity PCR cartridge) where there may be minimal execution options. However, it is likely to be highly applicable to biomanufacturing protocol execution where multiple protocol execution options may exist dependent on input material (e.g. starting raw material will differ between patients).

This step defines the order of experiment execution and identifies desired protocol execution behaviour prior to the implementation of a physical cartridge design (i.e. separating desired behaviour from physical architecture design).

Requirements may differ between protocols resulting in different drivers (e.g. one protocol may need executing in a short-as-possible overall duration whereas other protocols may prioritise using minimal resources).

This step involves: identification of experimental protocol execution options, decision points and resulting experimental routes based on information from the previous step; identification of additional functionality required to enable multiple protocol execution routes such as additional sub-routines and identification of additional liquid packets required.

e) Top-Level Cartridge Requirements Identification

This step defines the relevant cartridge architectures to identify cartridge functionality required to execute the desired experiments. This is the identification of 'what' functionality should be on a cartridge and is the first step of defining cartridge requirements; it is not the 'how' it is executed which is described further below.

This step involves: a review of experimental execution routes and associated liquid volume information; identification of total liquid volumes required; identification of top-level cartridge requirements; selection of appropriate standard cartridge architecture; creation of top-level cartridge architecture.

f) Review of Definition

This step reviews all the activity carried out to ensure alignment between the original experimental aim identified in a) and the resulting output of following steps.

1.2 Cartridge Architecture Development

The aim of this activity is to define the overall architecture for the cartridge required to execute the experiments defined in the previous stage.

a) Device/Circuit/Gate/Module Selection

The aim of this step is to identify and select the relevant devices/circuits/gates/modules from relevant libraries that will enable a cartridge design to realise the top-level cartridge requirements identified in step 1.1 e).

This step involves: review and identification of relevant and available devices/circuits/gates/modules applicable to selected cartridge architecture; identification of new devices/circuits/gates/modules required if not available/absent; identification of applicable cartridge architecture, cartridge engine and devices/circuits/gates/modules required.

b) Detailed Cartridge Architecture

The aim of this activity is to define the detailed cartridge architecture and schematic for the physical cartridge layout. This step pulls together output from the following previous steps: protocol execution routes; liquid characteristics; device/circuit/gate/module selection (step 1.2a) above).

This step involves creating a specific cartridge schematic and creating cartridge address locations. The output of this stage is a cartridge architecture/engine schematic, the identification of separate fluidic and pneumatic circuits for functionality tests and a cartridge address list.

c) Determining Method of Operation

The aim of this step is to define the cartridge method of operation, which defines how the cartridge architecture (step 1.2b) will execute the Protocol execution route (step 1.1d).

The method of operation describes 'how' the protocol is to be executed on the cartridge (i.e. steps and valves opening). In particular the method of operation defines the relevant canned operations to be executed and the specific sequence the canned operations will be executed in. This step also identifies the overall protocol control program required to implement the protocol on the cartridge and standard instrument and the parallelisation of different operations.

This step involves creating a list of all sub-routines required and timing diagrams; creating programs for all sub-routines; update sub-routines with canned operation references (table); reviewing the protocol execution plan identified earlier and re-ordering experiments to minimise overall duration; and creating a complete timing diagram for whole protocol.

d) Review Cartridge Architecture Development Work

This step involves reviewing all the cartridge architecture development activities to ensure alignment with the overall definition work identified in stage 1 and the outcome from the previous review (step 1f).

1.3 Cartridge Architecture Modelling and Analysis

This step involves carrying out modelling and analysis work on the cartridge architecture developed in the previous step to ensure it will be capable of executing the experiments/biomanufacturing protocol as desired.

a) Cartridge Physics Modelling

The aim of this step is to understand the overall physical performance of the cartridge architecture. As the cartridge architecture is made up of devices/circuits/gates/modules it is necessary to model the physical behaviour of each of these elements separately and then in various combination to understand overall cartridge architecture physical behaviour.

Due to the strong reliance of overall cartridge architecture on lower level module performance it is necessary to carry out numerical modelling and analysis of module performance and also resulting cumulative effects of multiple modules integrated into one cartridge design. For example static and dynamic performance of pneumatic check valves are very important for determining flow rates of reagent and hence overall system performance This modelling at this stage is based on the cartridge schematic and module data sheet rather than a physical design. The emphasis is on numerical analysis (i.e. based on physics-first principles) not extensive computational simulation.

The ability to separate module analysis from overall cartridge architecture is another benefit of the invention architecture utilising a hierarchy and abstraction approaches. The module analysis includes static performance (wet and dry), dynamic performance (wet and dry) operating range.

This step involves the identification of specific physical scenarios of interest within the protocol, such as simultaneous operation of multiple modules at high temperature; analysis of the physical behaviour of individual modules to relevant protocol scenarios, for example characterising individual module performance at high temperature; and analysis of emergent behaviours present in overall cartridge when all modules integrated, for example characterising multiple modules operating at high temperature.

This allows a physics analytical baseline and the cartridge architecture to be reviewed and updated as required.

b) Protocol Execution Modelling

The aim of this step is to understand the ability of the cartridge architecture to execute the method of operation identified in earlier steps. The modelling considers aspects such as material throughput, traffic analysis, protocol execution times, resource utilisation, clock cycles etc. to ensure the optimum cartridge architecture.

In particular the protocol execution modelling includes: scaling of cartridge architectures; speed/throughput; physical size; timing; frequency response; energy consumption; protocol scheduling; cartridge operating range.

This step builds on the benefits of re-usable sub-routines and libraries of canned operations with known performance.

In this step the method of operation identified in step 1.2c is reviewed in particular in order to: identify specific protocol execution scenarios of interest, such as high traffic scenarios occurring with high degree of parallelisation; analyse protocol execution behaviour of individual modules of interest, for example main bus liquid transfer capacity vs demand; analyse protocol execution emergent behaviours present in overall cartridge for identified scenarios, such as the resulting behaviour of multiple busses operated in parallel; run each identified protocol execution scenario, in particular with analysis being carried out at extremes of all possible scenarios (e.g. maximum material being processed, and minimal material being processed); create protocol execution analytical baseline and review and update cartridge architecture as required.

c) Modelling and Analysis Review

The aim of this step is to review the cartridge architecture analysis work to ensure alignment with the overall definition activity review (step 1f) and also the cartridge architecture development activity review (step 2d) and sign off the cartridge architecture.

1.4 Cartridge Physical Design and Simulation

The aim of this step is to turn the cartridge architecture created in the previous steps into a physical cartridge design that can be fabricated.

a) Physical Detail Design

This step involves the creation of a cartridge physical layout design based on: the cartridge architecture schematic; the method of operation; the module and architecture physics analysis from Step 1.3a and the architecture protocol execution analysis in Step 1.3b. It also involves detail design of the cartridge microarchitecture and individual elements.

b) Physics Simulation of Physical Cartridge Design

The aim of this step is to carry out a physics simulation to verify the performance of the cartridge physical design to the physics modelling baseline developed in step 1.3a by review of physics analytical baseline created in step 1.3a, creation of a cartridge physical design simulation and comparison of simulation data to physics analytical baseline created in step 1.3a.

c) Protocol Execution Simulation of Physical Cartridge Design

The aim of this step is to carry out a protocol execution simulation to verify the performance of the cartridge physical design to the protocol execution modelling baseline developed in step 1.3b and to ensure that the desired protocol execution schedule is feasible within the physical design of the cartridge and that all cartridge resources are adequately utilised.

In particular the aim is to identify scenarios where the system could collapse & prevent protocol execution, such as a 'dead lock' which occurs where a cartridge resource is required simultaneously for two separate steps, or 'race' conditions which occur where cumulative timing/scheduling errors cause issues.

This step involves review of protocol execution analytical baseline created in step 1.3b, the creation of a protocol execution simulation and the comparison of simulation data to protocol execution analytical baseline created in step 1.3b.

d) Update and Optimise Cartridge Design

This step involves updating the cartridge physical design to reflect any updates and improvements identified in the simulation work carried out resulting in an optimised cartridge physical design. In particular there may be detailed optimisation of physical cartridge design to suit individual steps of the protocol execution, such as tuning of specific fluidic track diameters/surface properties to suit the condition of biological material at each stage and use of 3D printing specific software to 'tune' the physical design geometry to suit 3D printing platform being used.

e) Simulation Review

This step involves reviewing the cartridge physical design and simulation results with the findings of previous reviews to ensure alignment with the overall definition review (step 1.1f), the cartridge architecture development activity review (step 1.2d) and the cartridge architecture analysis review (step 1.3c).

1.5 Cartridge Design Review

The aim of this review is to step through all the cartridge architecture and cartridge physical design work to ensure it satisfies the original aims of the experiment/biomanufacturing protocol identified in the definition step.

This step involves formal verification review of the output of each activity in the cartridge design methodology, resulting in design sign off of physical cartridge design and the physical design being locked down and 'frozen'.

1.6 Cartridge Design Verification

This step involves the fabrication and testing of the cartridge design signed off in the previous review.

a) First-Off Cartridge Fabrication

Firstly the first-off cartridges (physical cartridge prototypes) are fabricated and 'engineering' testing protocols, based on simulation work carried out in step 1.4, and 'biology' testing protocols, based on protocol execution work carried out in step 1.1 are created.

b) Engineering Testing—Phase 1

The aim of this step is an initial evaluation of the performance of the fabricated cartridge to the physics and protocol execution simulations carried out in Activity 1.4.

This involves engineering-based testing of module performance compared to the design specification. This can include the physical behaviour of the cartridge (e.g. fluidic flow properties, thermal behaviour etc.) and the protocol execution behaviour (e.g. material transfer cycle time experiments).

It also involves engineering-based testing of complete cartridge performance compared to the design specification. This can again include physical behaviour (e.g. overall fluidic flow properties throughout cartridge, thermal behaviour of adjacent modules and cumulative thermal performance) and protocol execution behaviour (e.g. ability to execute overall steps desired at each clock cycle).

When completed, the module and cartridge performance is reviewed compared to the design specifications and the cartridge physical design updated as required.

c) Engineering Testing—Phase 2

This step involves carrying out further testing of any updates made to the cartridge design following findings in step 1.6b. Thus the 'engineering' testing protocols are repeated, the module and cartridge performance reviewed compared to design specifications and the cartridge physical design updated. This process can be repeated as required to optimise the physical cartridge design.

d) Biology Testing—Phase 1

The aim of this step is an initial evaluation of the performance of the fabricated cartridge compared to the method of operation identified in step 1.2c using actual protocol materials.

This involves biology-based testing of each protocol step and of the complete protocol. When completed the results are reviewed and the protocol and cartridge physical design are updated as necessary.

e) Biology Testing—Phase 2

This step involves carrying out further testing of any updates made to the cartridge design and/or protocol following findings in step 1.6d. Thus the 'biology' testing protocols are repeated, the results reviewed and the protocol and cartridge physical design updated as necessary. This process can be repeated as required to optimise protocol execution.

f) Formal Cartridge Validation Review

This step involves reviewing all of the engineering and biology verification tests to ensure satisfactory performance of the cartridge. At the end there is formal sign off of all documentation and cartridge physical design and the cartridge design and digital master file can be transitioned from 'In-design' status to 'Available' status on a database of cartridge designs for on-demand fabrication.

Pre-Hardware Use—User Steps

Following cartridge design it is necessary for a user to select and order the relevant cartridge to initiate the fabrication process and enable the physical cartridge to be shipped from the local fabrication facility. This is step two in the overall methodology shown in FIG. 40.

Once a particular has been designed, it is necessary for a user to order a cartridge and initiate the cartridge fabrication process.

Once a user has determined that a particular functionality or reaction is required (e.g. PCR), the user accesses an online catalogue of available cartridge designs and selects the most appropriate cartridge available. An order is placed via an online system.

Once the order for the cartridge has been placed the online system generates an order number that is used to identify and track the cartridge during fabrication and use and the cartridge order is then sent electronically to a cartridge fabrication facility that is local to the user. Cartridge fabrication facilities will ideally be located in each major city, region and country to enable rapid, on-demand fabrication of cartridges to suit local needs. Cartridge fabrication facilities can also be provided in point-of-care settings such as doctors' surgeries, hospitals, care homes etc.

Cartridge Fabrication Process

The selected cartridge is fabricated on-demand at a fabrication facility local to the user. The fabrication process is common to all current and future cartridge designs due to the ability of a 3D printer to fabricate multiple cartridge designs using an identical 3D printing process.

Figure 42:
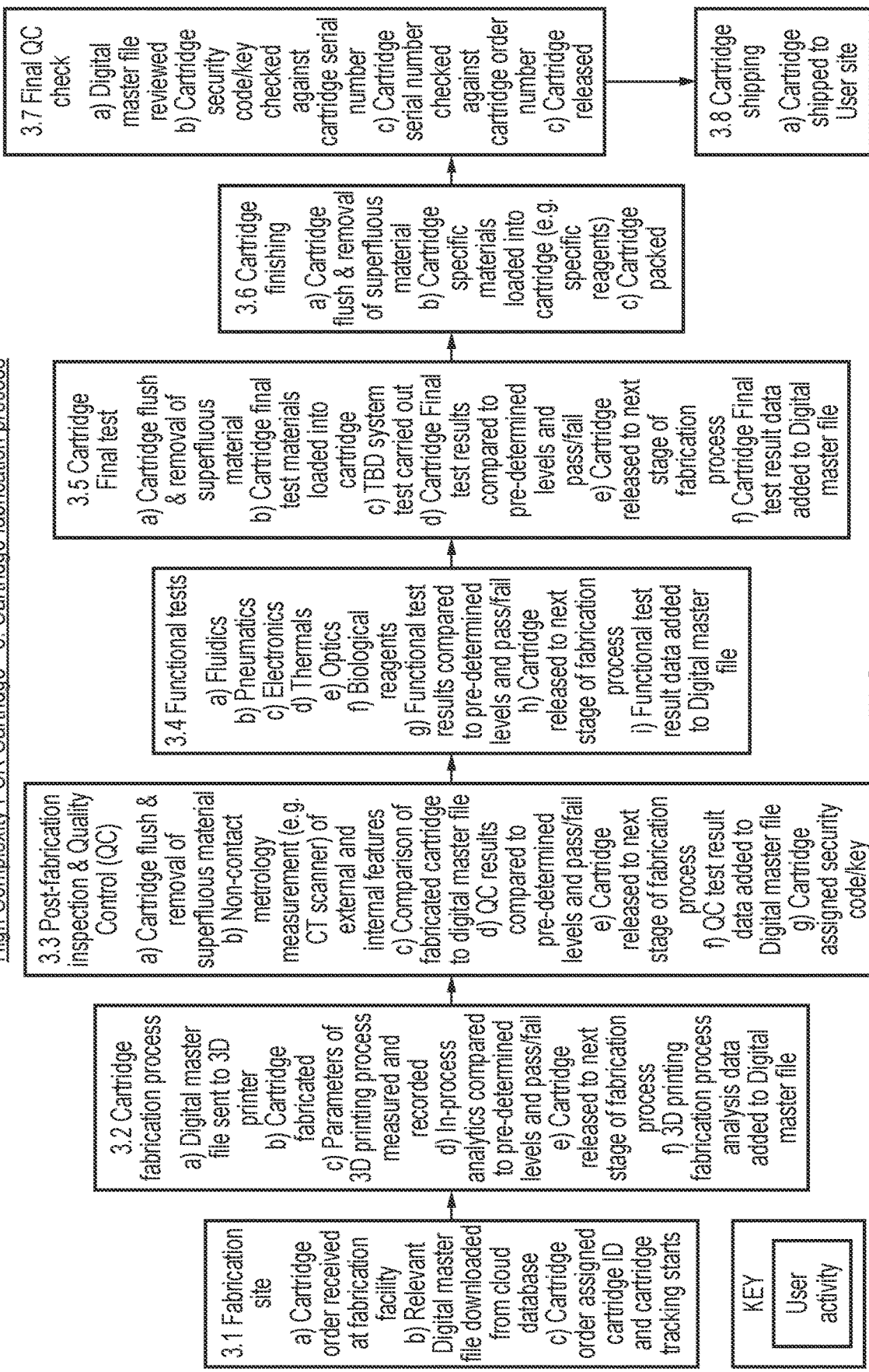
FIG. 42 is an overview of the cartridge fabrication process steps.

Thera are multiple steps in the cartridge fabrication process as illustrated in FIG. 42.

3.1 Pre Fabrication Activity

This step includes all activity required prior to the actual cartridge fabrication commencing.

a) Cartridge Order Received

The electronic order placed by the user via the online catalogue is sent via electronic methods (e.g. e-mail) and received at the local fabrication facility where an order acknowledgement is then sent to the user.

b) Digital Master File Download

The order identifies the specific cartridge design required (for example the high complexity PCR cartridge) and the relevant digital master file is downloaded from the cloud database.

c) Cartridge ID Assigned

Once the relevant digital master file has been downloaded, the Cartridge order and relevant digital master file are assigned a cartridge ID reference (e.g. serial number or barcode) to enable tracking and traceability through the cartridge fabrication process.

3.2 Cartridge Fabrication Process

This step involves the actual fabrication of the selected cartridge via a commercially available 3D printer. Relevant information from the fabrication process may be added to the digital master file for that particular cartridge for QC and audit trail purposes.

a) Digital Master File Sent to Printer

Once a tracking number has been assigned to the order the digital master file (containing fabrication process data) is sent to the 3D printer via electronic methods (e.g. electronic file transfer).

b) Cartridge Fabricated

The 3D printer then fabricates the selected cartridge in relevant quantities in a batch. The batch size will suit fabrication demand at that particular time meaning the cartridge could be fabricated in a batch of one (i.e. just the single cartridge that has been ordered) or a batch of multiple, differing cartridges. The latter scenario exploits flexibility of 3D printing to fabricate very different cartridges for differing applications in the same batch in a volume-agnostic manner.

At this stage the cartridge ID reference is physically marked on the cartridge body.

c) Fabrication Process Measurement

During fabrication of the cartridge, relevant parameters of the 3D printing process are measured and recorded for Quality Control purposes. This may include cartridge build time, 3D printing process settings, position of cartridge in 3D build envelope, raw material batch numbers etc.

d) Review Fabrication Process Measurement Data

Following the cartridge fabrication, the process measurement data collected is reviewed to ensure the key parameters remained within pre-defined limits.

e) Cartridge Released to Next Stage

If satisfactory then the printed cartridge is then given a 'pass' and proceeds to the next step of the fabrication process.

f) Data Update

Following the 'pass', the 3D printing fabrication process data and process measurement data collected is added to the digital master file for traceability purposes.

3.3 Post-Fabrication Inspection and Quality Control (QC)

Following cartridge fabrication, it is necessary to confirm that the cartridge has been fabricated correctly. The high degree of integrated functionality within the cartridge volume requires the use of invasive, non-destructive inspection techniques.

a) Preparation for Inspection

The 3D printing fabrication process may leave residue and other liquid in the internal pathways and geometry of the cartridge. It is necessary to flush the internal pathways with water (or similar liquid) to remove the superfluous material prior to inspection.

b) Non-Contact Measurement

Internal features and pathways within the internal volume of the cartridge cannot be accessed for inspection without destruction of the cartridge. It is therefore necessary to use non-contact methods (e.g. CT scanning, X-ray methods etc.) to scan the physical cartridge and create a digital model of the physical cartridge.

c) Results Compared to Digital Master File

The digital model of the physical cartridge thus created is then imported into the relevant software (e.g. CAD software) to enable virtual comparison of the physical cartridge with the original digital master file.

d) Review Inspection Process Data

Digital inspection data from the physical cartridge is then reviewed compared to the digital master file to ensure the key parameters of the fabricated cartridge are within pre-defined limits.

e) Cartridge Released to Next Stage

If satisfactory then the printed cartridge is then given a 'pass' and proceeds to the next step of the fabrication process.

f) Data Update

Following the 'pass' result the quality control test and process measurement data collected is added to the digital master file for traceability purposes.

g) Cartridge Security Key

Following fabrication & inspection of the physical cartridge, a security key is created to ensure only the user that originally placed the order can access the relevant cartridge fabrication history. The security key is sent to the user via electronic means (e.g. e-mail).

3.4 Cartridge Functional Tests

With correct fabrication of the physical cartridge established, it is necessary to test each of the fabricated functions to ensure correct operation. Testing is carried out on a domain-by-domain basis.

a) Fluidics Functionality Test

The aim of this test is to ensure fluidic functionality within the physical cartridge functions correctly. To achieve this the physical cartridge is weighed and, for each fluidic circuit, the following steps are carried out:

A known liquid volume is loaded into the cartridge and the cartridge weighed.

A known liquid volume is transferred through all liquid volumes within each fluidic circuit in a manner simulating liquid transport operations in cartridge use.

Specific performance aspects of the liquid transfer routine are measured (e.g. transfer time, liquid flow rate etc.).

The known liquid volume is removed from cartridge and the cartridge weighed.

b) Pneumatic Functionality Test

The aim of this test is to ensure pneumatic functionality within the physical cartridge functions correctly. To achieve this the physical cartridge is connected to a compressed air supply and, for each pneumatic circuit, the following steps are carried out:

Measure each pneumatic valve and activation path air volumes—ensures correct fabrication;

Operate each valve (open/close operation) multiple times—ensures valve mechanism correctly fabricated;

Valve pressure integrity test—ensures each valve can operate over sustained duration;

Valve operation sequence test—valves operated in combination to ensure several valves can function simultaneously.

c) Electronic Functionality Test

The aim of this test is to ensure that the electronic functionality within the physical cartridge functions correctly. To achieve this the physical cartridge is connected to test connection points, for example by replicating the pins of the standard instrument mounting, and, for each electronic circuit, the following steps are carried out:

Continuity test of each electrical circuit—ensures successful fabrication of entire electrical circuit;

Sweep test passing pre-determined voltage and current flow through each electronic element—ensures each electronic element can operate with desired performance range;

Electronic operation sequence test—all cartridge electronic functionality (i.e. several electronic circuits) is operated in combination to ensure adequate simultaneous performance.

d) Thermal Functionality Test

The aim of this test is to ensure that the thermal functionality within the physical cartridge functions correctly. To achieve this the physical cartridge is connected to test connection points, for example replicating the connectors of the standard instrument mounting, and, for each thermal circuit, the following steps are carried out:

Continuity test of each thermal circuit—ensures successful fabrication of entire thermal circuit;

Temperature cycling test—each thermal device/circuit/gate is operated to generate a range of pre-determined temperatures—ensures each thermal element can operate with desired performance range;

Thermal operation sequence test—all cartridge thermal functionality (i.e. several thermal circuits) is operated in combination to ensure adequate simultaneous performance.

e) Optical Functionality Test

The aim of this test is to ensure that the optical functionality within the physical cartridge functions correctly. To achieve this the physical cartridge is connected to an optical test rig and, for each optical circuit, the following steps are carried out:

LEDs cycled to ensure correct operation;

Photodiodes (PDs) cycled to ensure correct operation;

Optical waveguide transmission test; a range of known wavelengths at multiple intensities are passed through optical waveguides and results measured;

Optical Operation test—each optical circuit operated as per protocol execution (i.e. LEDs, waveguides and PD's all tested);

Optical operation sequence test—all cartridge optical functionality (i.e. several optical circuits) are operated in combination to ensure adequate simultaneous performance.

f) Biological Reagent Functionality Test

The aim of this test is to ensure the correct fabrication of biological reagents in the physical cartridge. This test makes use of reference biological reagents that are fabricated in the cartridge at the same time as application specific reagents as described in the embodiments above. Satisfactory performance of reference biological reagents infers correct fabrication of application specific biological reagents. The specific tests are dependent on the cartridge but follow the common sequence of:

Liquid transferred to a test core/cache containing the reference biological reagents to rehydrate the reference reagents;

Rehydration of reference reagents measured with performance inferring performance of application specific dried reagents.

g)-i) Final Steps

The functional test results are compared to pre-determined levels and the cartridge pass/fail is determined. If the test results are satisfactory then the cartridge is then given a 'pass' and proceeds to the next step of the fabrication process. The functional test data and pass/fail result is appended to the Digital master file.

3.5 Cartridge Final Test

With the performance of the functionality in each domain established, it is now necessary to carry out a system test (i.e. functionality from several domains operating simultaneously) on the cartridge representing cartridge use in the specific application the cartridge has been designed for.

a) Preparation for System Test

Material from previous testing may leave residue and other liquid in the internal pathways and geometry of the cartridge. It is necessary to flush the internal pathways with water (or similar inert liquid) to remove the superfluous material prior to the system test.

b) Test Materials Loaded

As the system test is application specific, test materials specific to the operation of the cartridge (e.g. sample, buffer and nuclease-free water in the case of a PCR cartridge) are loaded into the cartridge prior to the system test.

c) System Test Carried Out

A series of application-specific tests are carried out on the cartridge to ensure the correct functioning of relevant functionality in the reaction/production cycle (e.g. fluidic, thermal, optical). This test is application specific for each cartridge design and could for example include a cell culture cycle for biomanufacturing related cartridge designs.

d)-f) Final Steps

The functional test results are compared to pre-determined levels and the cartridge pass/fail is determined. If the test results are satisfactory then the printed cartridge is then given a 'pass' and proceeds to the next step of the fabrication process. The functional test data and pass/fail result is appended to the Digital master file.

3.6 Cartridge Finishing

Following system testing it is then necessary to prepare the cartridge for shipping to the user location.

a) Removal of Test Materials

Material from previous testing may leave residue and other liquid in the internal pathways and geometry of the cartridge. It is necessary to flush the internal pathways with water (or similar inert liquid) to remove the superfluous material prior to the finishing steps.

b) Load Materials

The reagents required for final cartridge use (e.g. buffer, nuclease-free water in the case of a PCR cartridge such as that described in the embodiment above) are loaded into the cartridge.

c) Packing

The cartridge is placed into packaging materials ready for shipping to the user. The cartridge order number and cartridge ID reference are printed externally on the packaging materials.

3.7 Final QC Check

The cartridge undergoes a final review of all fabrication and test data as a final Quality Control (QC) step prior to shipping to the user.

a) Digital Master File Reviewed

Results from all inspection and testing are reviewed to ensure the measurements and test data are satisfactory prior to the release of the cartridge to the user.

b) Security Check

The cartridge security key previously sent to the user (step 3.2g above) is checked against the cartridge ID reference (i.e. serial number or barcode) to ensure the user can access the correct cartridge fabrication history.

c) Order Check

The cartridge ID reference (i.e. serial number or barcode) is checked against the cartridge order number created when the user placed the original order for the cartridge.

d) Cartridge Released

Once the above steps have been confirmed the cartridge is then released to be shipped to the user.

3.8 Cartridge Shipping

Following fabrication, the cartridge is then shipped to the user location by conventional transport options (post, courier, etc.). The user is informed of shipping electronically.

Hardware Use

Figure 43:
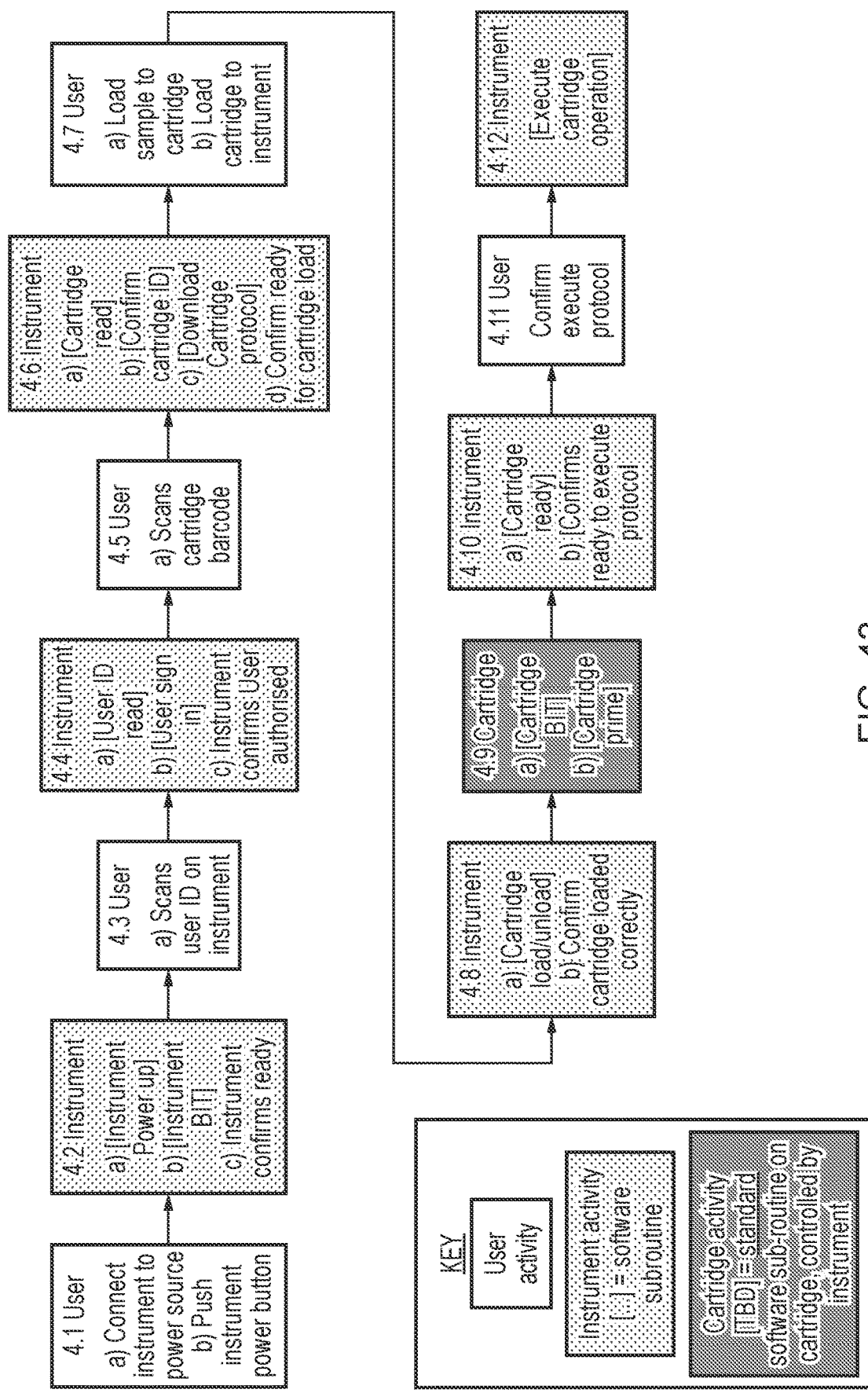
FIG. 43 is an overview of the process steps during use of a cartridge.

Once the user has received the cartridge, a workflow is required to load the cartridge onto the instrument to enable protocol execution. The steps in a hardware use workflow according to an embodiment of the present invention are illustrated in FIG. 43.

4.1 Initial User Activity

At the outset the user connects the instrument at a power source and pushes the power button to start the instrument.

4.2 Instrument Activity

The instrument automatically runs the [Instrument Power up] sub-routine to prepare it for use. The instrument then automatically runs the [Instrument BIT] sub-routine. This automatic routine carries out a basic test on instrument functionality including; i) each module, ii) enclosure functionality (e.g. fan) to ensure correct function. Once the automatic sub-routines have completed, the instrument confirms i) it is ready for use and ii) the user must log-in via messages on the instrument screen.

4.3 User Identification

Each user has a user profile and is required to log-into the instrument to ensure authorisation to use the instrument and cartridges. To log in the user scans user ID on the instrument camera. (Other authorisation/identification methods such as proximity tags may be used)

4.4 Instrument Authorisation

The instrument runs the [User ID read] sub-routine waiting for the user to scan their ID on the instrument camera. When a user ID has been read, the instrument then runs the [User sign in] sub-routine to i) check the user ID to the database of authorised users, ii) identify the user profile and applicable access level. The instrument then confirms that the user is authorised and prompts user to scan the cartridge via messages on the instrument screen.

4.5 Cartridge Identification—User

The user scans the cartridge ID reference (e.g. serial number or barcode) on the instrument camera, or uses other identification approaches implemented (e.g. RFID tags).

4.6 Cartridge Identification—Instrument

The instrument automatically runs the [Cartridge read] sub-routine to enable the instrument camera to read the cartridge barcode. Once the Cartridge barcode is read, the instrument automatically runs the [Confirm cartridge ID] sub-routine sending the cartridge ID to the cloud database and awaiting confirmation.

The instrument receives a confirmation command regarding the cartridge ID from the cloud database and then automatically runs the [Download Cartridge protocol] sub-routine to download the cartridge-specific protocol. Once this is complete, the instrument confirms it is ready for the cartridge to be loaded to the instrument via a message on the instrument screen.

4.7 Cartridge Load—User

Following instrument confirmation to the load the cartridge, the user loads any sample(s) required into the cartridge. The user then loads the cartridge to the instrument.

4.8 Cartridge Load—Instrument

Following step 4.6 the instrument is automatically running the [Cartridge load/unload] sub-routine in the background awaiting the user to load the cartridge. Once the user loads the cartridge, the sub-routine checks the output of the cartridge location sensor on the instrument. When the cartridge is correctly loaded the instrument indicates a 'correctly loaded' message to the user via the instrument screen.

4.9 Cartridge Test—Cartridge

Once the cartridge is loaded on the instrument, the instrument automatically executes the [Cartridge BIT] sub-routine. This carried out a basic functionality test on all addresses within the cartridge to ensure working including valves, LEDs, PDs, electronic functionality etc.

The instrument confirms the successful cartridge BIT result to the user via a message on the instrument screen. If the cartridge fails BitIT then this will also be communicated to the user prompting the user to remove the cartridge.

Following cartridge BIT, the instrument then automatically runs the [Cartridge prime] sub-routine to automatically purge air and prime all major busses within the cartridge in preparation for protocol execution.

4.10 Cartridge Test—Instrument

Once the cartridge has primed, the instrument automatically runs the [Cartridge ready] sub-routine that confirms the result of the cartridge BIT with cloud database and awaits confirmation to proceed. Once confirmation to proceed is received from the cloud database, the instrument is ready to execute the experimental protocol on the cartridge and informs the user via a 'ready to execute protocol' message on the instrument screen.

4.11 Confirmation—User

Once the instrument displays the 'ready to execute protocol' message the user confirms this via the instrument touchscreen.

4.12 Confirmation—Instrument

Once the user confirms the protocol execution the instrument automatically runs the [Execute cartridge operation] sub-routine.

Cartridge Protocol Execution

Once the cartridge has been loaded to the instrument, the experimental protocol can be executed.

Figure 44:
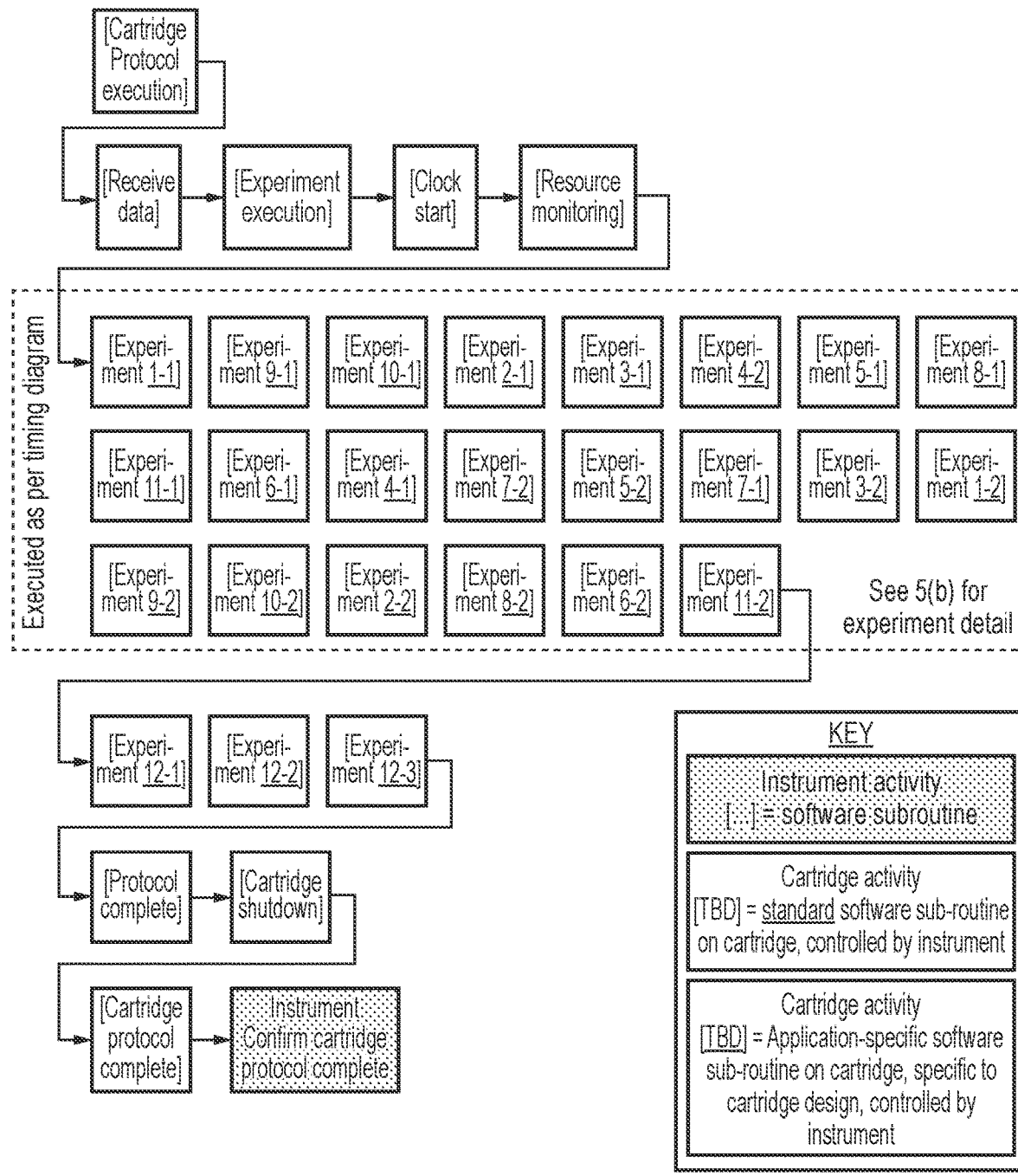
FIG. 44 is an overview of the protocol execution steps when performing a reaction on a cartridge.

There are multiple steps to the cartridge protocol execution workflow as illustrated in FIG. 44 for the exemplary protocol for the high complexity PCR cartridge described above. Table 1 below describes the execution of a software program controlled by the instrument computer and executed on the cartridge. The execution of specific experiments is described in after that table.

Protocol Execution Software Program

The software program comprises several sub-routines (see Method of Operation description) that are referred to as 'standard' and 'custom'. Standard sub-routines embody key steps required for every cartridge. Custom sub-routines are application specific and will vary considerably between each cartridge design (e.g. in this case PCR experiments carried out on the high complexity PCR cartridge).

TABLE 1

| Sub-routine reference | Sub-routine Category | Comment |
| --- | --- | --- |
| [Cartridge Protocol execution] | Standard | Commences the execution of the protocol on the cartridge and initiates any pre-experiment sub-routines prior to actual experimental routine. |

TABLE 1-continued

| Sub-routine reference | Sub-routine Category | Comment |
| --- | --- | --- |
| [Receive data] | Standard | The instrument requests updates to overall protocol settings from the cloud database. This function is particularly relevant if large scale experiments are being carried out over a wider network. |
| [Experiment execution] | Standard | Starts the actual PCR experimental routine. |
| [Clock start] | Standard | Sub-routine for the cartridge clock cycle for the synchronisation of each PCR experiment. Runs continuously in the background. |
| [Resource monitoring] | Standard | Sub-routine for monitoring of liquid consumption (e.g. sample, buffer, nuclease-free water) to ensure sufficient resources available as experiments commence. Particularly relevant for adaptive control strategies. Runs continuously in the background. |
| [Experiment x-y] | Application-specific | Sub-routine for execution of a specific experiment. |
| [Protocol complete] | Standard | Sub-routine ceasing protocol execution, confirms all experiments executed, stops clock cycle, stops resource monitoring. |
| [Cartridge shutdown] | Standard | Sub-routine initiating cartridge shutdown procedure in preparation for cartridge to be removed from instrument. Typical operations include: check status of all materials, stop pumps, purge all materials from cores etc. |

Once the cartridge has signalled to the standard instrument that it has completed the [Cartridge shutdown] sub-routine, the instrument executes the [Cartridge Protocol complete] sub-routine. This sub-routine transmits the experimental data to the cloud database.

The sub-routine also sends a 'cartridge used' status to cloud database for the specific cartridge ID reference to prevent future duplication of a used cartridge ID reference. The instrument then indicates to the user via messages on the instrument screen that the cartridge protocol has successfully executed, and the cartridge can be removed. The instrument then runs the [Cartridge load/unload] sub-routine waiting for the cartridge to be correctly removed from instrument.

Cartridge Protocol Execution—Experiment

Figure 45:
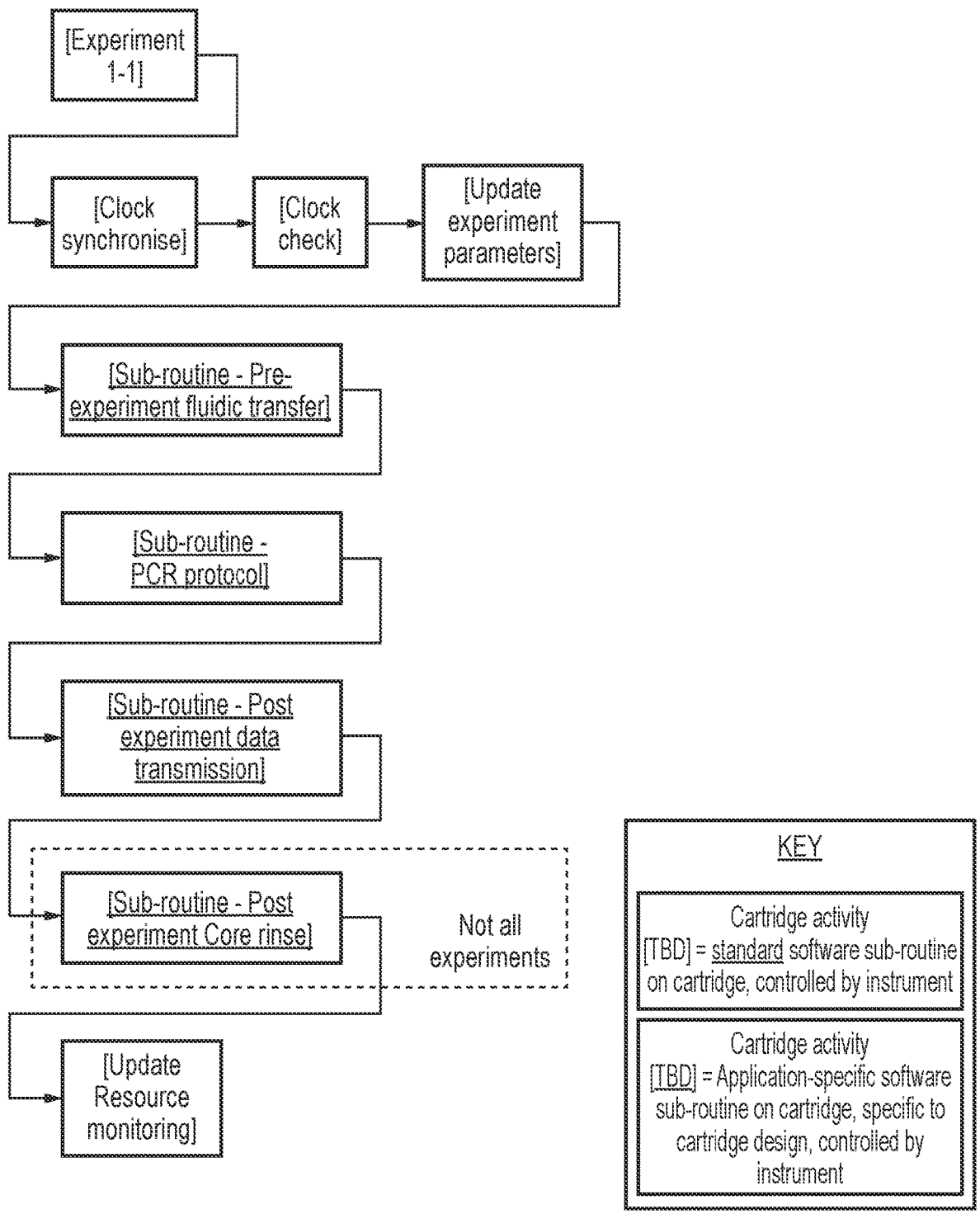
FIG. 45 is an illustration of the sub-steps in each experiment of the workflow shown in FIG. 44.

In the example of the use of the high complexity PCR cartridge according to the embodiment described above, the protocol executed by the cartridge comprises 25 separate PCR experiments. This section provides an overview of the sequence of steps used to execute each PCR experiment. FIG. 45 illustrates the steps in each experiment in outline. A description of the method of operation detail beneath each of the steps (i.e. sub-routines etc.) is described elsewhere in this document.

TABLE 2

| Sub-routine reference | Sub-routine Category | Comment |
| --- | --- | --- |
| [Clock synchronise] | Standard | This command synchronises the PCR experimental clock with the overall cartridge clock prior to experimental execution. |
| [Clock check] | Standard | This command continually checks the protocol timing diagram for when to commence the specific experiment. |
| [Update experiment parameters] | Standard | This command checks the cloud database prior to executing the PCR experiment & updates parameters for each specific experiment based on new data from other experiments on network. |
| [Sub-routine - Pre-experiment fluidic transfer] | Application specific | This sub-routine executes the transfer of liquid to relevant to relevant cores/caches prior to the PCR experiment. |
| [Sub-routine - PCR protocol] | Application specific | This sub-routine executes the PCR thermal and optical cycle. |
| [Sub-routine - Post-experiment data transmission] | Application specific | This sub-routine transmits the PCR experimental data to the cloud database. |
| [Sub-routine - Post-experiment Core Rinse] | Application specific | This sub-routine carries out the rinse cycle for cores/caches that will be used to carry out several experiments. |
| [Update Resource monitoring] | Standard | This command updates the instrument controller with the volumes of liquid consumed in the experiment. |

Post-Hardware Use Activity

Once the cartridge has successfully executed the protocol it needs to be removed from the instrument so the instrument can be shut down or receive another cartridge.

Figure 46:
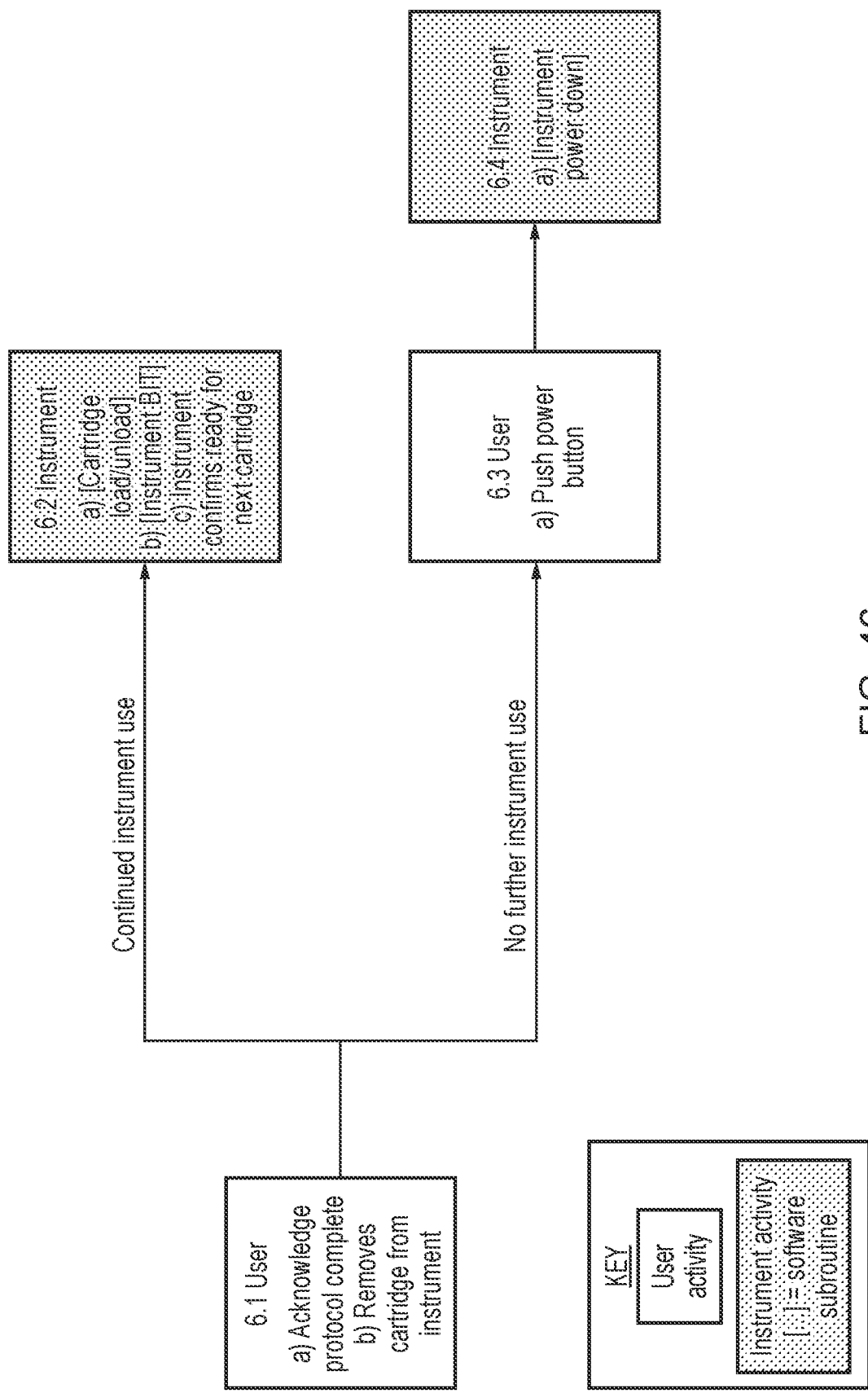
FIG. 46 is an overview of the workflow post hardware use.

The steps in the post-hardware use workflow are illustrated in FIG. 46.

6.1 Cartridge Removal

Once the instrument has indicated the cartridge protocol has successfully executed the user acknowledges the message and then removes the cartridge from the instrument and disposes of it.

6.2 Post-Operation Test

The instrument is automatically running the [Cartridge load/unload] sub-routine following completion of the cartridge protocol. The instrument senses the user removing the cartridge via sensors and this stops the [Cartridge load/unload] sub-routine.

Following successful cartridge removal, the instrument then automatically runs the [Instrument BIT] sub-routine (as per instrument start up routine) to test functionality on each module and enclosure functionality (e.g. fan) to ensure that it is ready for the next cartridge. Successful completion of the Instrument BIT then enables the instrument to display the 'Ready for next cartridge' message on the instrument screen.

6.3-6.4 Next Steps

The user may either load another cartridge or power down the instrument. Loading another cartridge results in the user returning to step 4.3 and following the steps previously described. If the user chooses to power down the instrument by pressing the instrument power button, the instrument automatically runs the [Instrument power down] sub-routine to shut down/de-pressurises all instrument functionality in both modules and the enclosure prior to power off.

Updates to Design

Following the execution of the protocol and the transmission of the PCR experimental data back to the cloud database there is an opportunity to identify areas for the optimisation of both the protocol and the cartridge.

Following the completion of the protocol the user reviews all PCR experimental data and reviews this against the high complexity PCR cartridge design. The aim of the review is to identify areas of the cartridge and method of operation that can be optimised. Optimisation may include one or more of: improvement of the specific protocol to further the overall experiment (e.g. to carry out another repeat of the experiment); general improvement of the cartridge design and method of operation for other users that may wish to utilise the specific cartridge in the future.

Those skilled in the art will appreciate that while the foregoing has described embodiment of the present invention, the present invention should not be limited to the specific configurations and methods disclosed in this description of the preferred embodiments. Those skilled in the art will recognise that present invention has a broad range of applications, and that the embodiments may take a wide range of modifications without departing from any inventive concept as defined in the appended claims.

What is claimed is:

1. A modular reactor device having an outer housing, and a plurality of components contained within the outer housing, the components including:
   a reaction chamber;
   a fluid pathway connected to the reaction chamber; and
   a valve arranged to control flow of fluid within the device,
   wherein the outer housing has a plurality of connection ports providing connections from the exterior of the device to the interior, the connection ports including:
   a fluid input and a fluid output;
   an electrical input; and
   a pneumatic input;
   wherein either the electrical input or the pneumatic input is connected to the valve to provide for control of the valve, and
   either the fluid input or the fluid output is connected to the reaction chamber or the fluid pathway.

2. A modular reactor device according to claim 1 wherein the plurality of components further includes a storage compartment and a fluid pathway connecting the storage compartment and the reaction chamber.

3. A modular reactor device according to claim 1 wherein at least one of the components includes a reagent for a chemical or biological reaction.

4. A modular reactor device according to claim 1 wherein the plurality of connection ports also includes an optical input or output and/or a thermal input.

5. A modular reactor device according to claim 1 wherein the components include a plurality of valves which are arranged to control flow of fluid to/from the one reaction chamber; and/or along the fluid pathway.

6. A modular reactor device according to claim 1 wherein the components include a sensor.

7. A modular reactor device according to claim 6 wherein the plurality of connection ports includes a sensor output which is connected to the sensor to allow information from the sensor to be communicated externally to the device.

8. A kit including at least two modular reactor devices, each modular reactor device having an outer housing, and a plurality of components contained within the outer housing, the components including:
   a reaction chamber;
   a fluid pathway connected to the reaction chamber; and
   a valve arranged to control flow of fluid within the device,
   wherein the outer housing has a plurality of connection ports providing connections from the exterior of the modular reactor device to the interior, the connection ports including:
   a fluid input and a fluid output;
   an electrical input; and
   a pneumatic input;
   wherein either the electrical input or the pneumatic input is connected to the valve to provide for control of the valve, and
   either the fluid input or the fluid output is connected to the reaction chamber or the fluid pathway, and
   wherein the arrangement of the components contained within the outer housing is different in each of the modular reactor devices, and the arrangement of the connection ports is identical in each of the modular reactor devices.

9. A kit according to claim 8 wherein the outer housing of each of the modular reactor devices is identical in size and shape.

10. A base station arranged to engage with at least one modular reactor device and having:
    a docking portion arranged to receive the modular reactor device;
    a plurality of connectors arranged in a predetermined configuration to enable connection to a predetermined configuration of connection ports on the modular reactor device when the modular reactor device is received in the docking portion, the connectors including:

a fluid output and a fluid supply;
an electrical connector; and
a pneumatic connector;
a processor arranged to control the supply of one or more of: fluid, electrical power or signals and pneumatic pressure or signals, so as to cause the modular reactor device to carry out a chemical or biological reaction within the modular reactor device.

11. A base station according to claim 10 wherein the connectors further include a thermal connector and the processor is arranged to control the supply of a heating or cooling medium to the modular reactor device.

12. A base station according to claim 10 wherein the connectors further include an optical connector and the processor is arranged to control the supply of optical power or signals to the modular reactor device and/or to receive optical signals from the modular reactor device.

13. A base station according to claim 10 wherein the processor is arranged to control the reaction carried out by the modular reactor device by supplying electrical power or signals, or pneumatic pressure or signals to the modular reactor device so as to cause the modular reactor device to repeatedly process small volumes of fluid through components in the modular reactor device.

14. A base station according to claim 10 wherein the processor is arranged to control the reaction based on signals received from the modular reactor device.

15. A kit including at least one modular reactor device having an outer housing, and a plurality of components contained within the outer housing, the components including:
a reaction chamber;
a fluid pathway connected to the reaction chamber; and
a valve arranged to control flow of fluid within the modular reactor device,
wherein the outer housing has a plurality of connection ports providing connections from the exterior of the modular reactor device to the interior, the connection ports including:
a fluid input and a fluid output;
an electrical input; and
a pneumatic input;
wherein either the electrical input or the pneumatic input is connected to the valve to provide for control of the valve, and
either the fluid input or the fluid output is connected to the reaction chamber or the fluid pathway,
and further including a base station arranged to engage with the least one modular reactor device and having:
a docking portion arranged to receive the modular reactor device;
a plurality of connectors arranged in a predetermined configuration to enable connection to a predetermined configuration of connection ports on the modular reactor device when the device is received in the docking portion, the connectors including:
a fluid output and a fluid supply;
an electrical connector; and
a pneumatic connector;
a processor arranged to control the supply of one or more of: fluid, electrical power or signals and pneumatic pressure or signals, so as to cause the modular reactor device to carry out a chemical or biological reaction within the modular reactor device.

16. A method of manufacturing a modular reactor device for performing a reaction to produce a chemical or biological product, the method including the steps of:
determining at least one reagent required for the performance of the reaction;
selecting, from a limited range of predetermined components, components for inclusion in the modular reactor device and determining an arrangement of said selected components within the modular reactor device to enable the reaction to be performed;
producing, by an additive manufacturing process, the modular reactor device having: an outer housing having a plurality of ports in fixed positions through which fluid, electrical power or signals, and pneumatic pressure or signals, can be supplied to the modular reactor device;
said selected components arranged within the outer housing in the determined arrangement and connected to each other and/or to one or more of the ports; and said at least one reagent stored within at least one of the selected components.

17. A method according to claim 16 wherein said selected components include:
a valve;
a reactor chamber; and
a fluid pathway,
and further wherein the determined arrangement includes:
said fluid pathway connecting at least one of said plurality of ports to the reactor chamber; and
a port for supplying electrical power or signals, or a port for supplying pneumatic pressure or signals, being connected to said valve.

18. A method according to claim 16, wherein the outer housing further includes ports through which heating or cooling medium, and optical power or signals can be supplied to the modular reactor device.

19. A method of manufacturing a modular reactor device for performing a reaction to produce a chemical or biological product, the reaction requiring at least one reagent, the method including the steps of:
receiving computer-coded instructions for the manufacture of the modular reactor device;
producing the modular reactor device using an additive manufacturing process, the additive manufacturing process being controlled by a processor which uses the received computer-coded instructions for manufacture, the modular reactor device having:
an outer housing having a plurality of ports in fixed positions through which fluid, electrical power or signals, and pneumatic pressure or signals can be supplied to the modular reactor device;
said selected components arranged within the outer housing in the determined arrangement and connected to each other and/or to one or more of the ports; and
said at least one reagent stored within at least one of the selected components.

20. A method of manufacturing a chemical or biological product, the method including the steps of:
receiving a modular reactor device specifically designed to produce said chemical or biological product and computer-coded instructions arranged to control the operation of said modular reactor device;
connecting the received modular reactor device to a base station which is arranged to supply fluid, electrical power or signals, and pneumatic pressure or signals to the modular reactor device through a plurality of connectors which are arranged in a fixed arrangement to enable connection to a predetermined configuration of connection ports on the modular reactor device; and running the computer-coded instructions on a processor in said base station thereby causing the base station to supply one or more of: fluid, electrical power or signals, and/or pneumatic pressure or signals to the modular reactor device and thereby control the modular reactor device to cause it to carry out steps to produce said chemical or biological product.

21. A method of manufacturing a chemical or biological product, the method including the steps of:
receiving a modular reactor device specifically designed to produce said chemical or biological product and computer-coded instructions arranged to control the operation of said modular reactor device wherein the modular reactor device includes at least one sensor arranged to monitor a characteristic of a reagent or a reaction in the modular reactor device; and is designed to allow performance of a plurality of alternative reaction pathways to produce a chemical or biological product,
running the computer-coded instructions on a processor in said modular reactor device thereby causing the modular reactor device to control one or more of: fluid flows, electrical power or signals, and/or pneumatic pressure or signals in the modular reactor device and thereby cause the modular reactor device to carry out steps to produce said chemical or biological product;
receiving a signal from said sensor and selecting, based on the received signal, one of the alternative reaction pathways that is to be followed; and
controlling the modular reactor device accordingly to cause the modular reactor device to follow the selected reaction pathway.

22. A method of manufacturing a chemical or biological product, the method including the steps of: receiving a modular reactor device specifically designed to produce said chemical or biological product and computer-coded instructions arranged to control the operation of said modular reactor device; and running the computer-coded instructions on a processor in said modular reactor device thereby causing the modular reactor device to control one or more of: fluid flows, electrical power or signals, and/or pneumatic pressure or signals in the modular reactor device and thereby cause the modular reactor device to carry out steps to produce said chemical or biological product, wherein the computer-coded instructions are arranged to cause the processor to control the modular reactor device to perform a plurality of operations on a regular cycle, the plurality of operations each causing predetermined quantities of fluids within the modular reactor device to be processed in different parts of the modular reactor device at the same time.

23. A method of manufacturing a chemical or biological product, the method including the steps of: receiving computer-coded instructions for the manufacture of a modular reactor device specifically designed to produce said chemical or biological product and computer-coded instructions arrange to control the operation of said modular reactor device; producing the modular reactor device using an additive manufacturing process, the additive manufacturing process being controlled by a processor which uses the received computer-coded instructions for manufacture; connecting the manufactured modular reactor device to a base station which is arranged to supply fluid, electrical power or signals, and pneumatic pressure or signals, to the modular reactor device through a plurality of connectors which are arranged in a fixed arrangement to enable connection to a predetermined configuration of connection ports on the modular reactor device; and running the computer-coded instructions for control on a processor in said base station thereby causing the base station to supply one or more of: fluid, electrical power or signals, and/or pneumatic pressure or signals to the modular reactor device and thereby control the modular reactor device to cause it to carry out steps to produce said chemical or biological product.

* * * * *